(12) United States Patent
Koue et al.

(10) Patent No.: US 7,454,036 B2
(45) Date of Patent: Nov. 18, 2008

(54) INTERNET FACSIMILE AND CONTROL METHOD THEREOF AND COMMUNICATION INSTRUCTION TERMINAL

(75) Inventors: Toshiaki Koue, Iwatsuki (JP); Makoto Takada, Iwatsuki (JP); Soh Suzuki, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/699,454

(22) Filed: Jan. 30, 2007

(65) Prior Publication Data

US 2007/0124575 A1 May 31, 2007

Related U.S. Application Data

(62) Division of application No. 09/987,672, filed on Nov. 15, 2001.

(30) Foreign Application Priority Data

| Dec. 19, 2000 | (JP) | ............................ 2000-385847 |
| Dec. 19, 2000 | (JP) | ............................ 2000-385848 |
| Dec. 19, 2000 | (JP) | ............................ 2000-385849 |
| Dec. 19, 2000 | (JP) | ............................ 2000-385851 |
| Dec. 19, 2000 | (JP) | ............................ 2000-385852 |
| Dec. 19, 2000 | (JP) | ............................ 2000-385853 |
| Dec. 20, 2000 | (JP) | ............................ 2000-387294 |
| Dec. 20, 2000 | (JP) | ............................ 2000-387297 |
| Dec. 20, 2000 | (JP) | ............................ 2000-387300 |
| Dec. 20, 2000 | (JP) | ............................ 2000-387301 |

(51) Int. Cl.
*H04L 9/00* (2006.01)
*G06K 9/00* (2006.01)

(52) U.S. Cl. ...................... 382/100; 713/150; 713/152
(58) Field of Classification Search ................ 382/100; 380/150, 152
See application file for complete search history.

(56) References Cited

FOREIGN PATENT DOCUMENTS

| JP | A 05-103127 | 4/1993 |
| JP | A 08-139895 | 5/1996 |
| JP | A 09-252317 | 9/1997 |
| JP | A 11-146107 | 5/1999 |
| JP | A 11-161457 | 6/1999 |
| JP | B2 2934752 | 6/1999 |

OTHER PUBLICATIONS http://www.efax.com/en/efax/twa/page/homePage?CMP=OTC-us, of year 2007.*
http://scout.wisc.edu/Projects/PastProjects/net-news/99-04/99-04-22/0004.html, year 1999.*
MAgNET: mobile agents for networked electronic trading Dasgupta, P.; Narasimhan, N.; Moser, L.E.; Melliar-Smith, P.M.; Knowledge and Data Engineering, IEEE Transactions on vol. 11, Issue 4, Jul.-Aug. 1999 pp. 509-525.*

(Continued)

*Primary Examiner*—David Y Jung
(74) *Attorney, Agent, or Firm*—Oliff & Berridge, PLC

(57) ABSTRACT

In an Internet fax, to receive an electronic mail document for fax transfer, if a password related to a control command for indicating a facsimile communication function is encrypted and set in the destination field or the main body of the received electronic mail, the encrypted password is decrypted and using the decrypted password, facsimile transfer of the electronic mail document is executed following the control command

14 Claims, 38 Drawing Sheets

OTHER PUBLICATIONS

Dynamic documents: mobile wireless access to the WWW Kaashoek, M.F.; Pinckney, T.; Tauber, J.A.; Mobile Computing Systems and Applications, 1994. Proceedings., Workshop on Dec. 8-9, 1994 pp. 179-184.*

Inter-working and integration of messaging in a heterogeneous wireless environment Shiao-Li Tsao; Jin Chang Chou; YuChing Hsu; Vehicular Technology Conference, 2005. VTC 2005-Spring. 2005 IEEE 61st vol. 5, May 30-Jun. 1, 2005 pp. 2790-2794 vol. 5.*

* cited by examiner

EXAMPLE OF SETTING P CODE IN E-MAIL HEADER

| ABBREVIATED NUMBER (NO.) | ASSOCIATED NAME | DESTINATION INFORMATION (TELEPHONE NUMBER/E-MAIL ADDRESS) |
|---|---|---|
| 1 | TARO FUJI | 03-XXXX-1234 |
| 2 | HANAKO FUJI | F.Hanako@fujixerox.co.jp |
| ⋮ | ⋮ | ⋮ |
| N | ICHIRO FUJI | 03-XXXX-5678 |

FIG. 14

< REASON WHY FACSIMILE TRANSFER IS REFUSED >
STORAGE MEMORY IS INSUFFICIENT

........................................................................................................

< E-MAIL HEADER >
    DATE : FRI, 8 DEC 2000 11:37:15 +0900 (JST)
    FROM : watashi@ifax.co.jp
    TO : anata@ifax.co.jp
    CC :
  SUBJECT : DOCUMENT DISTRIBUTION ........................................................................................................

< E-MAIL BODY >
    ATTACHED IS A DOCUMENT USED AT A MEETING.
    STARTING FROM 9:30 ON DECEMBER 11 (MON).

........................................................................................................

< ATTACHED FILE >

<u>INVENTION PROPOSAL</u>

INVENTION TITLE : INTERNET FACSIMILE
        INVENTOR :

| DATE | TRANSMITTING PARTY ADDRESS | FILE TYPE | FILE SIZE |
|---|---|---|---|
| 20001220082655 | xxx@xxx.co.jp | XX VER4.1 | 986 |
| 20001220091234 | yyy@yyy.co.jp | YYY | 435 |
| 20001220091248 | zzz@zzz.com | ZZZ | 1,671 |
| ⋮ | ⋮ | ⋮ | ⋮ |

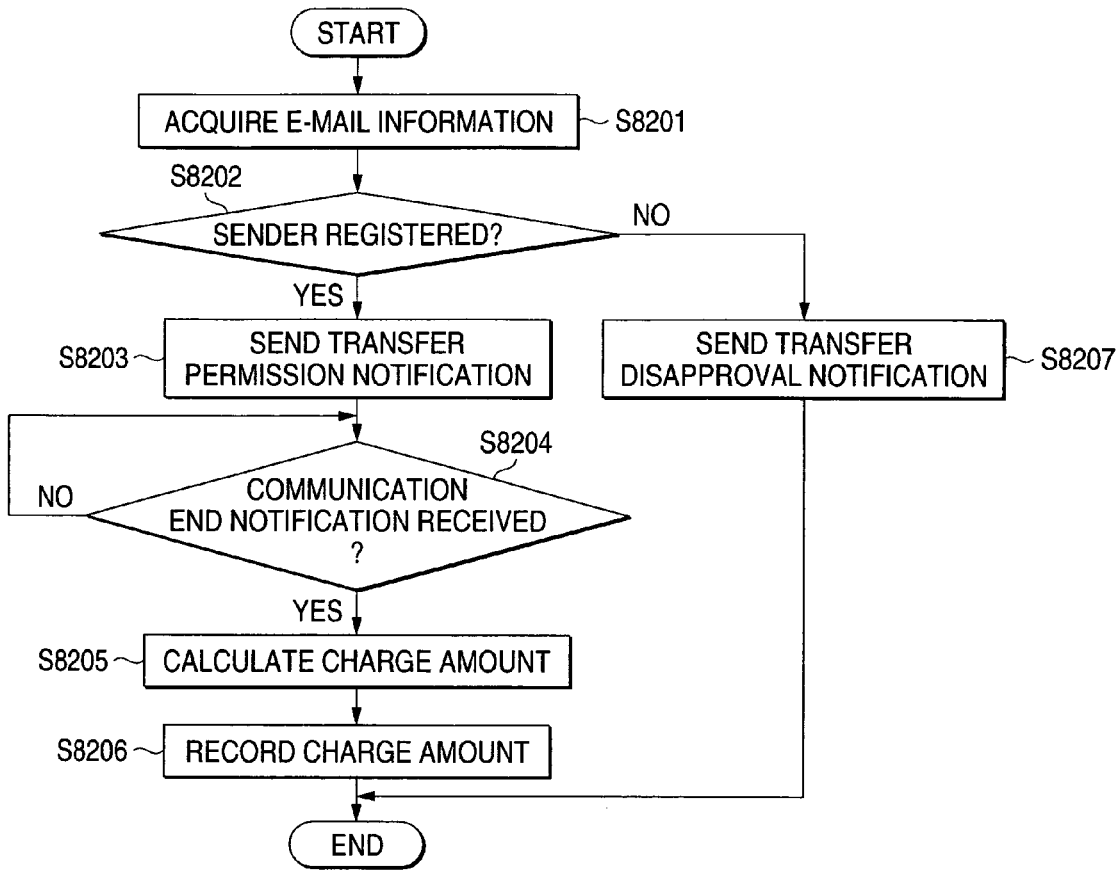

INTERNET FACSIMILE AND CONTROL METHOD THEREOF AND COMMUNICATION INSTRUCTION TERMINAL

This is a Division of application Ser. No. 09/987,672 filed Nov. 15, 2001. The disclosure of the prior application is hereby incorporated by reference herein in its entirety.

BACKGROUND OF THE INVENTION

1. Field of the Invention

This invention relates to an Internet facsimile and a control method thereof and a communication instruction terminal.

2. Description of the Related Art

In recent years, an Internet facsimile has emerged from the viewpoint of decreasing communication costs with rapid expansion of the Internet.

The Internet facsimile has a function of transferring data as it is connected to a local area network (LAN) and the Internet, and a function of performing normal facsimile message transmission and reception via a public switched telephone network (PSTN).

In the normal facsimile transmission (or fax transmission), a document described on paper is read through a facsimile (or fax) and the read document is transmitted to the fax of the destination via the public switched telephone network. In contrast, in the Internet facsimile, a document, etc., is transmitted from a personal computer, etc., that can be connected to the Internet to the Internet facsimile of the destination as electronic mail (or E-mail).

Such an Internet facsimile makes it possible to transmit and receive image information between remote locations and reduce the communication costs drastically. The Internet facsimile can transmit a document to the associated Internet facsimile without outputting data to paper from a personal computer, etc. Therefore, the Internet facsimile contributes to implementation of an economical and efficient system network.

As one of the functions of the Internet facsimile, a function called E-mail to Fax Gateway is available for transmitting by fax a document, etc., received as E-mail to the specified fax. In the E-mail to Fax Gateway function, E-mail received at the Internet facsimile is transmitted by fax to the fax of the destination. Therefore, the received document, etc., can be printed out on the fax of the destination regardless of whether or not the fax is compatible with Internet facsimile.

The E-mail to Fax Gateway function uses the Internet in the portion of a relay line (assuming a long distance). Therefore, communications conducted mainly as fax communications are conducted via the Internet, whereby the communication costs can be decreased. Of course, to communicate with an associated terminal having no Internet facsimile function, the E-mail to Fax Gateway function is also a useful function.

By the way, hitherto, in the Internet facsimile installing the E-mail to Fax Gateway function, the telephone number of the destination, for example, FAX=+81487905111@fujixerox.co.jp has been set in the E-mail (SMTP) destination (To: field) field in the Gateway specification method.

At the time, to use an F code (control command) function in facsimile communications, FAX=+81487905111/T33S=XXXX@fujixerox.co.jp has been set (specified).

However, in the F code function specification method in the related art, P code (password) for the F code function cannot be sent.

However, if the P code is simply sent like the F code, it is feared that a third party may steal glance at or peep the code on the Internet, and thus the P code cannot be provided by similar means to that for the F code.

That is, in the related art, the P code for the F code function cannot be sent and thus the mail box of the fax transfer destination machine cannot be accessed.

As described above, the F code function specification method in the Internet facsimile having the E-mail to Fax Gateway function in the related art does not involve a mechanism for sending the P code (password) for the F code function with safety and thus has the disadvantage that the mail box of the fax transfer destination machine cannot be accessed.

The Internet facsimile installing the E-mail to Fax Gateway function involves a security problem of accepting all mail containing a fax transfer instruction and executing fax transfer.

To transfer electronic mail by fax, the address information (mainly, telephone number) of the Internet fax as the source in facsimile communications is only sent to the facsimile of the transfer destination and the mail address of the transmission source of the electronic mail is not sent.

That is, there is a possibility that illegal use (step) of (fax transfer) from the Internet will be made. This means that the transmitting party can pretend to be another party and conduct fax communications requiring the communication charge without the charge to the transmitting party. Accordingly, the relay machine stepped for the fax transfer suffers an enormous loss of the communication charge, etc.

In the Internet facsimile in the related art, normally the formats of files attached to E-mail (SMTP) that can be expanded are limited to TIFF-FX or text. Therefore, if a file in a different format such as WORD, EXCEL, or PDF is attached, it cannot be expanded at the receiving party and is discarded assuming that the communication itself does not exist; this is a problem.

To solve this problem, it is considered that various products of application software are previously built in the Internet facsimile for expanding a document attached to electronic mail. However, many document formats exist and it is virtually impossible to provide all application software products so as to be compatible with all formats.

Often the version of application software is updated and the file format is changed accordingly. Therefore, it is necessary to follow the file format change; in fact, however, it is very difficult to follow the file format change.

Normally, in Internet facsimile communications, header information is added to a document transmitted in Internet facsimile communications like electronic mail. The header information contains a Priority header. This Priority header has been originally used to specify the priority of processing in an electronic mail distribution server; at present, however, it is often used as an index to show the emergency or importance for the electronic mail receiver.

However, the Internet facsimile does not use the Priority header for processing and basically discards the Priority header in read. Since a specifying section for specifying the priority does not exist in the normal facsimile communications, the Internet facsimile cannot perform processing using the priority; this is a problem.

The Internet fax installing the E-mail to Fax Gateway function in the related art assumes that the E-mail (SMTP) header, the main body of mail, and the contents of an attached file of a document, an image, etc., are described on continuous paper, and transmits the E-main by fax to the specified fax. Therefore, the Internet fax in the related art outputs the header, the main body of mail, and the contents of an attached file without page delimiters and thus the received document is very hard to read; this is a problem. One document to be output to one page may be output across two pages in some cases and the output document cannot be used intact; this is a problem. In the method, the header information which does not occur if a normal fax is used to transmit a document by fax is added and thus more information than is necessary is transferred from the Internet fax to the destination, increasing the information amount; this is a problem.

To use the Internet facsimile, anybody can easily transmit information by fax, but various charges including the communication charge required for facsimile transmission are to the installation party or person of the Internet facsimile; this is a problem.

SUMMARY OF THE INVENTION

It is therefore an object of the invention to provide an Internet facsimile and a control method thereof and a communication instruction terminal having the following functions:

1. Facsimile transfer communications using a password (P code) related to a control command (F code) for indicating a facsimile communication function are conducted safely and reliably.

2. Illegal use of a fax transfer function from the Internet is prevented, security is provided, and an Internet fax function is executed with safety.

3. It is made possible for the operator to easily keep track of the state of an Internet communication apparatus.

4. If an attached file that cannot be expanded exists, it is transferred to the transmission destination.

5. Documents in various formats are covered without installing a large number of application software products in an Internet facsimile.

6. Using Priority header information, the priority is specified using the F code, etc., even in usual facsimile communications and processing responsive to the priority is performed.

7. The mail address of the transmission source of electronic mail is sent so that the user of the facsimile of the transfer destination can accurately keep track of the transmission source.

8. Received electronic mail is transmitted by fax so that the document printed out at the fax of the transmission destination is made legible.

9. The amount of information transferred to the transmission destination is suppressed.

10. When information received by electronic mail is transmitted by facsimile, the user is charged and the load on the installation person of an Internet facsimile is decreased and management thereof is facilitated.

According to the invention, there is provided an Internet facsimile being connected to a telephone network and the Internet and having a function of transferring an electronic mail document received via the Internet by facsimile, the Internet facsimile comprising a determination section, upon reception of an electronic mail document to be transferred by facsimile, for determining whether or not a password related to a control command for indicating a facsimile communication function is encrypted and set in a destination field of the received electronic mail, a decryption section for decrypting the encrypted password if the determination section determines that the electronic mail has the password related to the control command for indicating a facsimile communication function and encrypted, and a communication control section for transferring the electronic mail document by facsimile following the control command using the decrypted password.

If the determination section determines that the password related to the control command for indicating a facsimile communication function is encrypted in the main body of the received electronic mail, the decryption section decrypts the encrypted password.

If the determination section determines that the password related to the control command for indicating a facsimile communication function is encrypted in a destination field of the received electronic mail, the decryption section decrypts the encrypted password.

An encryption system of S/MIME (Secure/Multipurpose Internet Mail Extension) or PGP/MIME (Pretty Good Privacy/Multipurpose Internet Mail Extension) is adopted to encrypt the password related to the control command for indicating a facsimile communication function.

The control command for indicating a facsimile communication function is a command for indicating a confidential communication function, a bulletin board communication function, or a relay broadcast communication function defined in ITU-T (International Telecommunications Union-Telecommunications Standards Section) Recommendation T.30.

According to the invention, there is provided a communication instruction terminal having a function of instructing an Internet facsimile to transfer an electronic mail document by facsimile through the Internet, the communication instruction terminal comprising an encryption section for encrypting a password related to a control command for indicating a facsimile communication function added to the electronic mail document to be transferred by facsimile by an encryption system for encrypting the electronic mail document, and a sending section for giving the password encrypted by the encryption section to the electronic mail and sending the electronic mail document.

The sending section sets the encrypted password in a destination field of the electronic mail.

The sending section sets the encrypted password in the main body of the electronic mail.

The encryption section encrypts the password using an encryption system of S/MIME (Secure/Multipurpose Internet Mail Extension) or PGP/MIME (Pretty Good Privacy/Multipurpose Internet Mail Extension).

The control command for indicating a facsimile communication function is a command for indicating a confidential communication function, a bulletin board communication function, or a relay broadcast communication function defined in ITU-T (International Telecommunications Union-Telecommunications Standards Section) Recommendation T.30.

According to the invention, there is provided an Internet facsimile being connected to both a telephone network and the Internet and having a function of transferring an electronic mail document received via the Internet by facsimile, the Internet facsimile comprising a determination section, upon reception of an electronic mail document to be transferred by facsimile, for determining whether or not the transmission source can be identified correctly, and a communication control section for transferring the received electronic mail document by facsimile only if the determination section determines that the transmission source can be identified correctly.

The determination section uses a function of S/MIME (Secure/Multipurpose Internet Mail Extension) or PGP/MIME (Pretty Good Privacy/Multipurpose Internet Mail Extension) to determine whether or not the transmission source can be identified correctly.

According to the invention, there is provided an Internet facsimile being connected to both a telephone network and the Internet and having a function of transferring an electronic mail document received via the Internet by facsimile, the Internet facsimile comprising a setting section for setting an address of each transmission source of an electronic mail document to be transferred by facsimile, previously permitted for fax transfer, a determination section, upon reception of an electronic mail document to be transferred by facsimile, for determining whether or not the address of the transmission source of the electronic mail document is set by the setting section, and a communication control section for transferring the received electronic mail document by facsimile only if the determination section determines that the address of the transmission source of the electronic mail document is set by the setting section.

The setting section sets the address of the transmission source of the electronic mail document to be transferred by facsimile, permitted for fax transfer in an abbreviated dialing table.

According to the invention, there is provided an Internet facsimile being connected to both a telephone network and the Internet and having a function of transferring an electronic mail document received via the Internet by facsimile, the Internet facsimile comprising a setting section for setting a telephone number of each transfer destination previously permitted for fax transfer, a first determination section for determining whether or not the transmission source of an electronic mail document to be transferred by facsimile, received through the Internet can be identified correctly, a second determination section for determining whether or not the telephone number of the facsimile transfer destination of the electronic mail document is set by the setting section if the first determination section determines that the transmission source can be identified correctly, and a communication control section for transferring the received electronic mail document by facsimile only if the second determination section determines that the telephone number of the facsimile transfer destination of the electronic mail document is set by the setting section.

The setting section sets the telephone number of the transfer destination permitted for fax transfer in an abbreviated dialing table.

The first determination section uses a function of S/MIME (Secure/Multipurpose Internet Mail Extension) or PGP/MIME (Pretty Good Privacy/Multipurpose Internet Mail Extension) to determine whether or not the transmission source can be identified correctly.

The Internet facsimile may further comprise a setting section for setting an address of each transmission source of an electronic mail document to be transferred by facsimile, previously permitted for fax transfer, wherein the first determination section determines whether or not the transmission source can be identified correctly based on whether or not the address of the transmission source of the electronic mail document to be transferred by facsimile is set by the setting section.

According to the invention, there is provided an Internet communication apparatus for transmitting and receiving document information via Internet and transmitting and receiving facsimile image information via a public switched telephone network, the Internet communication apparatus comprising a transfer refusing section for refusing transfer of electronic mail received via the Internet when the electronic mail is transferred as the facsimile image information, and a print section for printing out at least a part of the received electronic mail if the transfer refusing section refuses electronic mail transfer.

The printing section prints a header part and a main body of the electronic mail and an attached file thereto.

The printing section automatically prints a header part and a main body of the electronic mail.

The printing section prints with the reason why transfer of the electronic mail is refused.

According to the invention, there is provided an Internet facsimile communication apparatus being connected to the Internet and a telephone network and having a function of transmitting received electronic mail by facsimile to a specified facsimile, the Internet facsimile communication apparatus comprising a determination section for determining whether or not a file attached to the electronic mail is in an expandable file format, and a transmission section for transferring a header and a main body of the electronic mail and the attached file determined to be in an expandable file format by the determination section to a specified transmission destination.

The Internet facsimile communication apparatus may further comprise a notification section for transferring information indicating that a file in an unexpandable file format is attached to the transfer destination.

The information is a notification message indicating that a file in an unexpandable file format is attached, and the notification section adds the notification message to the main body.

The information is a notification message indicating that a file in an unexpandable file format is attached, and the notification section deletes the main body and uses the notification message as the main body.

The notification section uses a protocol.

According to the invention, there is provided an Internet facsimile communication apparatus being connected to the Internet and a telephone network and having a function of transmitting received electronic mail by facsimile to a specified facsimile, the Internet facsimile communication apparatus comprising a section for determining whether or not a file attached to the electronic mail is in an expandable file format, and a file transfer protocol section for transferring the file not determined to be in an expandable file format to a facsimile at a transmission destination.

According to the invention, there is provided a document processing apparatus of an Internet facsimile being connected to at least the Internet for transmitting and receiving electronic mail, the document processing apparatus comprising a communication section for transmitting and receiving electronic mail through a network to and from the Internet facsimile, a conversion section for converting a document attached to electronic mail received by the communication section from the Internet facsimile into a predetermined file format, and a return section for attaching the document converted into the predetermined file format by the conversion section to the electronic mail and returning the electronic mail from the communication section to the Internet facsimile.

The communication section transmits and receives electronic mail through the Internet to and from the Internet facsimile.

The document processing apparatus may further comprise a data size record section for recording the data size of the document converted into the predetermined file format by the conversion section.

The document processing apparatus may further comprise a number-of-converted-documents record section for recording the number of the documents converted into the predetermined file format by the conversion section.

The document processing apparatus may further comprise a file format record section for recording the former file format of the document converted into the predetermined file format by the conversion section.

The return section comprises an advertisement information addition section for adding advertisement information to the electronic mail to be returned to the Internet facsimile.

The document processing apparatus may further comprise a document storage section for storing the document attached to electronic mail received from the Internet facsimile or the document converted into the predetermined file format by the conversion section; and an identification information giving section for giving identification information to the document stored in the document storage section, wherein the return section transmits the identification information given by the identification information giving section to the document converted into the predetermined file format by the conversion section together with the document to the Internet facsimile, and upon reception of a request to resend the document together with the identification information from the Internet facsimile, resends the document corresponding to the identification information to the Internet facsimile.

The Internet facsimile has a function of confidentially receiving electronic mail and facsimile information and if electronic mail transferred from the Internet facsimile is to be confidentially received, the return section attaches the document converted into the predetermined file format by the conversion section to the electronic mail confidentially received and returns the electronic mail to the Internet facsimile.

The document processing apparatus may further comprise a certification information check section for checking the identity of the Internet facsimile based on certification information attached to the electronic mail received from the Internet facsimile, the conversion section converts the document into the predetermined file format after the certification information check section checks the identity of the Internet facsimile.

The document processing apparatus may further comprise a decryption section for decrypting encrypted electronic mail received from the Internet facsimile, and an encryption section for encrypting the electronic mail to be returned by the return section.

According to the invention, there is provided a document processing apparatus being connected to at least the Internet for transmitting and receiving electronic mail, the document processing apparatus comprising a print section for printing out a document attached to received electronic mail, and a transfer section, if the document attached to received electronic mail is in an unprocessable file format by the print section, for transferring the electronic mail to a conversion server, wherein the conversion server converts the document attached to the electronic mail transferred by the transfer section into a predetermined file format, attaches the document converted into the predetermined file format to the electronic mail, and returns the electronic mail, and wherein the print section prints out the document attached to the electronic mail returned from the conversion server.

The document processing apparatus may further comprise a certification information attaching section for attaching certification information for certificating the identity to the electronic mail to be transferred by the transfer section.

The document processing apparatus may further comprise an encryption section for encrypting the electronic mail to be transferred by the transfer section, and a decryption section for decrypting encrypted electronic mail returned from the conversion server.

According to the invention, there is provided an Internet facsimile being connected to the Internet and a public switched telephone network, the Internet facsimile comprising a priority extraction section for extracting priority assigned to each document transmitted and received via the Internet or the public switched telephone network, and a processing section for processing the document based on the priority extracted by the priority extraction section.

If a plurality of documents wait for being processed, the processing section compares the priority assigned to one of the plurality of documents with the priority assigned to another and processes the plurality of documents in the priority order from high to low based on the comparison.

When the processing section processes one document, if another document requires the same processing and is assigned higher priority than that document, the processing section temporarily stops processing of the current document being processed and processes the document assigned the higher priority and after the termination of processing the document assigned the higher priority, the processing section restarts processing of the document temporarily stopped.

The processing section executes at least one of facsimile transmission processing of transmitting a document by facsimile, Internet facsimile transmission processing of converting a document received by facsimile into an electronic mail format for transmission, and print processing of a document received by facsimile or electronic mail.

The Internet facsimile may further comprise a setting section for specifying whether or not processing responsive to the priority is to be executed.

The Internet facsimile may further comprise a transfer section, to print a document, when the document cannot be printed, if the document has higher priority than predetermined priority, for transferring the document to another predetermined machine.

The Internet facsimile may further comprise a setting section for specifying whether or not the transfer section is to transfer the document to another machine and setting the predetermined priority.

The Internet facsimile may further comprise a setting section for setting priority assigned to a document received by facsimile via the public switched telephone network from the transmitting party.

According to the invention, there is provided an Internet facsimile for transmitting and receiving data through a network and transmitting and receiving facsimile data through a public switched telephone network, the Internet facsimile comprising a section for converting image data and document data in electronic mail received from the network into facsimile data and transmitting the facsimile data to a facsimile of a destination through the public switched telephone network, and a communication information notification section for sending information concerning the transmission source of the electronic mail to the destination facsimile.

The communication information notification section transmits an electronic mail address of the transmission source of the electronic mail to the destination facsimile as transmission source information of facsimile communications.

The communication information notification section transmits an electronic mail address of the transmission source of the electronic mail to the destination facsimile together with information concerning the Internet facsimile.

The communication information notification section transmits information indicating that the facsimile data is relayed in transfer by the Internet facsimile to the destination facsimile, and the destination facsimile comprises a display section for displaying information indicating that the received facsimile data is relayed in transfer.

The Internet facsimile may further comprise a section for displaying the electronic mail address of the transmission source together with information concerning the destination facsimile.

The Internet facsimile may further comprise a display section for displaying information indicating that the received electronic mail is to be relayed in transfer.

The Internet facsimile may further comprise a batch transmission function of storing a plurality of pieces of electronic mail and transmitting the stored electronic mail pieces to the destination facsimile in batch.

For all pieces of electronic mail transmitted in batch by the batch transmission function, the communication information notification section transmits the electronic mail addresses of the transmission sources to the destination facsimile as transmission source information of facsimile communications.

For all pieces of electronic mail transmitted in batch by the batch transmission function, the communication information notification section transmits the electronic mail addresses of the transmission sources to the destination facsimile together with information concerning the Internet facsimile.

The communication information notification section transmits information indicating that the facsimile data is to be relayed in transfer by the Internet facsimile and information indicating that the facsimile data is to be transmitted in batch by the batch the destination facsimile comprises a display section for displaying information indicating that the received facsimile data is relayed in transfer and information indicating that the facsimile data is transmitted in batch.

The Internet facsimile may further comprise a section for displaying the electronic mail addresses of the transmission sources for all facsimile data transmitted in batch by the batch transmission function together with information concerning the destination facsimile.

The Internet facsimile may further comprise a display section for displaying information indicating that the electronic mail is to be relayed in transfer and information indicating that the electronic mail is to be transmitted in batch by the batch transmission function.

According to the invention, there is provided an Internet facsimile communication apparatus being connected at least to the Internet and a telephone network and having a function of transmitting received electronic mail to a specified facsimile by facsimile, the Internet facsimile communication apparatus comprising a dividing section for dividing the electronic mail so that a header and main body of the electronic mail and contents of an attached file thereto are printed out on different pages.

The Internet facsimile communication apparatus may further comprise a page size change section for changing the page sizes of the header and the main body to the page size of the attached file.

The Internet facsimile communication apparatus may further comprise a page size change section for changing the page sizes of the header, the main body, and the attached file to a predetermined page size.

According to the invention, there is provided an Internet facsimile communication apparatus being connected at least to the Internet and a telephone network and having a function of transmitting received electronic mail to a specified facsimile by facsimile, the Internet facsimile communication apparatus comprising a dividing section for dividing the electronic mail so that a header and main body of the electronic mail and contents of an attached file thereto are printed out on different pages.

The Internet facsimile communication apparatus may further comprise a page size change section for changing the page size of the header or the main body so that the header and the main body fall within the same page.

The Internet facsimile communication apparatus may further comprise a determination section for determining whether or not the header and the main body fall within the same page, wherein if it is determined that the header and the main body fall within the same page, the electronic mail is divided so that the header and the main body and the contents of the attached file are printed out on different pages.

The Internet facsimile communication apparatus may further comprise a count section for counting the number of lines of the header and the main body, wherein the determination section uses the count section to determine whether or not the header and the main body fall within the same page.

According to the invention, there is provided an Internet facsimile communication apparatus being connected to the Internet and a telephone network and having a function of transmitting received electronic mail to a specified facsimile by facsimile, the Internet facsimile communication apparatus comprising a first transfer setting section for specifying whether or not a header of the electronic mail is to be transferred to the transmission destination, a second transfer setting section for specifying whether or not a main body of the electronic mail is to be transferred to the transmission destination, and a deletion section for deleting information of the electronic mail in response to the first transfer setting section and the second transfer setting section.

The Internet facsimile communication apparatus may further comprise a determination section for determining whether or not a file is attached to the electronic mail, wherein if it is determined that no file is attached to the electronic mail, the header and the main body of the electronic mail are transferred regardless of the settings defined in the first and second transfer setting sections.

The Internet facsimile communication apparatus may further comprise a first determination section for determining whether or not a file is attached to the electronic mail, and a second determination section for determining whether or not the electronic mail contains a main body, wherein if it is determined that the electronic mail does not contain a main body, the electronic mail is not transferred regardless of the settings defined in the first and second transfer setting sections.

The Internet facsimile communication apparatus may further comprise a third transfer setting section for setting the transferred information amount of the header, wherein the deletion section deletes the information amount of the header in response to the transferred information amount of the header set in the third transfer setting section.

According to the invention, there is provided a charging apparatus for an Internet facsimile being connected to both the Internet and a telephone line for transmitting received information attached to electronic mail by facsimile, the charging apparatus comprising a sender information acquisition section for acquiring sender information of the received electronic mail, a charging amount calculation section for calculating the charging amount of the sender determined based on the sender information acquired by the sender information acquisition section, and a charging amount record section for accumulating the charging amounts calculated by the charging amount calculation section and recording the result.

The sender information acquisition section acquires the electronic mail address of the sender described in header information of the electronic mail as the sender information.

The sender information acquisition section acquires the digital signature attached to the electronic mail as the sender information.

The charging amount calculation section calculates the charging amount based on transfer route information described in header information of the electronic mail.

The charging amount calculation section calculates the charging amount based on the communication charge required for facsimile transmission.

The charging amount calculation section calculates the charging amount based on the telephone number of the associated party of the facsimile transmission destination.

The charging amount calculation section calculates the charging amount based on the transmission condition at the facsimile transmitting time.

The charging amount calculation section calculates the charging amount based on the size of information attached to the electronic mail.

The charging amount calculation section calculates the charging amount based on the type of information attached to the electronic mail.

According to the invention, there is provided a charging apparatus for an Internet facsimile being connected at least to the Internet for attaching image information provided by reading an original to electronic mail for transmission, the charging apparatus comprising a user information input section for requesting user information to be entered before the original is read and accepting user information entered in response to the request, a charging amount calculation section for calculating the charging amount of the user specified based on the user information accepted by the user information input section, and a charging amount record section for accumulating the charging amounts calculated by the charging amount calculation section and recording the result.

The charging amount calculation section determines the charging amount based on a reading condition of the original.

The charging amount calculation section determines the charging amount based on the size of the image information.

The charging amount calculation section determines the charging amount based on the transmission destination of the electronic mail.

BRIEF DESCRIPTION OF THE DRAWINGS

FIG. 14 shows an output example of E-mail printed when the Internet facsimile according to the invention refuses facsimile transfer in an E-mail To Fax Gateway function.

FIG. 42 is a flowchart to show an operation flow of a charging server 200 for the Internet fax 75 to transfer information attached to received E-mail by fax.

FIG. 43 is a drawing to show a record example of a charging DB for recording the information referenced by the charging server 200 to identify each sender and the charge amounts.

DETAILED DESCRIPTION OF THE PRESENT INVENTION

Referring now to the accompanying drawings, the present invention will be described below.

Figure 1:
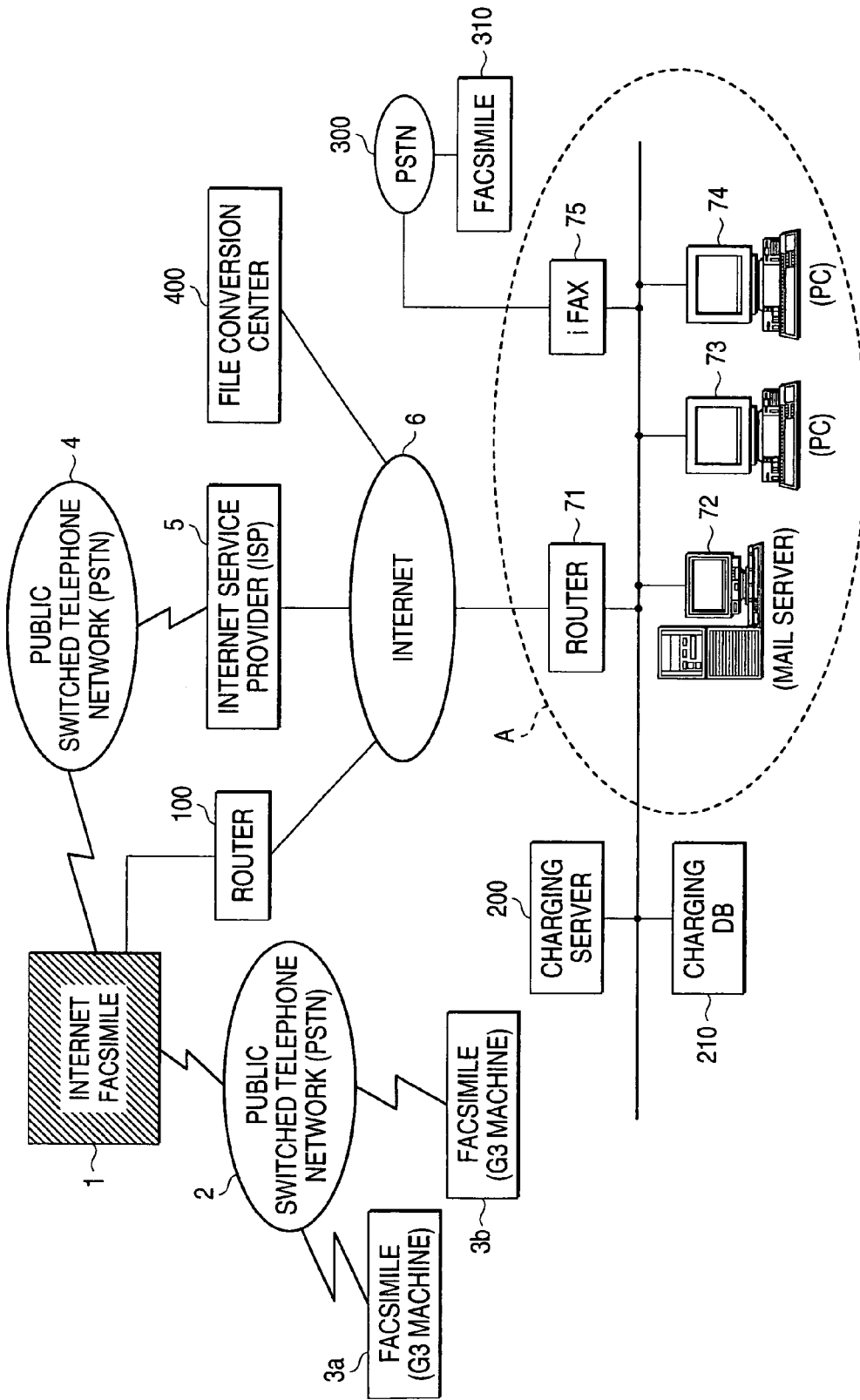
FIG. 1 is a conceptual drawing to show a configuration example of a network incorporating an Internet facsimile 1 of the invention.

FIG. 1 is a conceptual drawing to show one configuration example of a network incorporating an Internet facsimile 1 of the invention.

The Internet facsimile 1 is connected to a facsimile (or fax) 3a, 3b of a Group III machine, etc., via a public switched telephone network (PSTN) 2 and is also connected to a second Internet facsimile 75, personal computers (PCs) 73 and 74 (corresponding to "communication instruction terminals" in WHAT IS CLAIMED IS), and a mail server 72 via a public switched telephone network (PSTN) 4, an Internet service provider (ISP) 5, Internet 6, and a router 71 of a network A. The Internet facsimile 1 may be connected directly to the Internet 6 through the router 71. A file conversion center 400 is connected to the Internet 6. Further, the Internet facsimile 1 is connected to a charging server 200 and a charging database 210 through the router 71. The second Internet facsimile 75 is connected to a different fax 310 via a public switched telephone network (PSTN) 300.

The Internet facsimiles 1 and 75 are machines for transmitting and receiving fax data formerly transmitted and received on a telephone line using some or all of transmission lines of an IP network of the Internet, an intranet, etc., as electronic mail or transmitting and receiving fax data on the IP network.

The electronic mail is mail used in the network of the Internet, intranet, etc.

The charging server 200 manages charging for the use of the Internet fax 75 and the charging database 210 records various pieces of information used by the charging server 200.

The file conversion center 400 provides service of processing a document in a file format that cannot be converted by the Internet fax 1 or 75. For example, if a document in an unexpandable file format is attached to electronic mail received by the Internet fax 1, the document is transmitted to the file conversion center 400 for requesting the file conversion center 400 to convert the file format into a processable file format.

The main component of the file conversion center 400 is a file conversion server for executing file conversion although a detailed description is given later. Therefore, the Internet fax 1 need not necessarily be connected to the file conversion center 400 via the Internet 6 and the file conversion center may be installed in the LAN to which the Internet fax 1 or 75 is connected for conducting a similar service.

Figure 2:
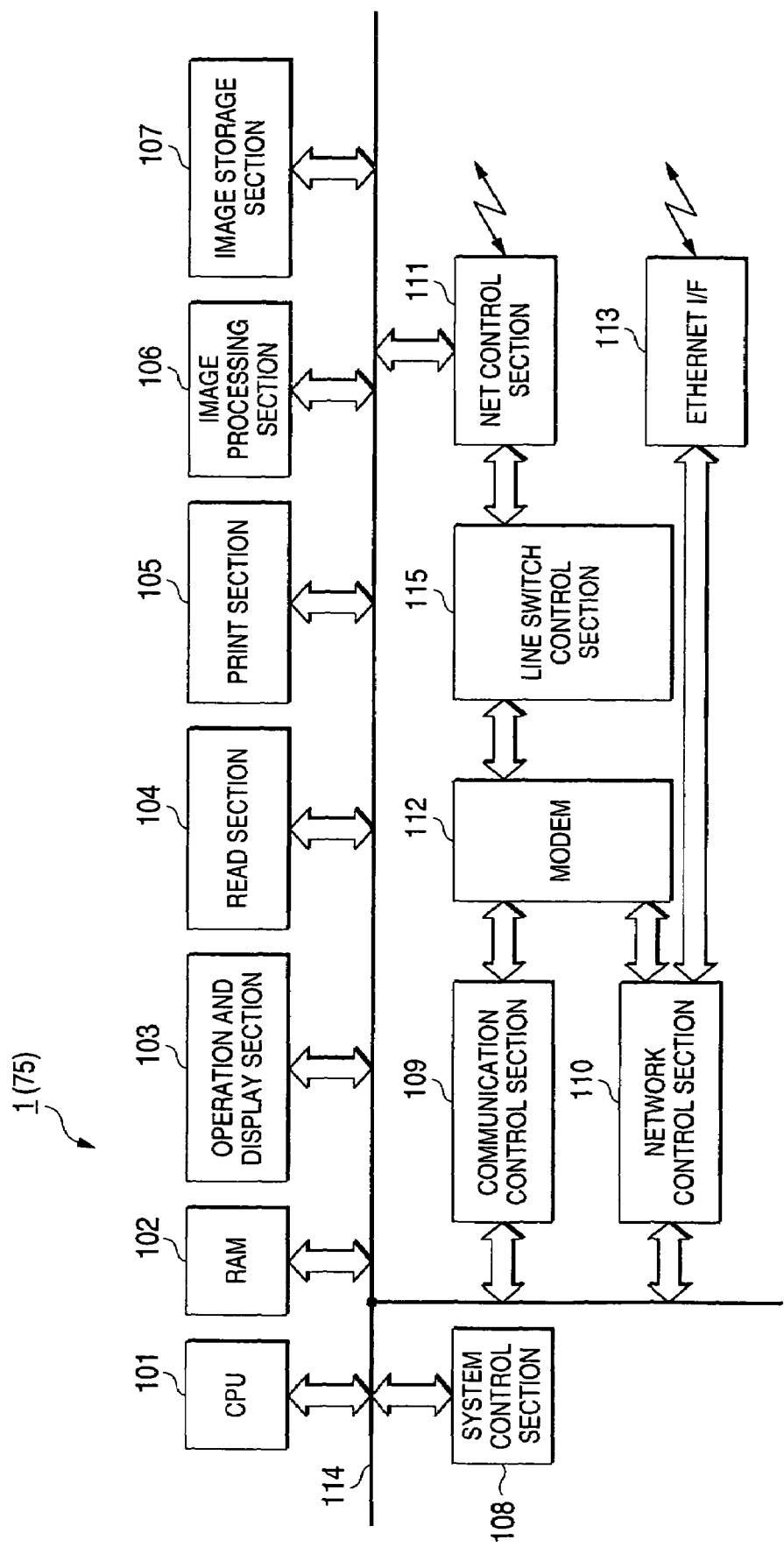
FIG. 2 is a block diagram to show the system configuration of the Internet fax of the invention shown in FIG. 1.

FIG. 2 is a block diagram to show the system configuration of the Internet facsimile 1 of the invention shown in FIG. 1.

As shown in FIG. 2, the Internet fax 1 (75) comprises a CPU 101, RAM 102, an operation and display section 103, a read section 104, a print section 105, an image processing section 106, an image storage section 107, a system control section 108, a communication control section 109, a network control section 110, a net control section 111, and a line switch control section 115 which are connected by a system bus 14, and further comprises a modem 112 and an Ethernet I/F 113 for receiving from a facsimile.

The CPU 101 performs control processing of the whole Internet facsimile 1 (75) and totally controls the sections 101 to 110. It also performs jobs of various determinations, settings, etc. The RAM 102 is memory used to control the Internet facsimile 1; it is used as a work area of the CPU 101. The operation and display section 103 is provided for operating the Internet facsimile 1 and consists of various operation keys and a display. The read section 104 reads a transmitted original with a predetermined resolution. The image processing section 106 is a section for performing processing of coding, decoding, scaling up, scaling down, etc. The image storage section 107 is a section for storing image information of an image received as an attached file to electronic mail, a read image, etc. The print section 105 outputs the image, etc., stored in the image storage section 107 as instructed by the CPU 101. The image storage section 107 also comprises a confidential box (storage area that can be accessed only by the user having the right to do so) for storing images by user. The system control section 108 stores a program for controlling the whole Internet facsimile and is implemented as ROM, etc., for example. The communication control section 109 controls communications fitted to a public telephone network. The network control section 110 controls communications connected to a network of the Internet, etc. The net control section 111 is provided for connecting to a net. The modem 112, which is a modulator-demodulator, comprises a function compatible with various transmission speeds (for example, low-speed mode and high-speed mode, etc.,). The Ethernet I/F 113 is an interface for connecting to Ethernet. The system bus 114 is a bus for transferring data from one component to another. The line switch control section 115 is provided for connecting a plurality of external line interfaces and a plurality of internal communication circuits.

The components, the CPU 101 to the net control section 111, mutually transfer data via the system bus 114.

To execute normal Scan to E-mail transmission, storage and transmission parameters are entered through the operation and display section 103 and image information is read through the read section 104 based on the entered parameters. The read image information is stored in the image storage section 107 and then is processed with the RAM 102 as a buffer using the image processing section 106 as required under the control of the system control section 108 for converting the image in the image storage section 107 into a format fitted for transmission; finally the image is sent through the modem 112, the net control section 111, and the communication control section 109 to the telephone network by fax or is transmitted from the network control section 110 via the Ethernet I/F 113 by E-mail.

Figure 3:
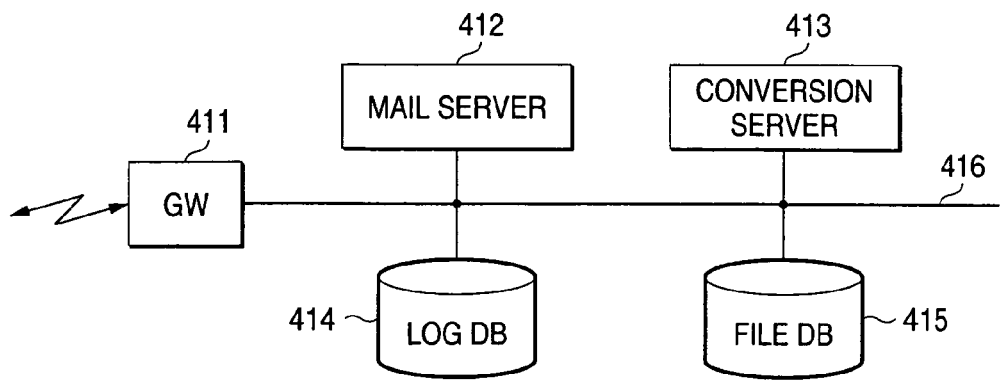
FIG. 3 is a block diagram to show a configuration example of the file conversion center 400.

FIG. 3 is a block diagram to show the configuration of the file conversion center 400. The file conversion center 400 comprises a GW (gateway) 411, a mail server 412, a conversion server 413, a log DB (database) 414, and a file DB 415 connected by a LAN 416. These members may be implemented as a single apparatus (computer). Each member may be separated into a plurality of units (for example, the mail server 412 may be divided into a mail transmission server and a main reception server). The GW 411 comprises a firewall function. Any other apparatus may be connected to the LAN 416.

Figure 4:
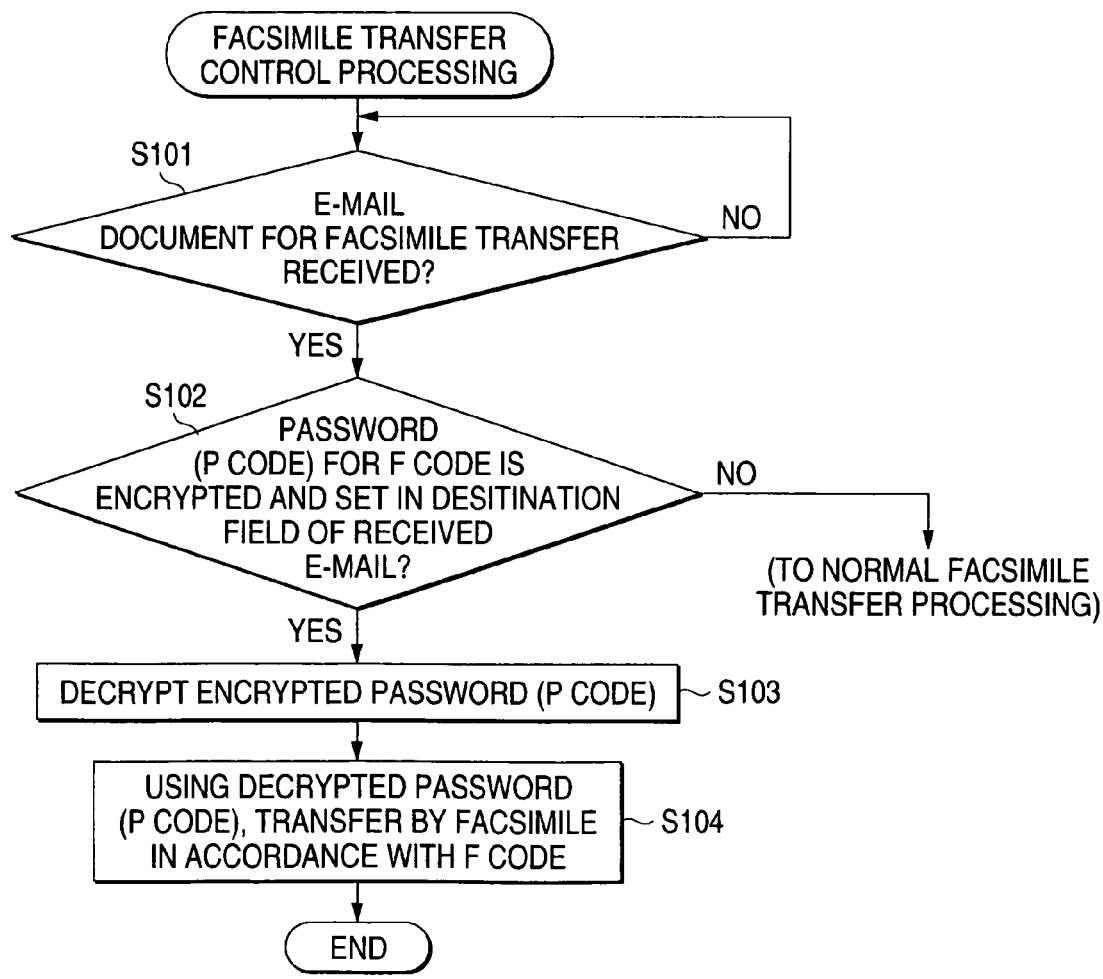
FIG. 4 is a flowchart to show a processing procedure of fax transfer control of the Internet fax 1 shown in FIG. 2.

FIG. 4 is a flowchart to show a processing procedure of facsimile (fax) transfer control of the Internet fax 1 previously described with reference to FIG. 2; it shows the processing procedure of fax transfer control when a password (P code) related to a control command indicating a facsimile communication function, which will be hereinafter referred to simply as F code, is set in a destination field of received electronic mail.

As shown in FIG. 4, the processing is started when an electronic mail document for fax transfer is received at the Internet fax 1 (step S101).

Next, the Internet fax 1 determines whether or not a password (P code) for F code is encrypted and set in the destination field of the received electronic mail (step S102).

If it is determined that a password (P code) for F code is encrypted and set in the destination field of the received electronic mail (YES at step S102), the encrypted password (P code) is decrypted (step S103).

Then, using the decrypted password (P code), fax transfer is executed in accordance with the F code (step S104) and then the processing is terminated.

If the Internet fax 1 does not determine at step S102 that a password (P code) for F code is encrypted and set in the destination field of the received electronic mail (NO at step S102), it performs normal fax transfer processing.

Figure 5:
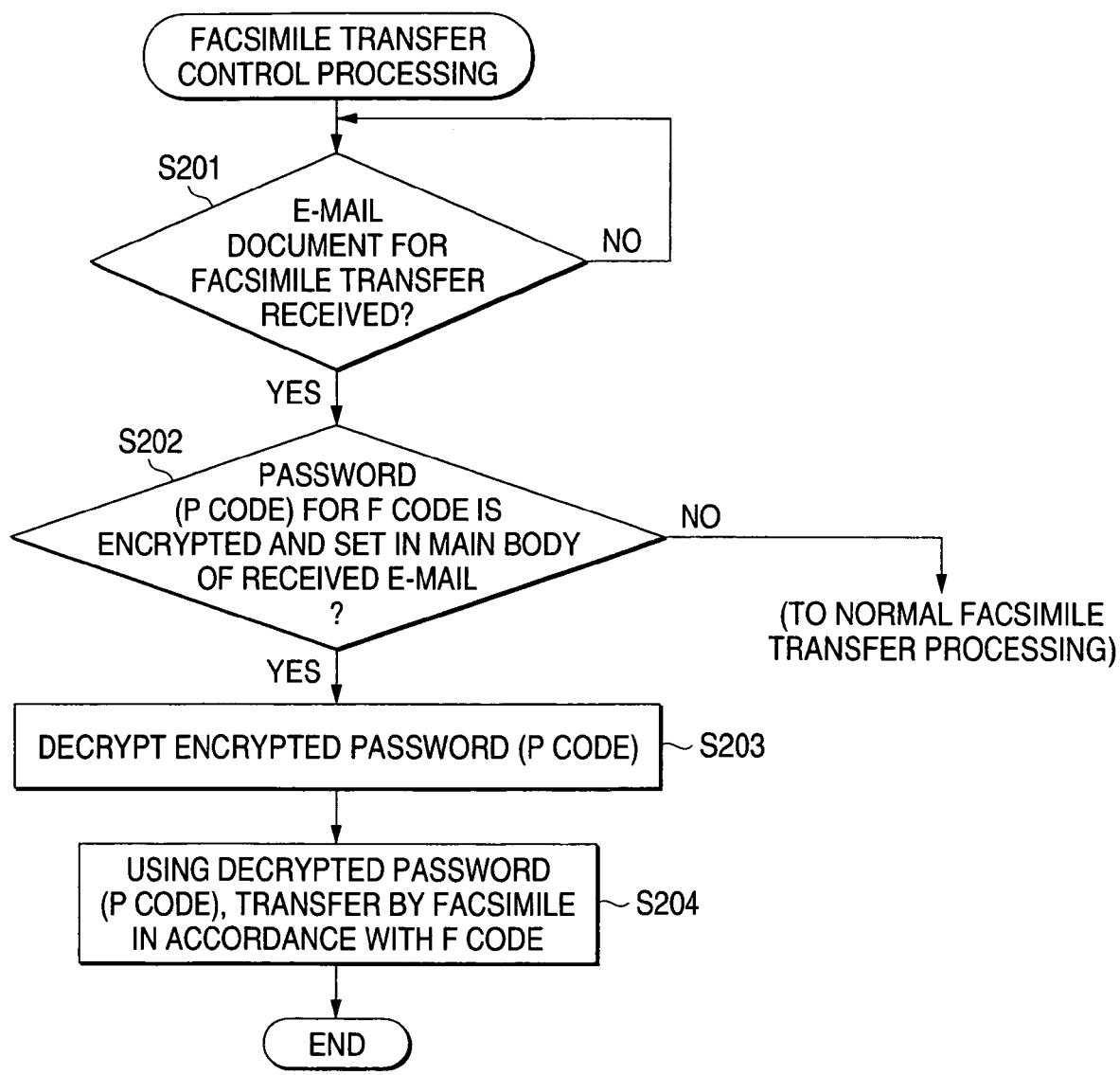
FIG. 5 is a flowchart to show a processing procedure of another embodiment of fax transfer control shown in FIG. 4.

FIG. 5 is a flowchart to show a processing procedure of another embodiment of fax transfer control previously described with reference to FIG. 4; it shows the processing procedure of fax transfer control when a password (P code) for F code is set in the main body of received electronic mail.

As shown in FIG. 5, the processing is started when an electronic mail document for fax transfer is received at the Internet fax 1 (step S201).

Next, the Internet fax 1 determines whether or not a password (P code) for F code is encrypted and set in the main body of the received electronic mail (step S202).

If it is determined that a password (P code) for F code is encrypted and set in the main body of the received electronic mail (YES at step S202), the encrypted password (P code) is decrypted (step S203).

Then, using the decrypted password (P code), fax transfer is executed in accordance with the F code (step S204) and then the processing is terminated.

If the Internet fax 1 does not determine at step S202 that a password (P code) for F code is encrypted and set in the main body of the received electronic mail (NO at step S202), it performs normal fax transfer processing.

According to the configuration, when an electronic mail document for fax transfer is received at the Internet fax 1, if a password related to a control command indicating the facsimile communication function is set in the destination field or the main body of the received electronic mail, the encrypted password is decrypted and using the decrypted password, fax transfer of the electronic mail document is executed in accordance with the control command, so that it is made possible to safely and reliably execute facsimile transfer communications using the password (P code) related to the control command (F code) indicating the facsimile communication function.

Figure 6:
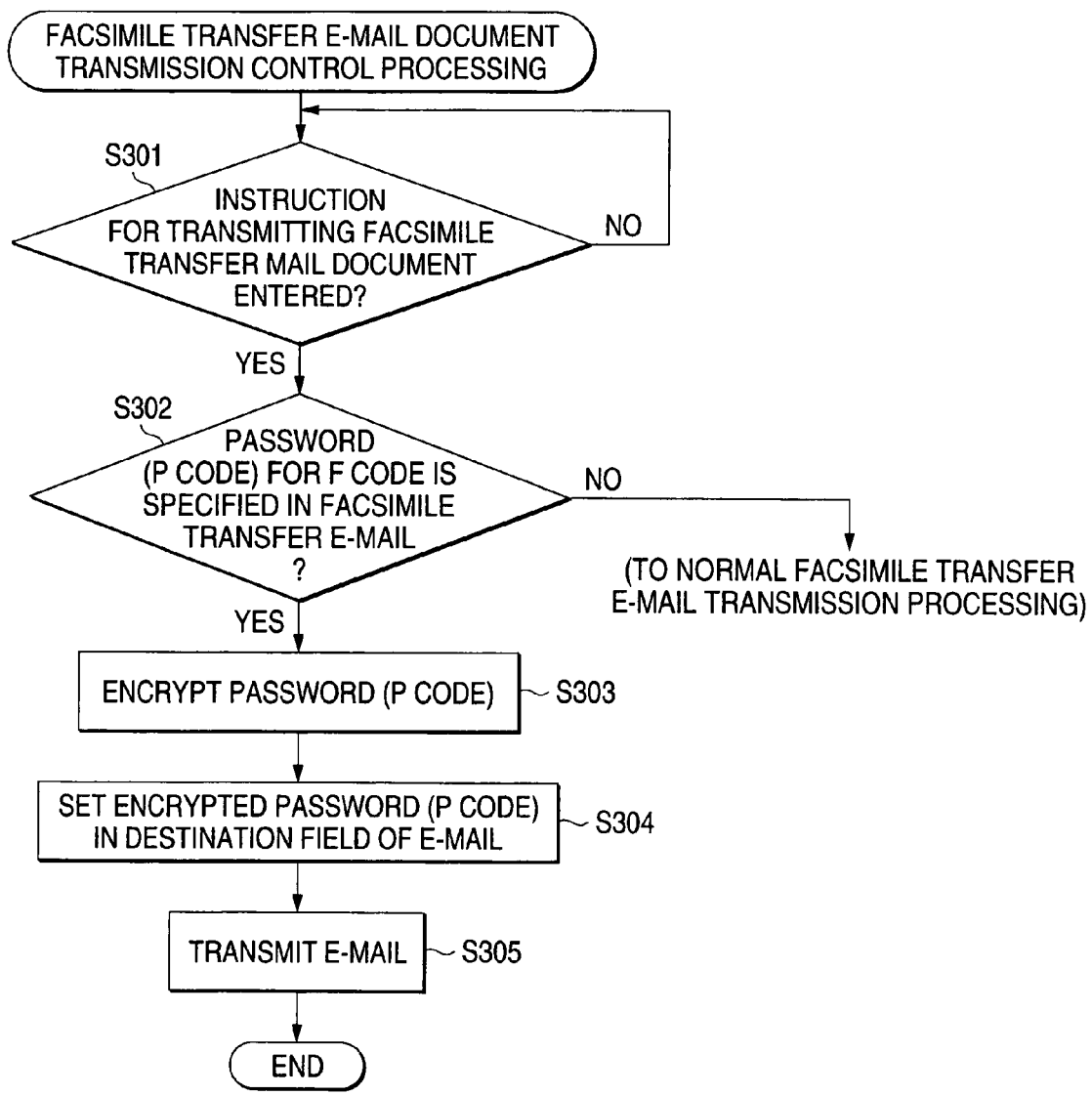
FIG. 6 is a flowchart to show a processing procedure of transmission control of a fax transfer mail document of a communication instruction terminal shown in FIG. 1 (for example, a PC shown in FIG. 1).

FIG. 6 is a flowchart to show a processing procedure of transmission control of a fax transfer mail document of the communication instruction terminal shown above in FIG. 1 (for example, the PC 73 shown above in FIG. 1); it shows a processing procedure of transmission control of a fax transfer mail document when an encrypted password (P code) is set in the destination field of the transmitted mail for transmission thereof.

As shown in FIG. 6, the processing is started when the transmitting person enters an instruction for transmitting a fax transfer mail document at the communication instruction terminal (step S301).

Next, the communication instruction terminal determines whether or not a password (P code) for F code is specified in the fax transfer mail (step S302).

If the communication instruction terminal determines that a password (P code) for F code is specified in the fax transfer mail (YES at step S302), the Internet fax 1 encrypts the password (P code) (step S303).

After completion of encrypting the password, the encrypted password (P code) is set in the destination field of the mail (step S304) and then the mail is transmitted (step S305) and the processing is terminated.

If the communication instruction terminal does not determine at step S302 that a password (P code) for F code is specified in the fax transfer mail (NO at step S302), the Internet fax 1 performs normal fax transfer mail transmission processing.

Figure 7:
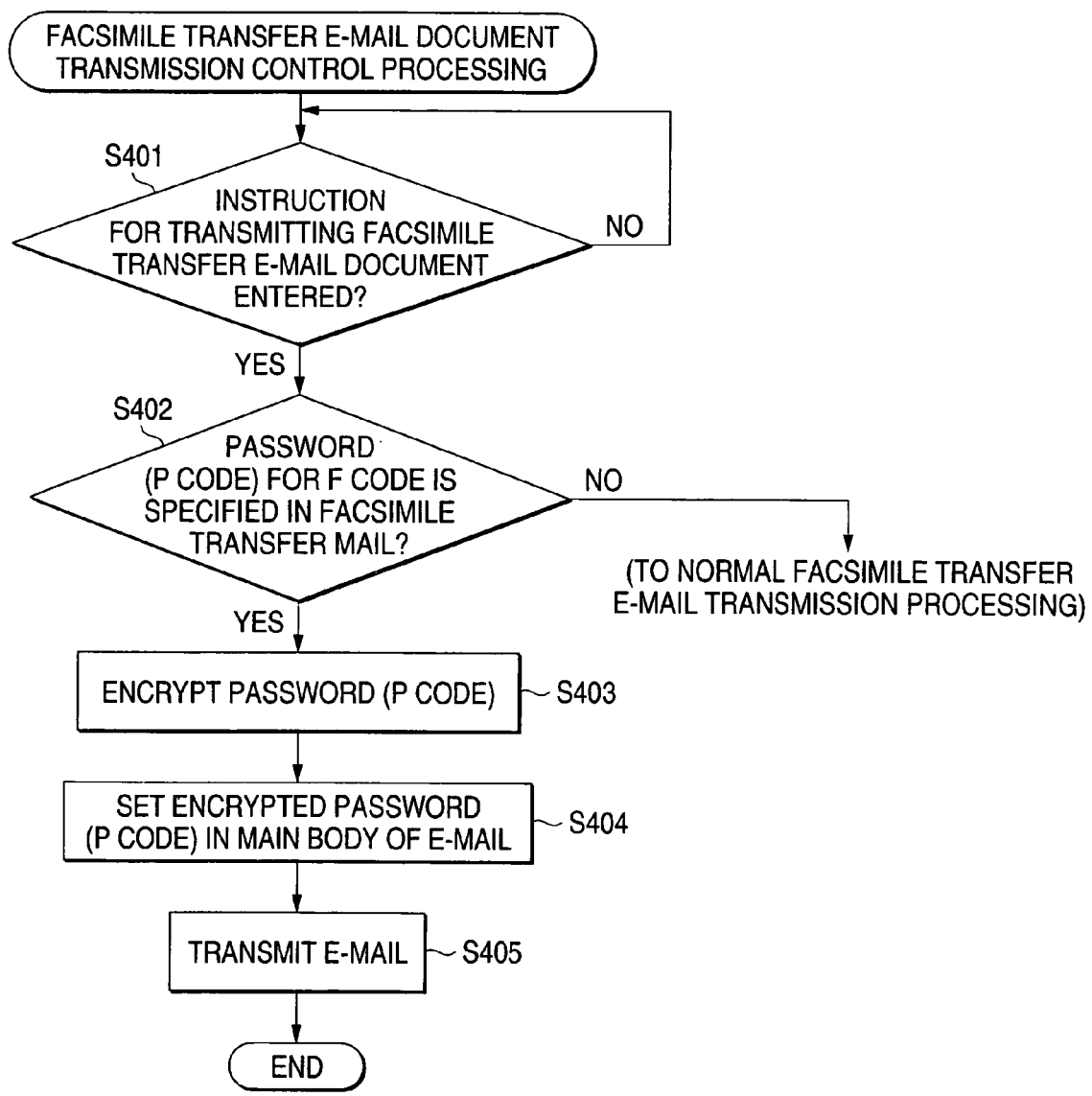
FIG. 7 is a flowchart to show a processing procedure of another embodiment of transmission control of a fax transfer mail document shown in FIG. 6.

FIG. 7 is a flowchart to show a processing procedure of another embodiment of transmission control of a fax transfer mail document shown in FIG. 6; it shows a processing procedure of transmission control of a fax transfer mail document when an encrypted password (P code) is set in the main body of the transmitted mail.

As shown in FIG. 7, the processing is started when the transmitting person enters an instruction for transmitting a fax transfer mail document at the communication instruction terminal (step S401).

Next, the communication instruction terminal determines whether or not a password (P code) for F code is specified in the fax transfer mail (step S402).

If the communication instruction terminal determines that a password (P code) for F code is specified in the fax transfer mail (YES at step S402), the Internet fax 1 encrypts the password (P code) (step S403).

After completion of encrypting the password, the encrypted password (P code) is set in the main body of the mail (step S404) and then the mail is transmitted (step S405) and the processing is terminated.

If the communication instruction terminal does not determine at step S402 that a password (P code) for F code is specified in the fax transfer mail (NO at step S402), the Internet fax 1 performs normal fax transfer mail transmission processing.

According to the configuration, at the transmitting party, the encrypted P code can be set in the predetermined area (the destination field of the mail header or the mail main body) for sending the mail. Thus, at the Internet fax for relaying facsimile transfer, it is made possible to safely and reliably execute facsimile transfer communications using the P code related to the F code indicating the facsimile communication function.

Figure 8:
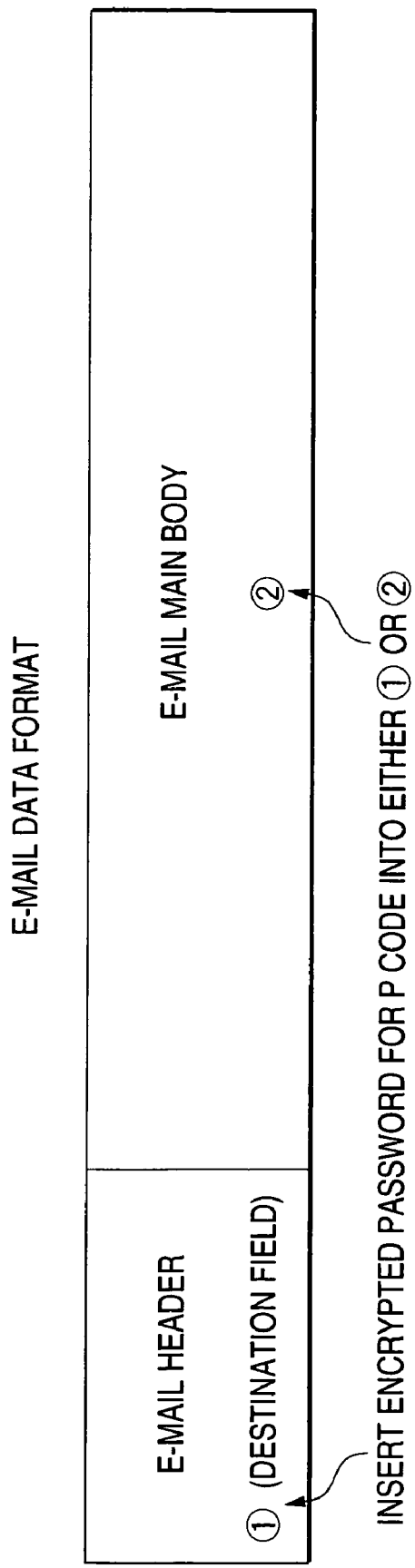
FIG. 8 is a drawing to show a format example of mail data used in the embodiment of the invention.

FIG. 8 is a drawing to show a format example of mail data used in the embodiment of the invention; particularly it shows insertion of the P code related to the F code for giving a facsimile transfer instruction to the Internet fax for relaying facsimile transfer.

As shown in FIG. 8, the P code related to the F code for giving a facsimile transfer control instruction in the invention is inserted into either (1) destination field (TO: field) of mail header portion or (2) main body of mail.

Thus, in the invention, the encrypted P code may be set not only in the TO: field as described above, but also in another area. That is, in the invention, it is also considered that the encrypted P code may be set in the main body of mail.

To do this, if the area to set the P code (namely, the destination field of the mail header or the mail main body) is previously determined at both transmitting and receiving parties of communications, the encrypted P code is set in the predetermined area at the transmitting party, whereby it can be fetched from the predetermined area for use at the mail receiving party.

Figure 9:
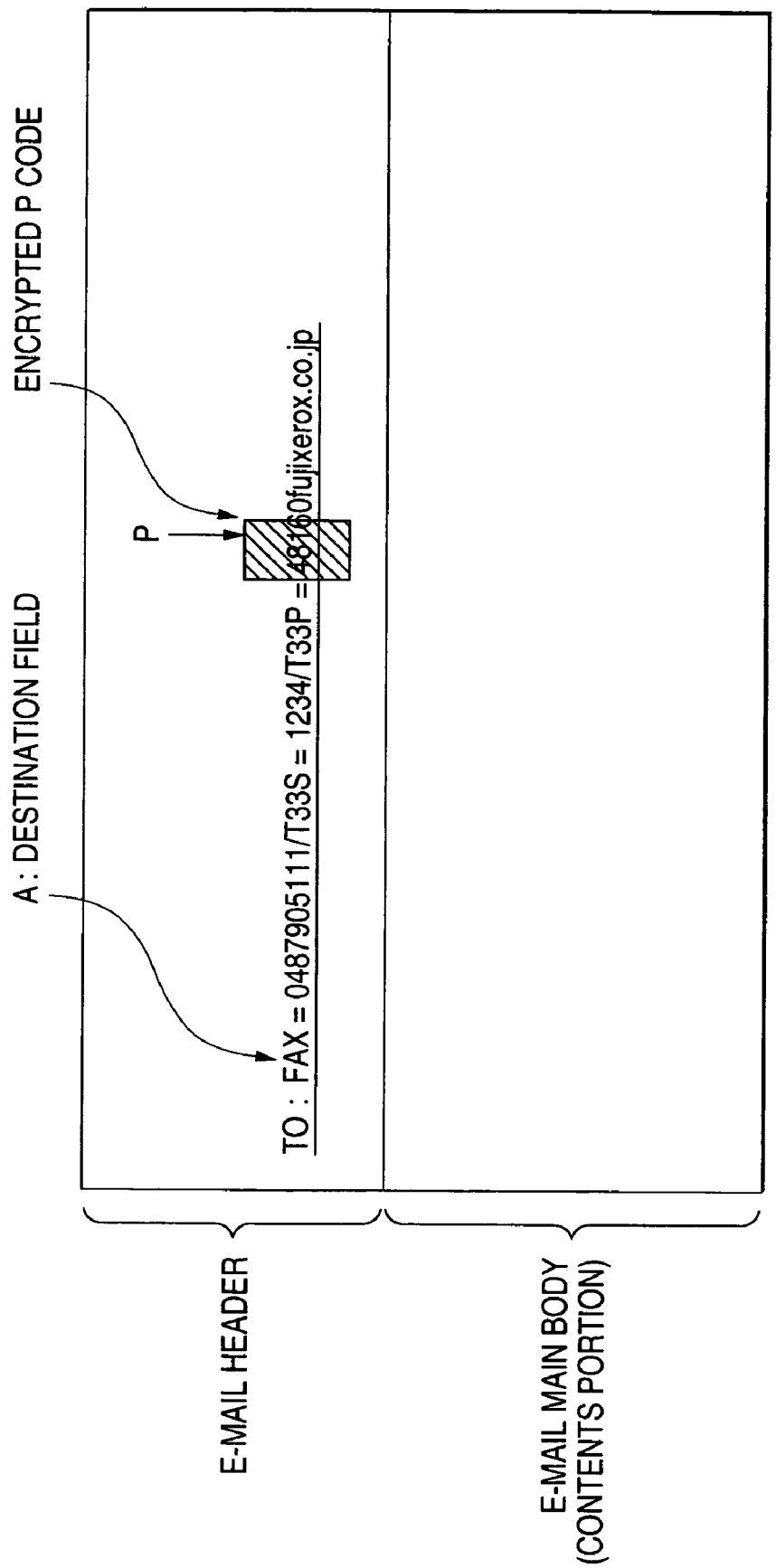
FIG. 9 is a drawing to show how the P code for the F code for giving a facsimile (fax) transfer control instruction is set in the destination field of the mail header portion shown in FIG. 8.

FIG. 9 is a drawing to show how the P code for the F code for giving a facsimile (fax) transfer control instruction is set in the destination field of the mail header portion shown above in FIG. 8.

As shown in FIG. 9, in this example, "TO: FAX=0487905111/T33S=1234/ T33P=4B16@fujixerox.co.jp" is set in the destination field A of the header portion of fax transfer mail.

This means transfer to the fax with 048-798-5111 using the machine having the host name ifax under the domain name fujixerox.co.jp. In this case, the description following T33S= means the F code (1234) and further in this case, the description following T33P= means the P code for the F code.

In the invention, the P code is previously encrypted and set to prevent a third party from fully viewing the P code in communications on the Internet.

That is, in the example, the description of "4B16" following T33P= is the encrypted P code. The cryptography key may be a secret key rather than a public key; in the invention, an encryption system of S/MIME (Secure/Multipurpose Internet Mail Extension) or PGP/MIME (Pretty Good Privacy/Multipurpose Internet Mail Extension) is used to encrypt the P code.

According to the configuration, although hitherto it has been impossible to access the mail box of the fax transfer destination because the P code cannot be transmitted, it is made possible to access the mail box of the fax transfer destination according to the invention. Of course, it is made possible to use not only the mail box, but also the functions of relay transfer and bulletin board related to F code communications.

The control command indicating the facsimile communication function described above in the embodiment (F code) is a command for indicating a confidential communication function, a bulletin board communication function, or a relay broadcast communication function defined in ITU-T (International Telecommunications Union-Telecommunications Standards Section) Recommendation T.30.

Next, a procedure of correctly identifying the transmission source for transfer will be discussed.

Generally, if a third party knows the fax number and the E-mail address of an Internet facsimile having the E-mail to Fax Gateway function, it is feared that they may be used for an evil purpose, and thus permission of the transmission destination to which a facsimile transfer request is made and permission of the transfer destination to which facsimile transfer is executed can be preset in the Internet facsimile, and a facsimile transfer request to the unpermitted transmission destination and facsimile transfer to the unpermitted transfer destination can be refused.

This kind of Internet facsimile may refuse facsimile transfer if an attached file cannot be expanded in the stipulated format, if the fax memory becomes full, or for any other reason.

Figures 10, 11:
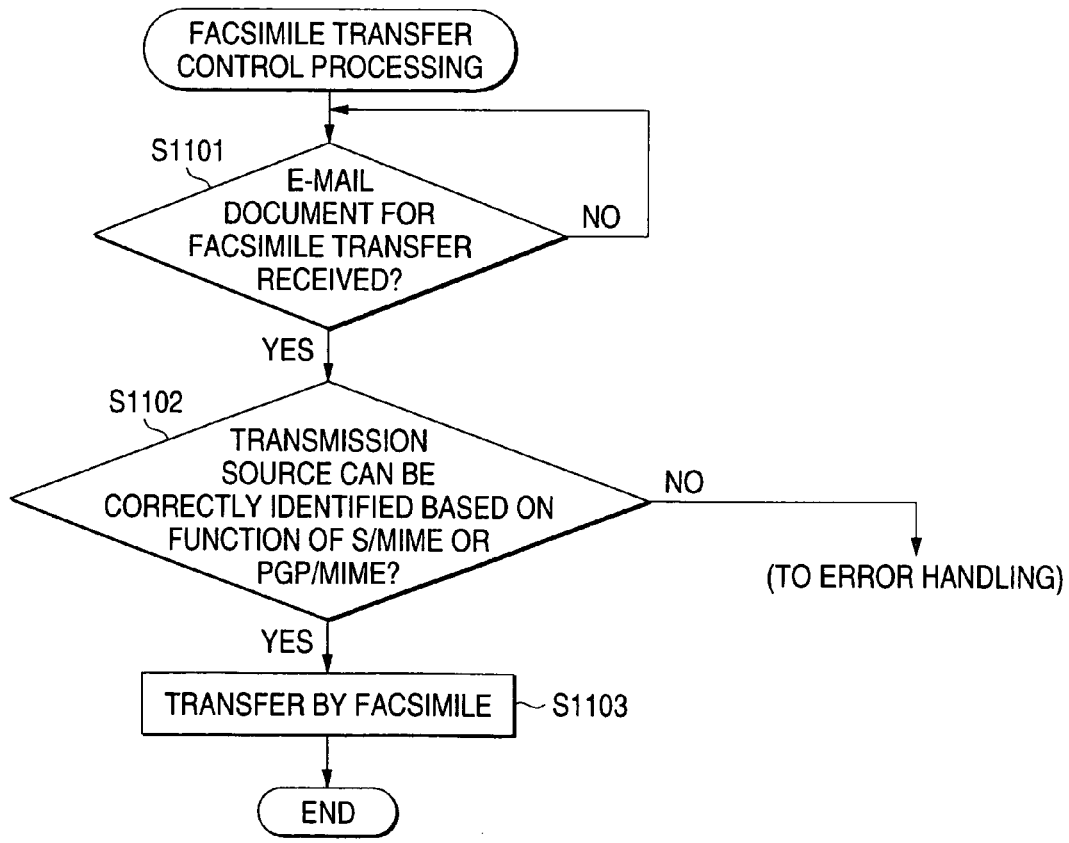
FIG. 10 is a drawing to show a format example of an abbreviated dialing registration table stored in RAM of the Internet fax shown in FIG. 2.
FIG. 11 is a flowchart to show a processing procedure of fax transfer control processing of the Internet fax shown above in FIG. 2.

FIG. 10 is a drawing to show a format example of an abbreviated dialing registration table 102*a* stored in the RAM 102 of the Internet facsimile 1 shown above in FIG. 2.

As shown in FIG. 10, the abbreviated dialing registration table 102*a* comprises an associated name information item 102*a*-2 indicating the name information of the party to communicate with and a destination information item 102*a*-3 indicating the destination information of the associated party (telephone number/mail address) in association with an abbreviated number information item 102*a*-1 indicating the abbreviated dialing information.

In the example, "FUJI TARO" as the associated name and "03-****-1234" as the destination information are entered in abbreviated number 1, and "FUJI HANAKO" as the associated name and "F.Hanako@fujixerox.co.jp" as the destination information are entered in abbreviated number 2.

FIG. 11 is a flowchart to show a processing procedure of fax transfer control processing of the Internet fax 1 shown above in FIG. 2; it shows the processing procedure for accepting fax transfer only if the transmission source can be correctly identified based on the function of S/MIME (Secure/ Multipurpose Internet Mail Extension), PGP/MIME (Pretty Good Privacy/Multipurpose Internet Mail Extension), etc., namely, the associated party can be correctly identified by Certification Agency (CA).

As shown in FIG. 11, the processing is started when the Internet fax 1 determines that it receives an E-mail document for fax transfer (YES at step S1101).

Next, the Internet fax 1 determines whether or not the transmission source of the received document can be correctly identified based on the function of S/MIME, PGP/ MIME, etc., (step S1102).

If the Internet fax 1 determines that the transmission source can be correctly identified (YES at step S1102), it executes fax transfer (step S1103). After the fax transfer terminates, the processing is terminated.

If the Internet fax 1 does not determine at step S1102 that the transmission source can be correctly identified (NO at step S1102), it performs error handling. For example, specifically a message indicating that the document cannot be accepted is sent to the transmission source.

According to the configuration, the fax transfer instruction is accepted only if the transmission source of the electronic mail document for fax transfer can be correctly identified based on the function of S/MIME, PGP/MIME, etc., namely, can be correctly identified by the Certification Agency (CA), so that illegal use (step) of fax transfer from any unidentified transmission source can be prevented and accordingly the Internet fax as a relay machine of the fax transfer can be prevented from suffering an enormous loss of the communication charge, etc., for the illegal use and it is made possible to use the Gateway function with safety.

Figure 12:
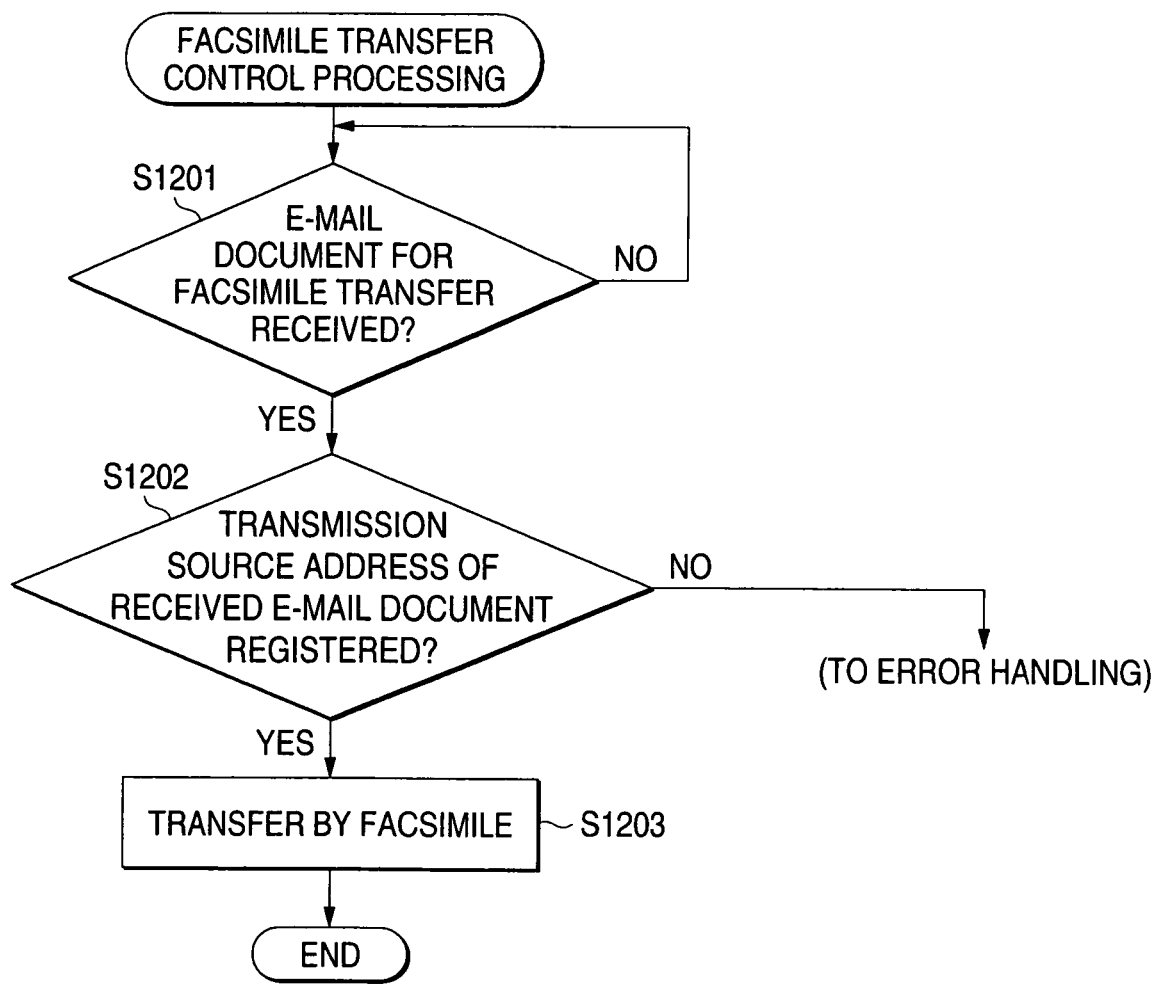
FIG. 12 is a flowchart to show a processing procedure in a different mode from the fax transfer control processing shown in FIG. 11.

FIG. 12 is a flowchart to show a processing procedure in a different mode from the fax transfer control processing shown above in FIG. 11; it shows the processing procedure for registering the mail address of the transmission source permitted for fax transfer and accepting only fax transfer from the registered transmission source in the Internet fax 1 for executing fax transfer.

As shown in FIG. 12, the processing is started when the Internet fax 1 determines that it receives an E-mail document for fax transfer (YES at step S1201).

Next, the Internet fax 1 determines whether or not the transmission source address of the received document is registered, namely, the transmission source is permitted for fax transfer (step S1202).

If the Internet fax 1 determines that the transmission source address of the received document is registered, namely, the transmission source is permitted for fax transfer (YES at step S1202), it executes fax transfer (step S1203). After the fax transfer terminates, the processing is terminated.

If the Internet fax 1 does not determine at step S1202 that the transmission source address of the received document is registered, namely, does not determine that the transmission source is permitted for fax transfer (NO at step S1202), it performs error handling. For example, specifically a message indicating that the document cannot be accepted is sent to the transmission source.

According to the configuration, the Gateway function is provided only for the specific associated party (transmission source) preset in the home machine, so that illegal use (step) of fax transfer from any unidentified transmission source can be prevented and accordingly the Internet fax as a relay machine of the fax transfer can be prevented from suffering an enormous loss of the communication charge, etc., for the illegal use and it is made possible to use the Gateway function with safety.

Figure 13:
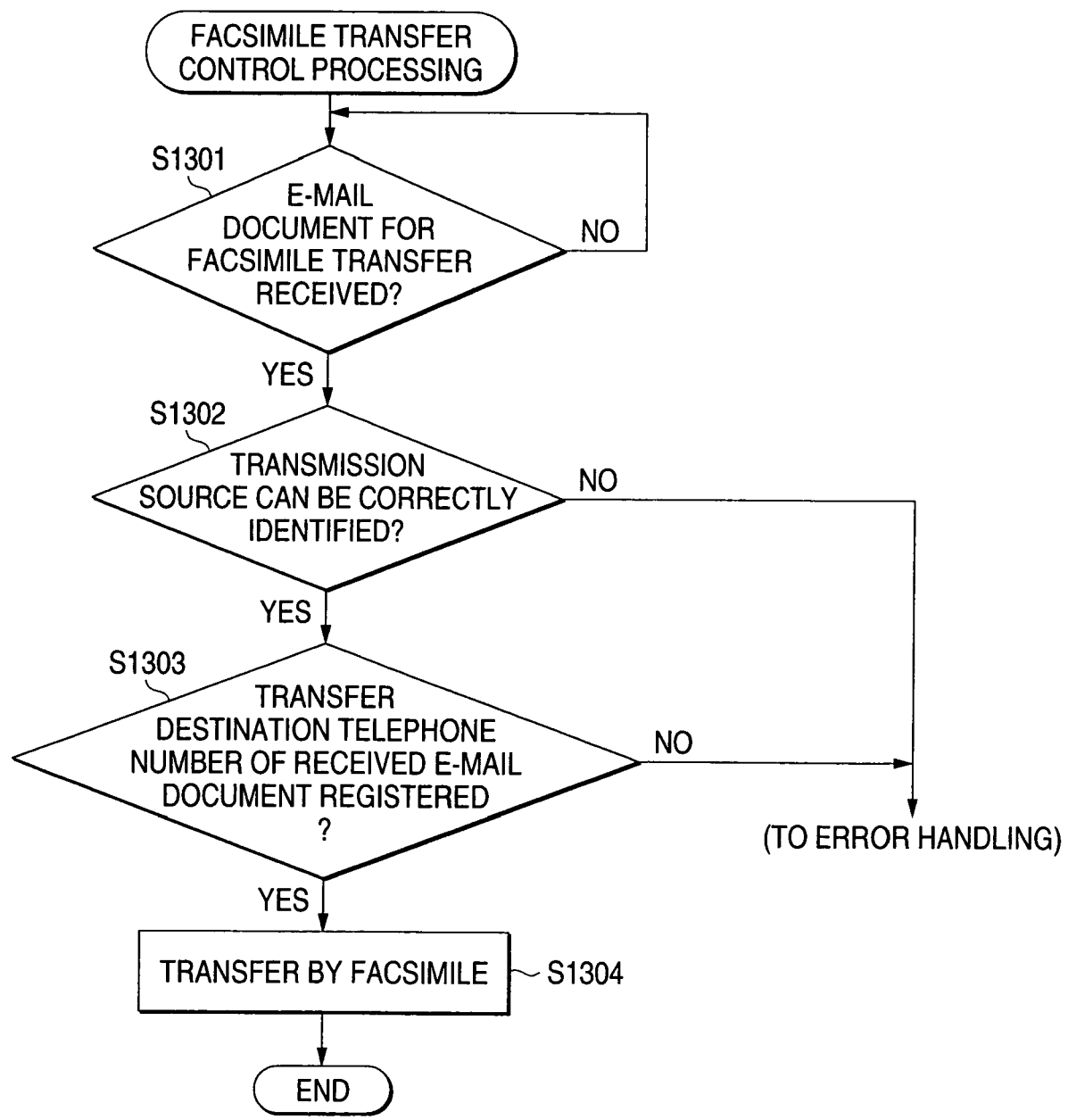
FIG. 13 is a flowchart to show a processing procedure in a different mode from the fax transfer control processing shown in FIG. 11.

FIG. 13 is a flowchart to show a processing procedure in a different mode from the fax transfer control processing shown above in FIG. 11; it shows the processing procedure for registering the telephone number of the transfer destination permitted as the fax transfer destination and accepting only the fax transfer instruction to the registered transfer destination if the transmission source can be correctly identified.

As shown in FIG. 13, the processing is started when the Internet fax 1 determines that it receives an E-mail document for fax transfer (YES at step S1301).

Next, the Internet fax 1 determines whether or not the transmission source can be correctly identified (step S1302). In this case, the determination is made by a similar method to that of the determination at step S1102 previously described with reference to FIG. 11 or at step S1202 previously described with reference to FIG. 12.

If the Internet fax 1 determines that the transmission source can be correctly identified (YES at step S1302), then it determines whether or not the telephone number of the transfer destination of the received document is registered, namely, the fax transfer instruction is that to the transfer destination permitted as the fax transfer destination (step S1303).

If the Internet fax 1 determines that the telephone number of the transfer destination of the received document is registered, namely, the fax transfer instruction is that to the transfer destination permitted as the fax transfer destination (YES at step S1303), it executes fax transfer (step S1304). After the fax transfer terminates, the processing is terminated.

If the Internet fax 1 does not determine at step S1302 that the transmission source can be correctly identified (NO at step S1302) and does not determine at step S1303 that the telephone number of the transfer destination of the received document is registered, namely, does not determine that the fax transfer instruction is that to the transfer destination permitted as the fax transfer destination (NO at step S1303), it performs error handling. For example, specifically a message indicating that the document cannot be accepted is sent to the transmission source.

According to the configuration, the Gateway function is provided only for the fax transfer instruction to the specific transfer destination preset in the home machine if the transmission source can be identified, so that communications in the closed world (closed communications) can be conducted and security can be easily provided.

In the embodiment, the associated parties to communicate with, registered in the abbreviated dialing registration table are determined to be the transmission source permitted for fax transfer and the transfer destination permitted as the fax transfer destination, so that the operator does not require additional memory or additional setting and security can be easily provided.

The embodiment has been described using the abbreviated dialing registration table, but the invention is not limited to it; aside from the abbreviated dialing registration table, a table for registering the mail addresses of the transmission sources permitted for fax transfer and a table for registering the telephone numbers of the transfer destinations permitted as the fax transfer destinations may be provided separately for controlling fax transfer.

FIG. 14 shows an output example of E-mail printed when the Internet facsimile according to the invention refuses facsimile transfer in the E-mail To Fax Gateway function.

The E-mail is made up of the reason why the facsimile transfer is refused, the header portion and the main body of the received E-mail and an attached file to the received E-mail.

Figure 15:
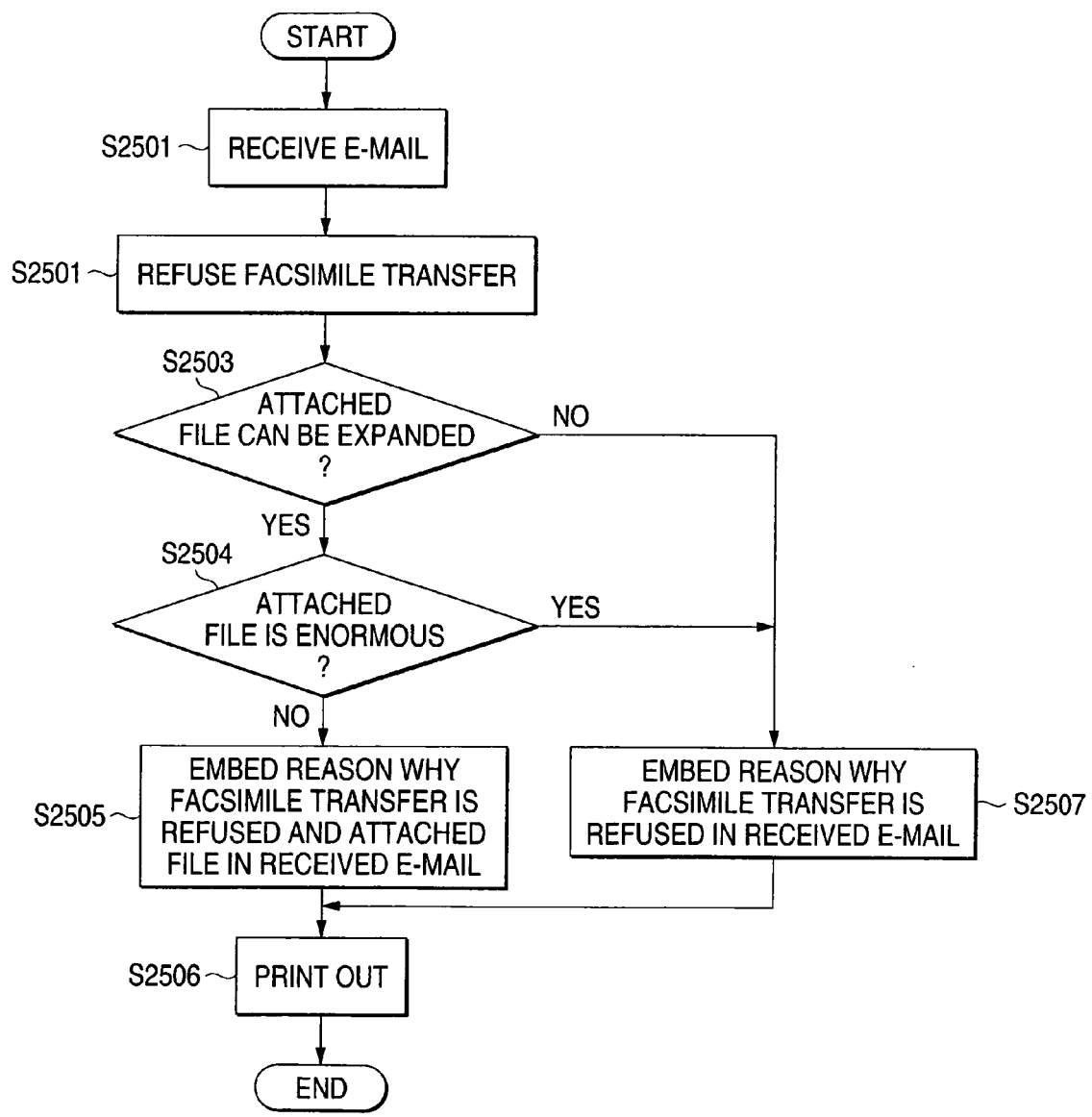
FIG. 15 is a flowchart to show a processing procedure of printing received E-mail when the Internet facsimile according to the invention refuses facsimile transfer in the E-mail To Fax Gateway function.

A processing procedure of printing received E-mail when the Internet facsimile according to the invention refuses facsimile transfer in the E-mail To Fax Gateway function will be discussed with reference to a flowchart of FIG. 15.

The Internet facsimile receives E-mail (step S2501) and refuses facsimile transfer for some reason (step S2502) and checks whether or not the attached file to the received E-mail can be expanded in a stipulated format (step S2503). If the attached file can be expanded in the stipulated format (YES at step S2503), the Internet facsimile checks whether or not the capacity of the attached file is enormous (step S2504). If the capacity of the attached file is not enormous (No at step S2504), the Internet facsimile embeds the reason why the facsimile transfer is refused and the expanded attached file in the received E-mail (step S2505), prints out (step S2506), and terminates the processing procedure.

If the attached file cannot be expanded in the stipulated format (NO at step S2503) or if the capacity of the attached file is enormous (YES at step S2504), the Internet facsimile embeds the reason why the facsimile transfer is refused in the received E-mail (step S2507), prints out (step S2506), and terminates the processing procedure.

When the attached file is enormous, if all the enormous attached file is expanded, embedded in the E-mail, and printed out, record paper is wasted and thus only the reason why the facsimile transfer is refused is embedded in the E-mail.

The printed-out E-mail notifies the operator of the Internet facsimile of the reason why the facsimile transfer is refused.

Next, a procedure for transferring E-mail containing an attached file will be discussed.

Figure 16:
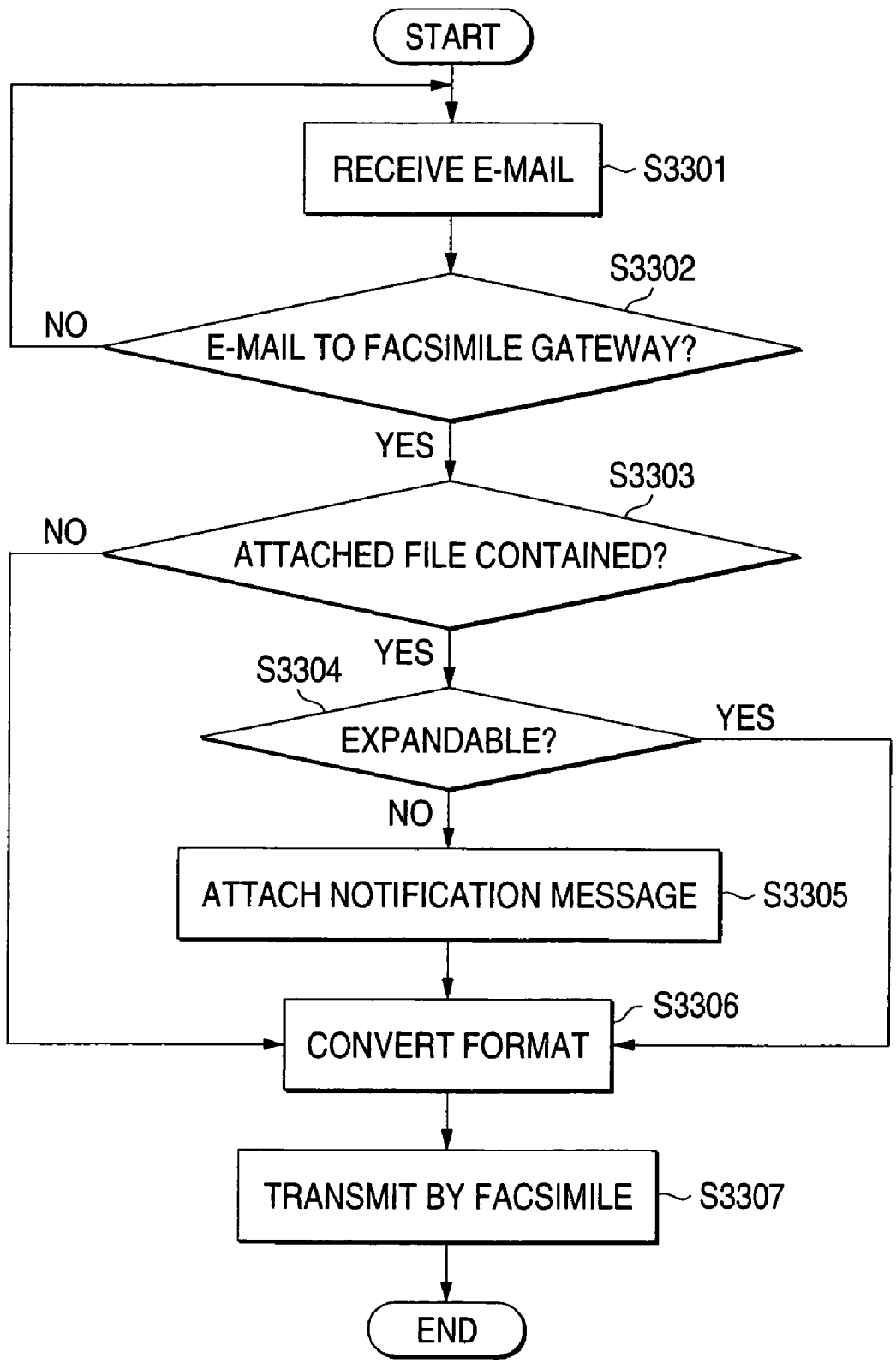
FIG. 16 is a flowchart to show the operation of the Internet fax in the embodiment.

In FIG. 16, when the Internet fax receives E-mail via the Ethernet I/F and the network control section (step S3301), the system control section determines whether or not the E-mail To Fax Gateway function is to be used for the received E-mail (step S3302). To make this determination, a method of indicating a transfer instruction, such as a method of entering the telephone number of the fax of the transfer destination (01-2345-6789) in the E-mail address like "FAX=+0123456789@XXX.co.jp" or a method of entering the telephone number in the subject of E-mail, is predetermined and whether or not the received E-mail contains information concerning the transfer instruction (indication) is checked.

If it is not determined that the E-mail To Fax Gateway function is to be used (No at step S3302), processing of printing out the E-mail, etc., is performed and a wait is made for receiving another piece of E-mail.

If it is determined that the E-mail To Fax Gateway function is to be used (YES at step S3302), whether or not a file is attached to the E-mail is determined (step S3303). If no file is attached (NO at step S3303), the E-mail is converted into the fax transmission format (step S3306).

If it is determined that a file is attached (YES at step S3303), whether or not the attached file is in an expandable file format is determined (step S3304). If it is determined that the attached file is in an expandable file format (YES at step S3304), the attached file is expanded and the expanded attached file and the E-mail are converted into the fax transmission format (step S3306).

If it is not determined that the attached file is in an expandable file format (NO at step S3304), the file that cannot be expanded is discarded and a notification message indicating that a file that cannot be expanded is attached is attached to the main body of the E-mail (step S3305) and the notification message and the E-mail are converted into the fax transmission format (step S3306).

Whether or not the attached file can be expanded can be determined by a method of determining whether or not the file format of the attached file corresponds to a predetermined format (for example, TIFF-FX, TEXT) and determining that the attached file can be expanded if the file format corresponds to the predetermined format.

The E-mail, etc., converted into the fax transmission format is transferred to the specified fax (step S3307).

If a plurality of files are attached to E-mail, the file format is checked for each attached file. A file that can be expanded is expanded and for a file in an unexpandable file format, a notification message is attached instead of the file. The E-mail, etc., is converted into the fax transmission format (step S3306) and transmitted by fax (step S3307).

In the embodiment, if the attached file is in an unexpandable file format, a notification message indicating that a file in an unexpandable file format is attached is attached to the main body instead of the attached file for transmission by fax. However, instead of the notification message, protocol can also be used to send a notification to the fax of the transmission destination.

If a file in an unexpandable file format is attached, a file transfer protocol section may be used to transfer the received attached file intact to the fax of the transfer destination in binary format.

In the configuration, the attached file can be processed at the fax of the transfer destination and thus even if the attached file cannot be expanded at the Internet fax for relaying E-mail, the attached file transmitted from the E-mail transmitting person can be all received at the transfer destination.

Further, the E-mail transmitting person can use the attached file in the file format that can be expanded only in the fax of the transfer destination and thus security can also be enhanced.

To determine whether or not the file attached to E-mail can be expanded (step S3304), if a file in an expandable file format does not exist, when the notification message is attached to the main body (step S3305), the main body of the E-mail is discarded, whereby only the header of the E-mail and the notification message can also be transmitted by fax to the transmission destination if the E-mail does not contain any file in an expandable file format.

In the configuration, the person at the transmission destination can be informed where E-mail containing a file in an unexpandable file format is transmitted from in a small information amount.

Figure 17:
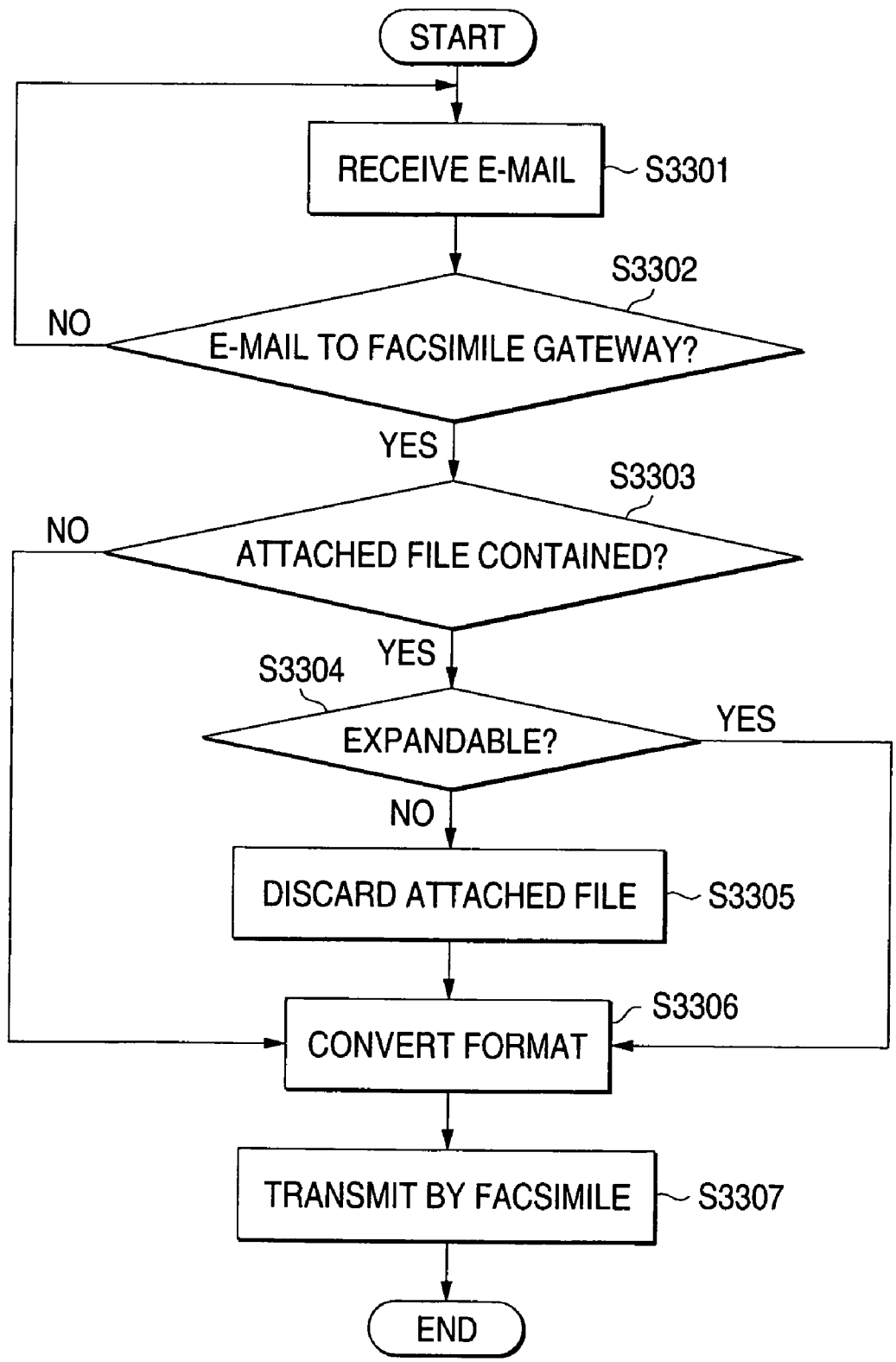
FIG. 17 is a flowchart to show the operation of the Internet fax in the embodiment.

If it is not determined that the attached file is in an expandable file format (NO at step S3304), the file that cannot be expanded can also be discarded (step S3308), as shown in FIG. 17.

In the configuration, expandable files of attached files can be transferred, so that the information that can be transferred using fax transmission can be transferred at the maximum.

Upon reception of E-mail containing an attached file that cannot be expanded, the Internet fax 1 (75) may send the E-mail to the file conversion center 400 so as to expand the attached file in the conversion server 413 in the file conversion center 400.

Figure 18:
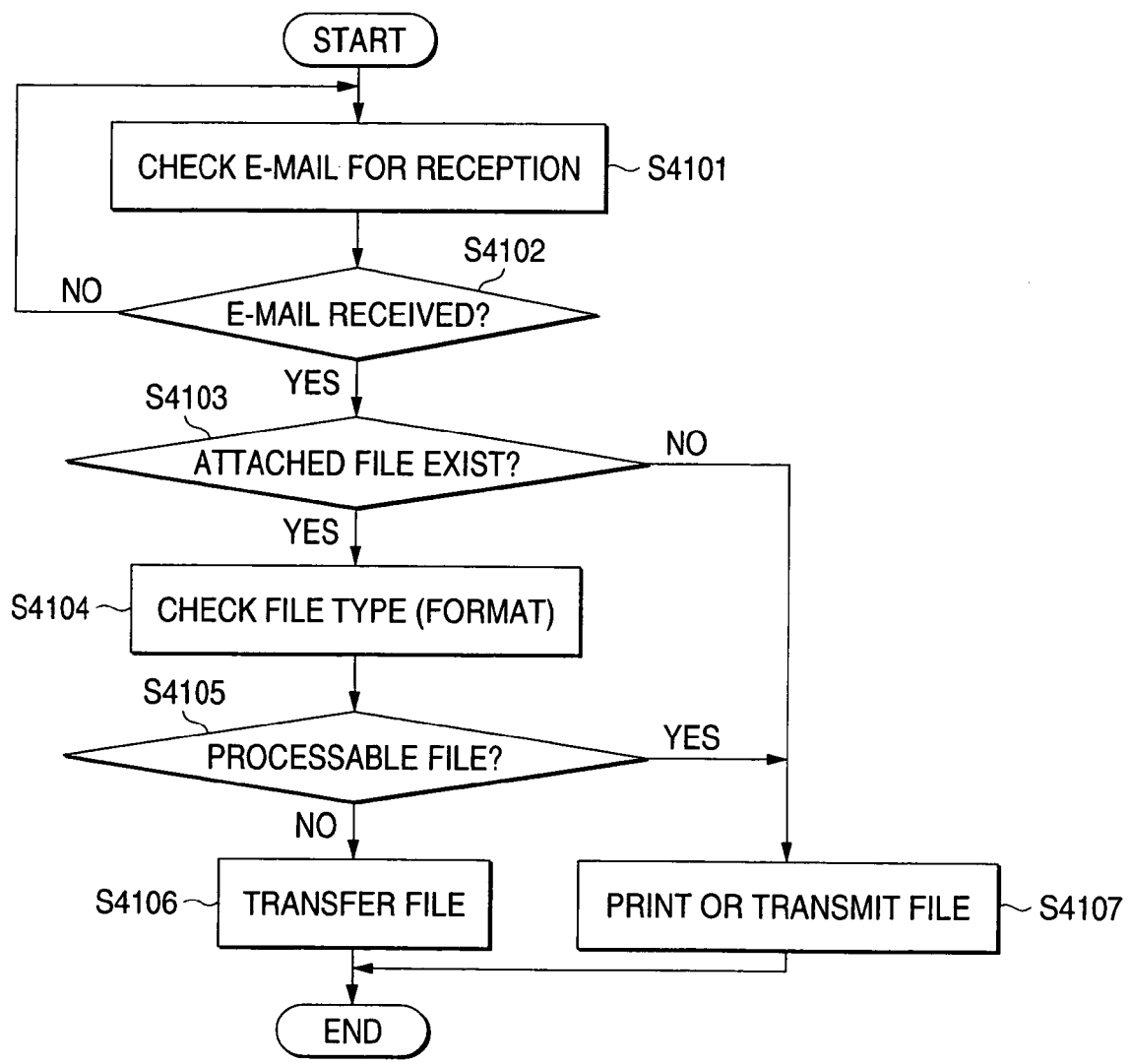
FIG. 18 is a flowchart to show an operation flow when the Internet fax 1 (75) receives E-mail.

FIG. 18 is a flowchart to show an operation flow when the Internet fax 1 receives E-mail.

The Internet fax 1 (75) accesses the mail server (connected to the LAN to which the fax 1 (75) is connected or the Internet 6) for checking whether or not E-mail addressed to the fax 1 (75) exists (step S4101, NO at step S4102) except in the case where the Internet fax 1 (75) contains a mail server function.

If E-mail addressed to the fax 1 (75) exists (YES at step S4102), the Internet fax 1 (75) checks whether or not an attached document exists. If an attached document exists (YES at step S4103), the Internet fax 1 (75) checks the attached document for file type (format) (step S4104).

If the attached document is a file that cannot be processed (step S4105), it is transferred to the file conversion center 400 by E-mail (step S4106).

On the other hand, if the received E-mail does not contain any attached document (NO at step S4103) or if the attached document can be processed (YES at step S4105), the Internet fax 1 (75) prints the document or transmits the document by fax (step S4107).

In the transfer process at step S4106, certificate information certifying the identity in S/MIME, etc., is attached to the E-mail to be transferred or the E-mail and the attached file thereto are encrypted as required. The certificate information is attached if it is necessary to certify the identity under contract with the file conversion center 400. All pieces of E-mail and all attached file may be encrypted or encryption may be applied for transfer only if the received E-mail is encrypted.

If the received E-mail is confidential mail addressed to a specific user (to be stored in the confidential box), the E-mail can also be specified so that it is not transferred to the file conversion center 400.

Figures 19, 20:
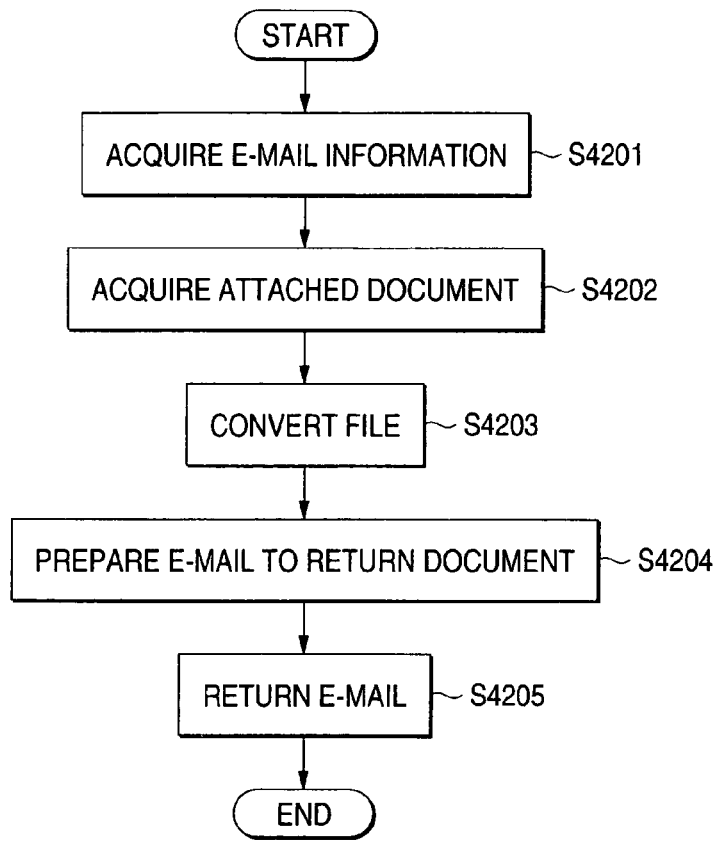
FIG. 19 is a flowchart to show an operation flow of a conversion server 413.
FIG. 20 is a drawing to show an example of logs recorded in a log DB 414.

Next, the operation of the file conversion center 400 (conversion server 413) will be discussed. FIG. 19 is a flowchart to show an operation flow of the conversion server 413.

When the mail server 412 receives E-mail, the conversion server 413 acquires the E-mail, acquires mail information of the header, etc., (step S4201), and acquires an attached document (step S4202).

Subsequently, the acquired attached document is checked for format and is converted into a prespecified file format (step S4203). The prespecified file format is the format determined under contract with the manager of the Internet fax 1 (75) and is the file format that can be processed in the Internet fax 1 (75). Since the file format may vary in specification from one contractor to another, the conversion server 413 checks the mailer of the E-mail from the mail information acquired at step S4201 and determines the file format.

At the termination of the file format conversion, the conversion server 413 prepares E-mail to return the converted document to the Internet fax 1 (75) based on the mail information acquired at step S4201 (step S4204) and returns the E-mail through the mail server 412 (step S4205). If the mail information acquired at step S4201 contains information used by the Internet fax 1 (75) for processing, the E-mail to return the document is prepared so as to contain the information. An example of the information used by the Internet fax 1 (75) for processing is information indicating that the original E-mail is confidential mail for a specific user (to be stored in the confidential box); the information is contained in the E-mail to return the document, whereby the Internet fax 1 (75), which receives the E-mail to return the document, can store the post-converted document in the confidential box.

Since the document in the file format that can be processed is attached to the E-mail, the Internet fax 1 (75) receiving the E-mail performs processing in the order of steps S4101, S4102, S4103, S4104, S4105, and S4107 previously described for printing the document or transmitting the document by fax.

By the way, the conversion server 413 records various pieces of information when processing of file conversion, etc., is performed in the log DB 414 as logs. The record contents are the processing date and time, the address of the transmitting party (Internet fax 1 (75)), the converted file type, the file size, etc., for example, as shown in FIG. 20.

The file conversion service is charged based on the log recorded in the log DB 414. The file conversion service can be charged based on the size of each converted file, the number of converted files, the converted file type, etc. In addition, the user may be charged a constant amount for each predetermined time period independently of the actually executed conversion contents.

In the file conversion center 400, an advertisement, etc., may be used to execute file conversion free of charge or at a reduced price.

Figure 21:
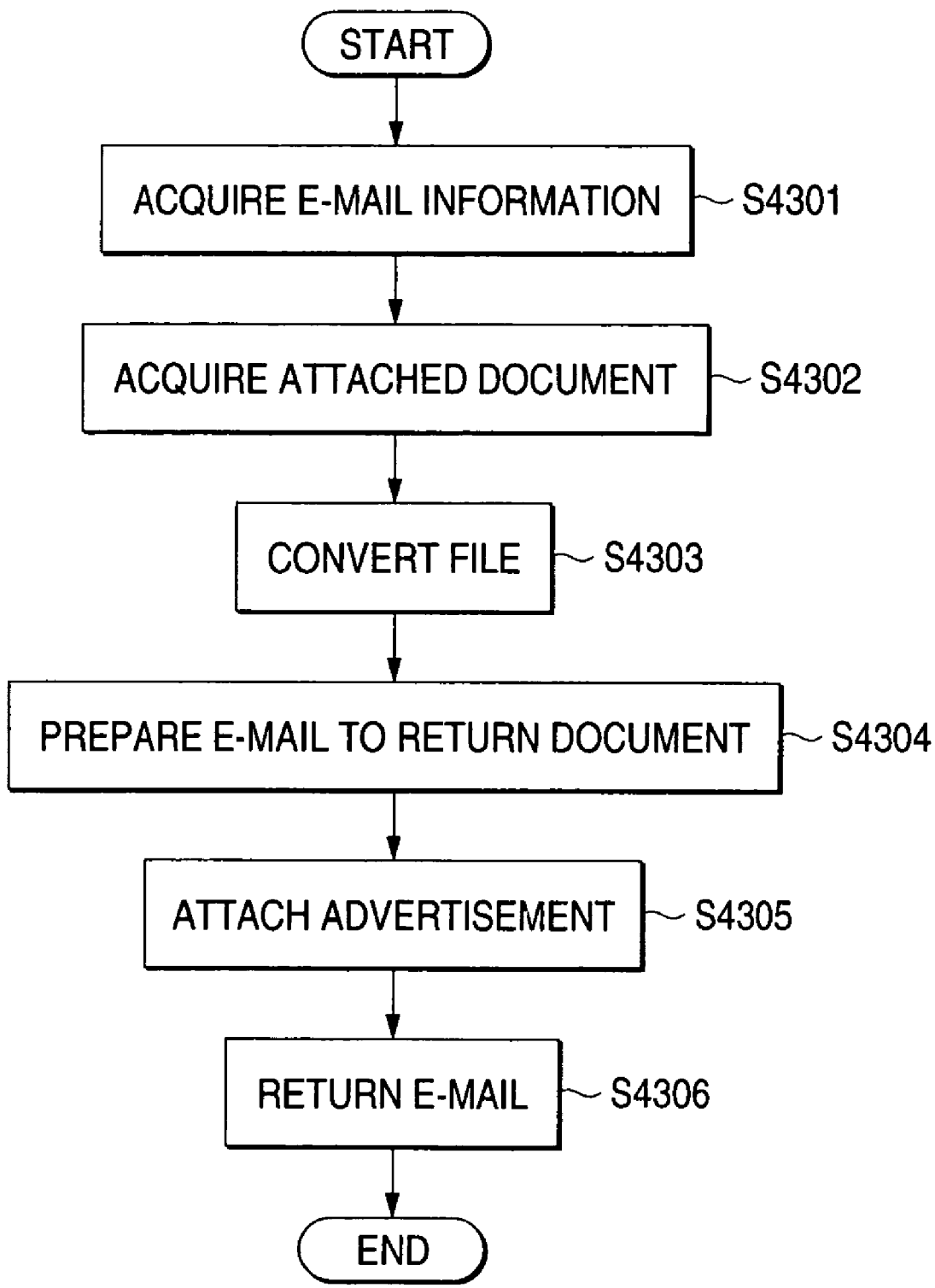
FIG. 21 is a flowchart to show an operation flow of the conversion server 413 to use an advertisement.

FIG. 21 is a flowchart to show an operation flow of the conversion server 413 to use an advertisement.

When the mail server 412 receives E-mail, the conversion server 413 acquires the E-mail, acquires mail information of the header, etc., (step S4301), and acquires an attached document (step S4302).

Subsequently, the acquired attached document is checked for format and is converted into a prespecified file format (step S4303). The prespecified file format is the format determined under contract with the manager of the Internet fax 1 (75) and is the file format that can be processed in the Internet fax 1 (75). Since the file format may vary in specification from one contractor to another, the conversion server 413 checks the mailer of the E-mail from the mail information acquired at step S4301 and determines the file format.

At the termination of the file format conversion, the conversion server 413 prepares E-mail to return the converted document to the Internet fax 1 (75) based on the mail information acquired at step S4301 (step S4304) and attaches an advertisement to the E-mail (step S4305). The attached advertisement may be the main body of the E-mail or an attached document thereto.

The conversion server 413 returns the E-mail to which the advertisement is attached through the mail server 412 (step S4306).

By the way, the Internet fax 1 (75) may attach certificate information certifying the identity to the E-mail to be transferred to the file conversion center 400, as described above. Then, the operation of the file conversion server 413 for this purpose will be discussed. In the description given above, E-mail to be transferred is encrypted; the encryption itself is the same as that in the related art and will not be discussed here.

Figure 22:
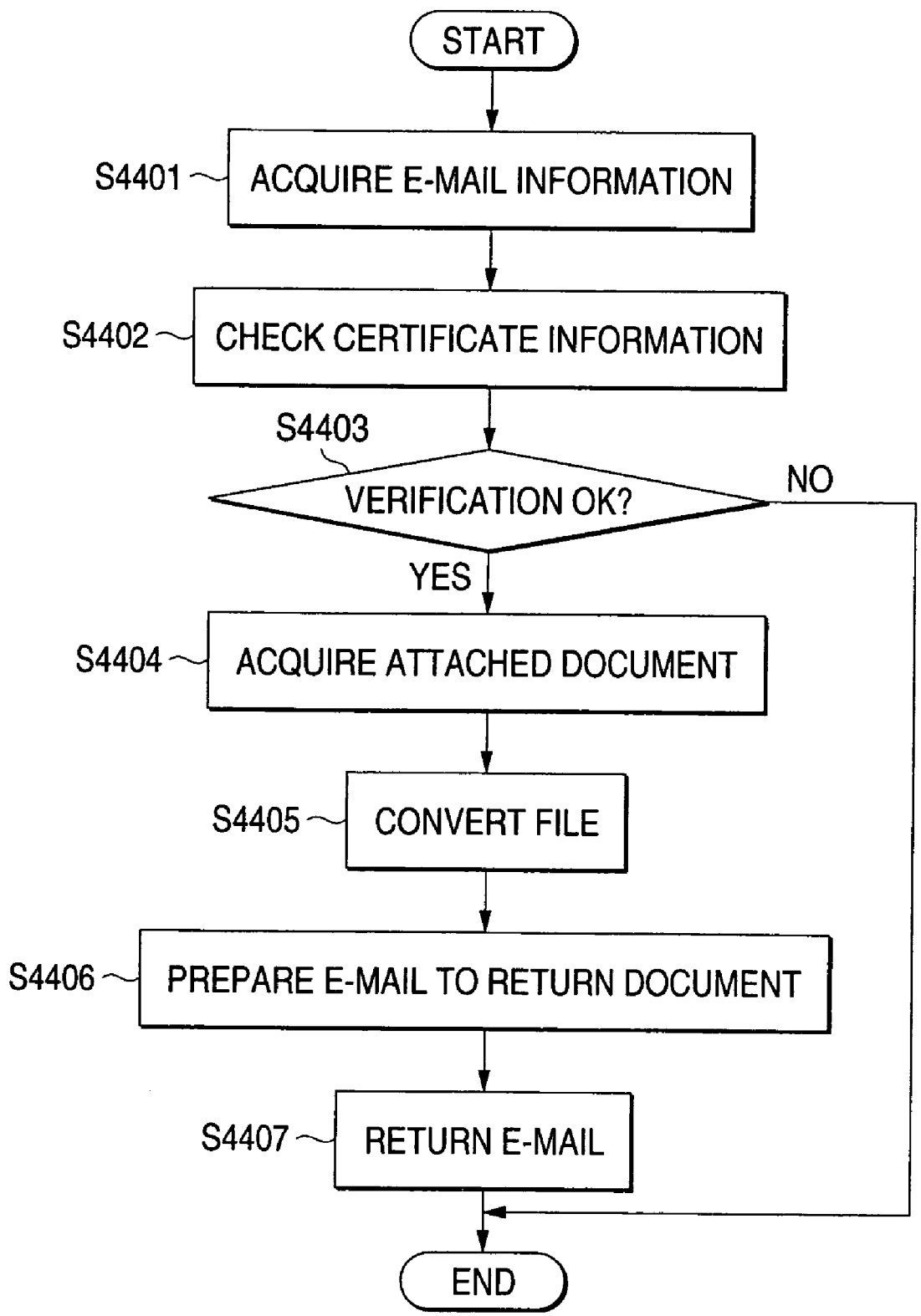
FIG. 22 is a flowchart to show an operation flow of the conversion server 413 when certificate information is attached.

FIG. 22 is a flowchart to show an operation flow of the conversion server 413 when certificate information is attached.

When the mail server 412 receives E-mail, the conversion server 413 acquires the E-mail, acquires mail information of the header, etc., (step S4401), and checks certificate information (step S4402).

If the identify is verified and it is determined that the E-mail is mail from the Internet fax 1 (75) previously signing (YES at step S4403), the conversion server 413 acquires an attached document (step S4404).

Subsequently, the acquired attached document is checked for format and is converted into a prespecified file format (step S4405). The prespecified file format is the format determined under contract with the manager of the Internet fax 1 (75) and is the file format that can be processed in the Internet fax 1 (75). Since the file format may vary in specification from one contractor to another, the conversion server 413 checks the mailer of the E-mail from the mail information acquired at step S4401 and determines the file format.

At the termination of the file format conversion, the conversion server 413 prepares E-mail to return the converted document to the Internet fax 1 (75) based on the mail information acquired at step S4401 (step S4406) and returns the E-mail to which the document is attached through the mail server 412 (step S4407).

On the other hand, if the identify cannot be verified based on the certificate information or it is determined that the E-mail is mail from any other person than the contractor (NO at step S4403), the subsequent processing is not performed.

The file conversion center 400 provides file format conversion service and can also provide service of storing the post-converted document or the original document in the file DB 415 for responding to a resend request from the Internet fax 1 (75). In this case, the E-mail to return the post-converted document is given an identification number to identify the document and the document is stored in the file DB 415 in association with the identification number.

Figure 23:
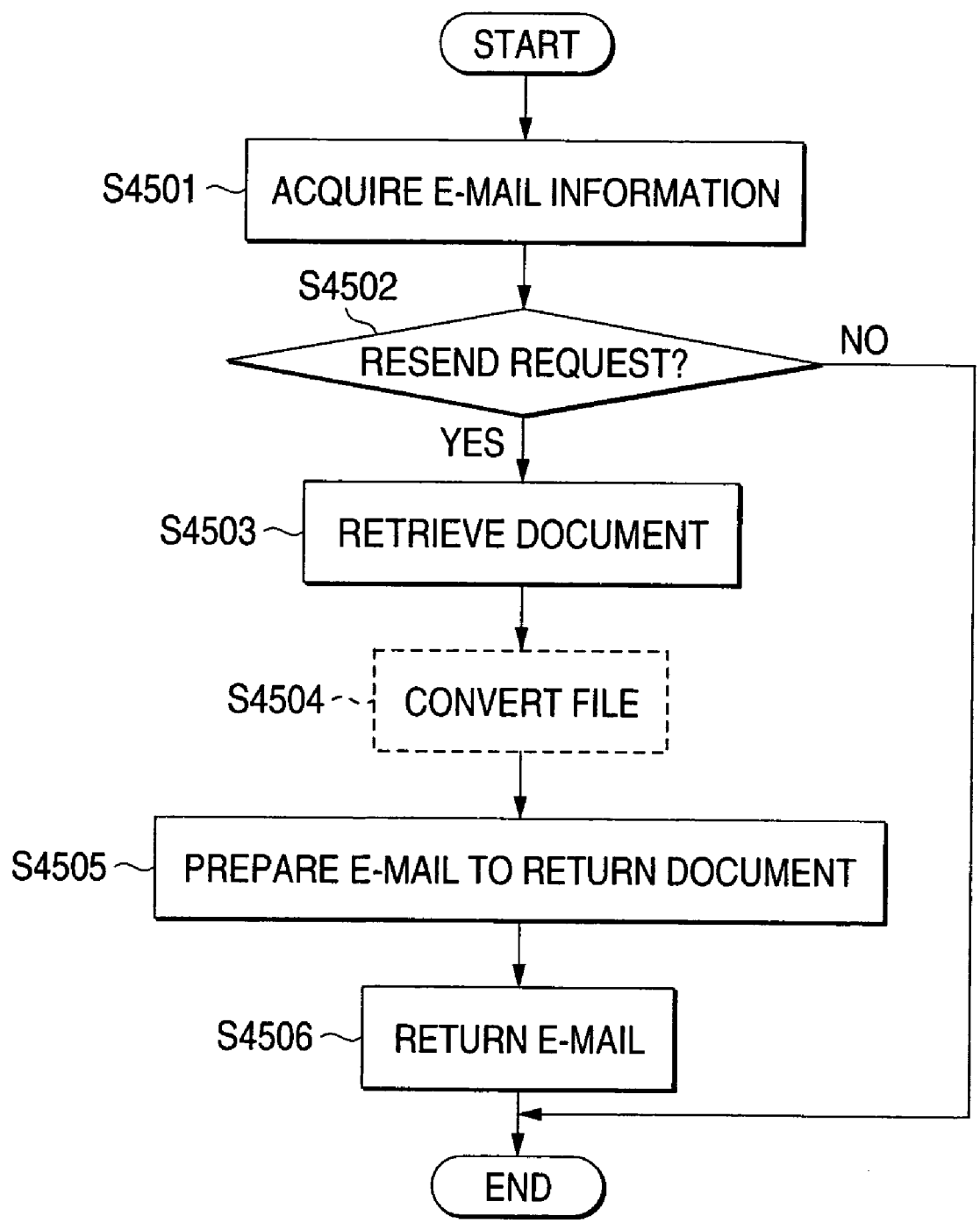
FIG. 23 is a flowchart to show an operation flow of the conversion server 413 when a request to resend a document is made.

FIG. 23 is a flowchart to show an operation flow of the conversion server 413 when a request to resend a document is made.

When the mail server 412 receives E-mail, the conversion server 413 acquires the E-mail, acquires mail information of the header, etc., (step S4501).

If the E-mail is a request to resend a document (YES at step S4502), the conversion server 413 retrieves the specified document from the file DB 415 based on the identification information contained in the mail information acquired at step S4501.

Subsequently, the found document is acquired and is checked for format. If the document is stored in any other file format than the prespecified file format, it is converted into the prespecified file format (step S4505).

At the termination of the file format conversion, the conversion server 413 prepares E-mail to return the (post-converted) document to the Internet fax 1 (75) based on the mail information acquired at step S4501 (step S4505) and returns the E-mail to which the document is attached through the mail server 412 (step S4506).

Figure 24:
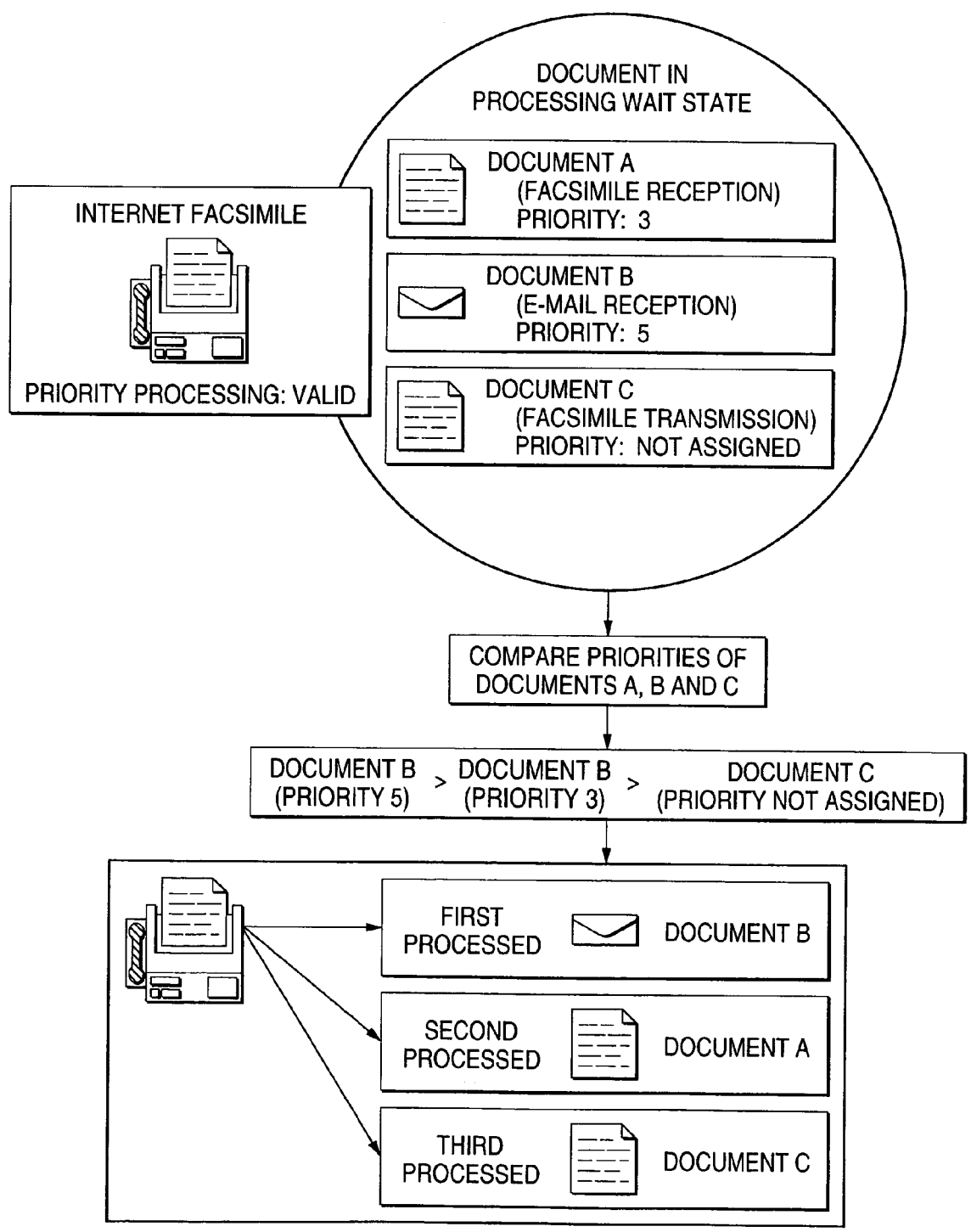
FIG. 24 is a drawing to show a processing procedure based on the priority if a plurality of documents enter a processing wait state in the Internet fax according to the invention.

Next, a method of performing processing based on the priority specified in each document if a plurality of documents wait for processing will be discussed. FIG. 24 is a drawing to show a processing procedure based on the priority if a plurality of documents enter a processing wait state in the Internet fax according to the invention.

Three documents of A, B, and C are placed in a processing wait state in the Internet fax in FIG. 24. The document A is in a print wait state as fax reception and has priority set to 3. The document B is in a print wait state as E-mail reception and has priority set to 5. The document C is in a fax transmission wait state as facsimile reception and has no priority assigned. The priority levels are set to 1 to 5; the priority 1 is the lowest level and the priority 5 is the highest level.

Since priority processing setting in the Internet fax is effective, the priorities of the documents A, B, and C in the processing wait state are as follows: Document B (priority 5)>document A (priority 3)>document C (no priority), wherein the priority of the document C having no priority assigned is lower than priority 1.

The Internet fax processes the documents in the priority order, namely, in the order of the document B, the document A, and the document C.

Figure 25:
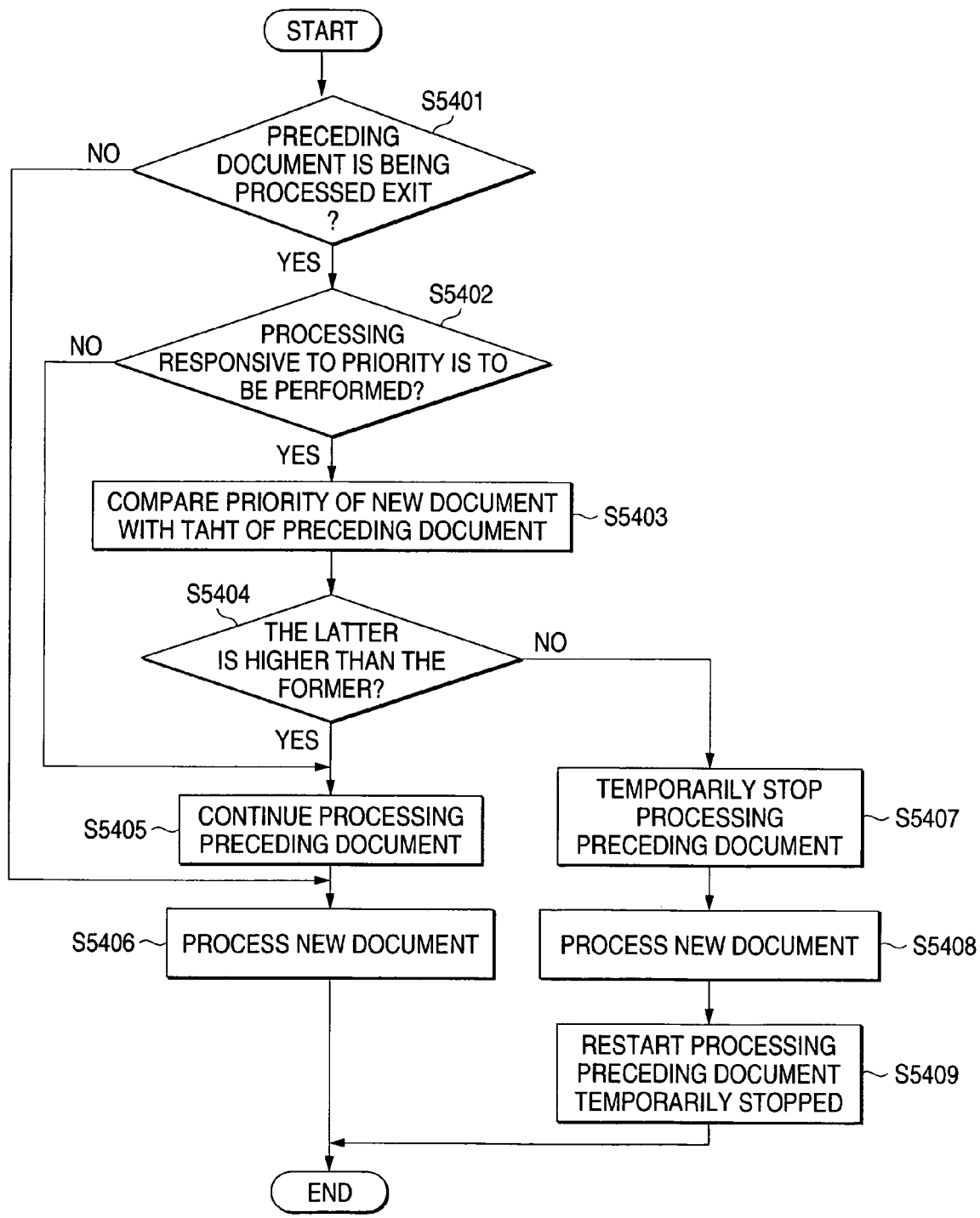
FIG. 25 is a flowchart to show an operation flow when the Internet fax during document processing receives a new document processing request.

A processing procedure when the Internet fax while the CPU 101 shown in FIG. 2 is performing document processing receives a new document processing request will be discussed with reference to a flowchart of FIG. 25.

When a new document processing request is received, whether or not the preceding document being processed exists in the Internet fax is checked (step S5401). If the preceding document being processed does not exist (NO at step S5401), a new document is processed (step S5406) and the processing procedure is terminated.

If the preceding document being processed exists (YES at step S5401), whether or not priority processing setting in the Internet fax is effective is checked (step S5402). If priority processing setting is ineffective (NO at step S5402), processing the preceding document is continued intact (step S5405) and when processing the preceding document terminates, a new document is processed (step S5406) and the processing procedure is terminated.

If priority processing setting is effective (YES at step S5402), the priority of a new document is compared with that of the preceding document (step S5403). If the latter is higher than the former (YES at step S5404), processing the preceding document is continued (step S5405) and when processing the preceding document terminates, a new document is processed (step S5406) and the processing procedure is terminated.

If the priority of the new document is higher than that of the preceding document (No at step S5404), processing the preceding document is temporarily stopped (step S5407) and the new document is processed (step S5408). When processing the new document terminates, subsequently processing the preceding document temporarily stopped is restarted (step S5409) and the processing procedure is terminated.

Whether or not processing responsive to the priority is made effective in the Internet fax according to the invention can be specified.

Figure 26:
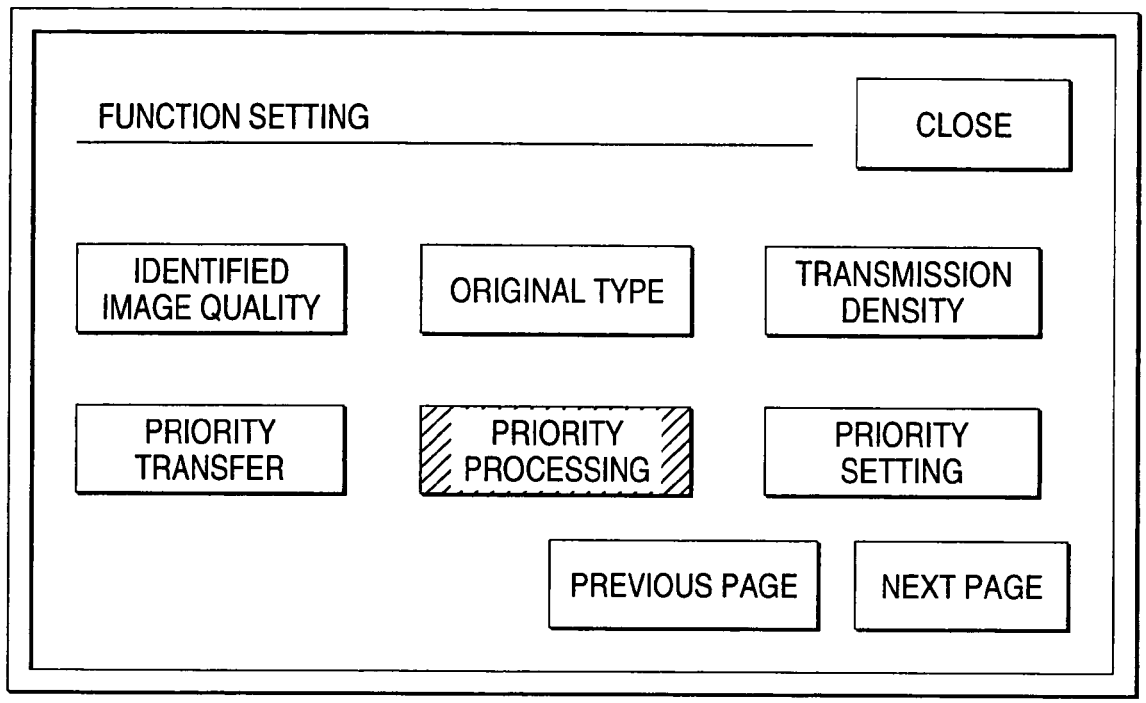
FIG. 26 is a drawing to show a configuration example of a function setting screen displayed on an operation and display section of the Internet fax.

FIG. 26 is a drawing to show a configuration example of a function setting screen displayed on the operation and display section 103 of the Internet fax shown above in FIG. 2.

As shown in FIG. 26, various functions of the Internet fax can be entered through the function setting screen and whether or not processing responsive to the priority is made effective can also be specified.

In the configuration example, a priority processing display part is highlighted and thus the priority processing function is made effective. To make the priority processing function ineffective, if the priority processing display part is pressed, it is not highlighted, meaning that the priority processing function becomes ineffective.

To execute fax transmission or Internet fax transmission, the Internet fax according to the invention enables the operator to specify the priority of each document as well as enter the transmission destination of the document, etc.

Figure 27:
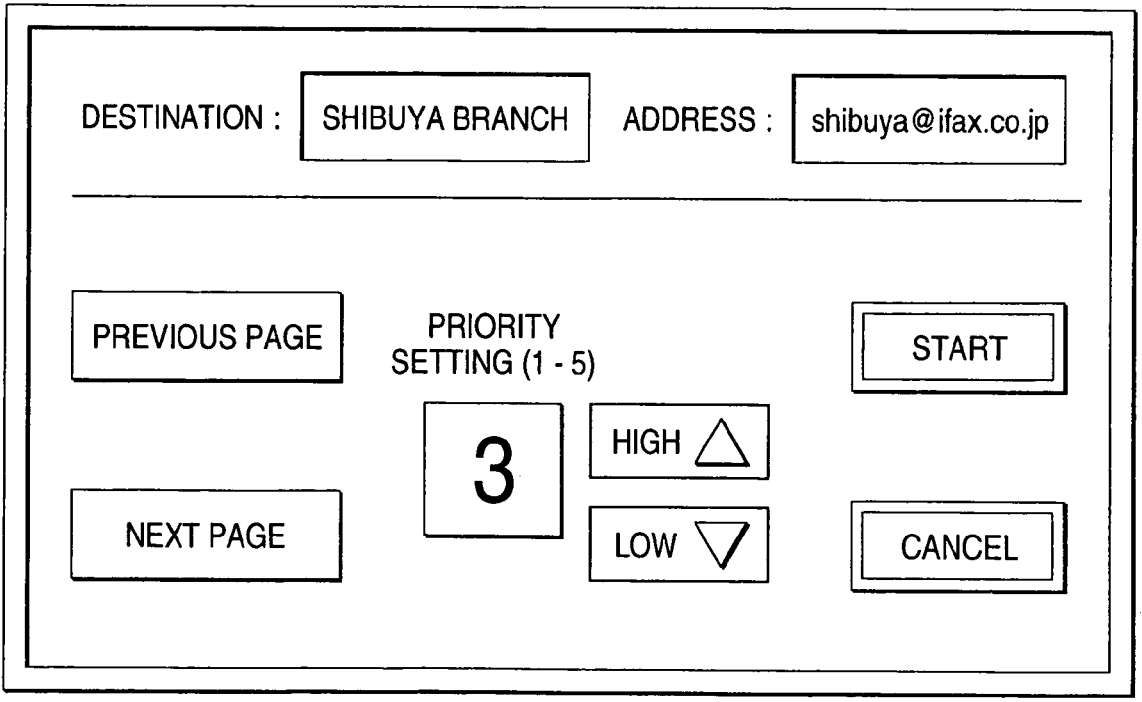
FIG. 27 is a drawing to show a configuration example of a setting screen for setting priority, displayed on the operation and display section of the Internet fax.

FIG. 27 is a drawing to show a configuration example of a setting screen for setting priority.

As shown in FIG. 27, a document to be transmitted by Internet fax to Shibuya branch is assigned priority 3. The priority levels 1 to 5 are assigned; whenever HIGH is pressed, the priority is raised one level and whenever LOW is pressed, the priority is lowered one level.

In the configuration example, if the user sets the priority display to 3 and presses a START button, the document is transmitted by Internet fax to the address of the Shibuya branch and the priority of the document is set to 3.

Figure 28:
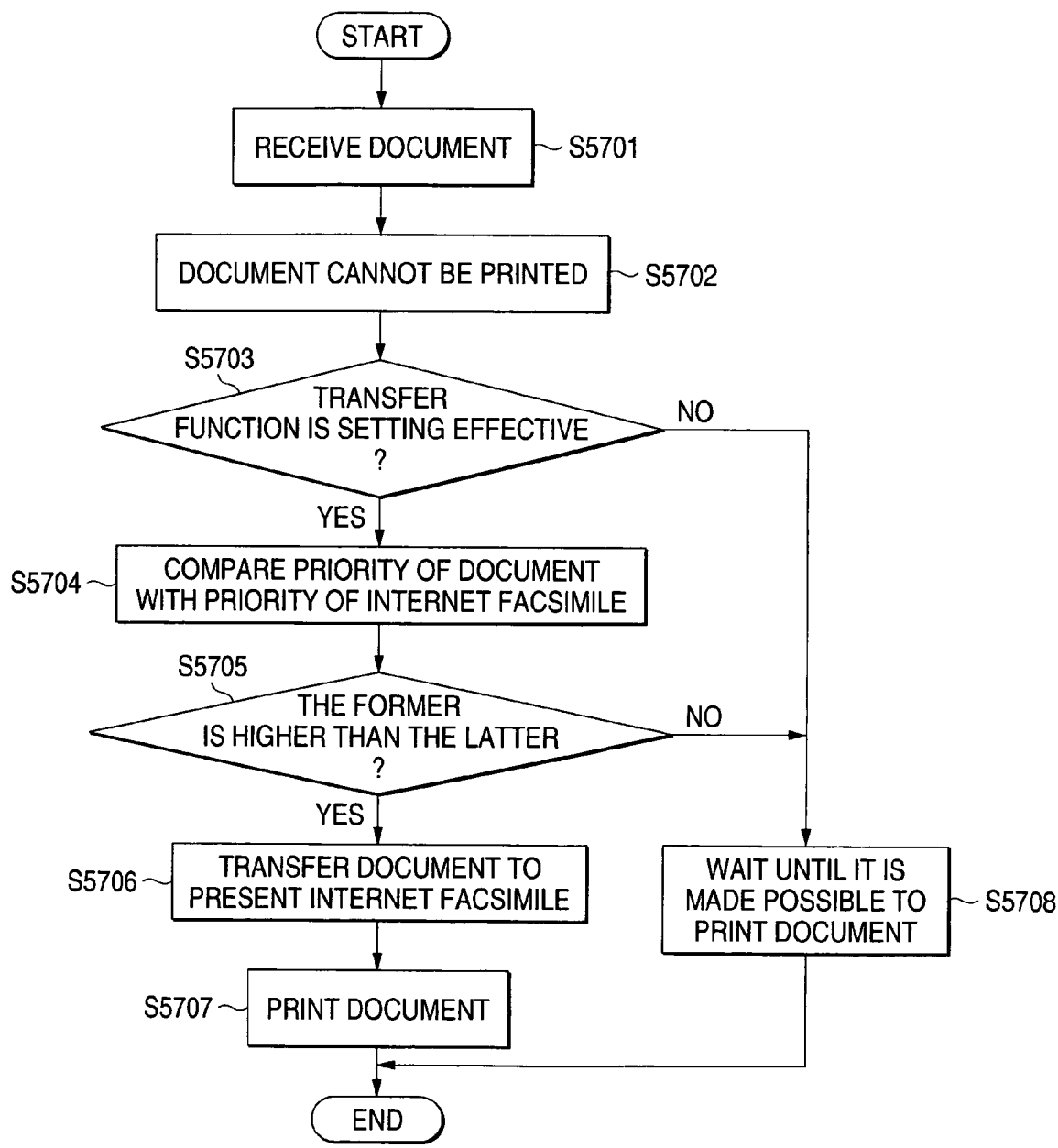
FIG. 28 is a flowchart to show a processing procedure of transferring the received document to another Internet fax on LAN for printing the document if the Internet fax that cannot print receives a document.

If it is made impossible for the Internet fax according to the invention to print for some reason, the Internet fax can transfer the received document to another Internet fax preset on the LAN in response to the priority of the document for printing the document. A processing procedure of transferring the received document to another Internet fax on the LAN for printing the document will be discussed with reference to a flowchart of FIG. 28.

The Internet fax receives a document (step S5701). However, the Internet fax cannot print the document for some reason (step S5702) and thus whether or not transfer function setting of the Internet fax is effective is checked (step S5703). If transfer function setting is ineffective (NO at step S5703), a wait is made until it is made possible to print the document (step S5708), and the processing procedure is terminated.

If transfer function setting is effective (YES at step S5703), the priority of the document is compared with the priority preset in the Internet fax (step S5704). If the latter is higher than the former (NO at step S5705), a wait is made until it is made possible to print the document (step S5708), and the processing procedure is terminated.

If the priority of the document is higher than the priority of the Internet fax (YES at step S5705), the document is transferred to another Internet fax that can print, preset on the LAN (step S5706). The Internet fax to which the document is transferred prints the document (step S5707), and the processing procedure is terminated.

Whether or not transfer processing responsive to the priority is made effective in the Internet fax according to the invention can be specified. If the operator presses a priority transfer display part of the function setting screen shown in FIG. 26, a priority transfer function setting screen is displayed.

Figure 29:
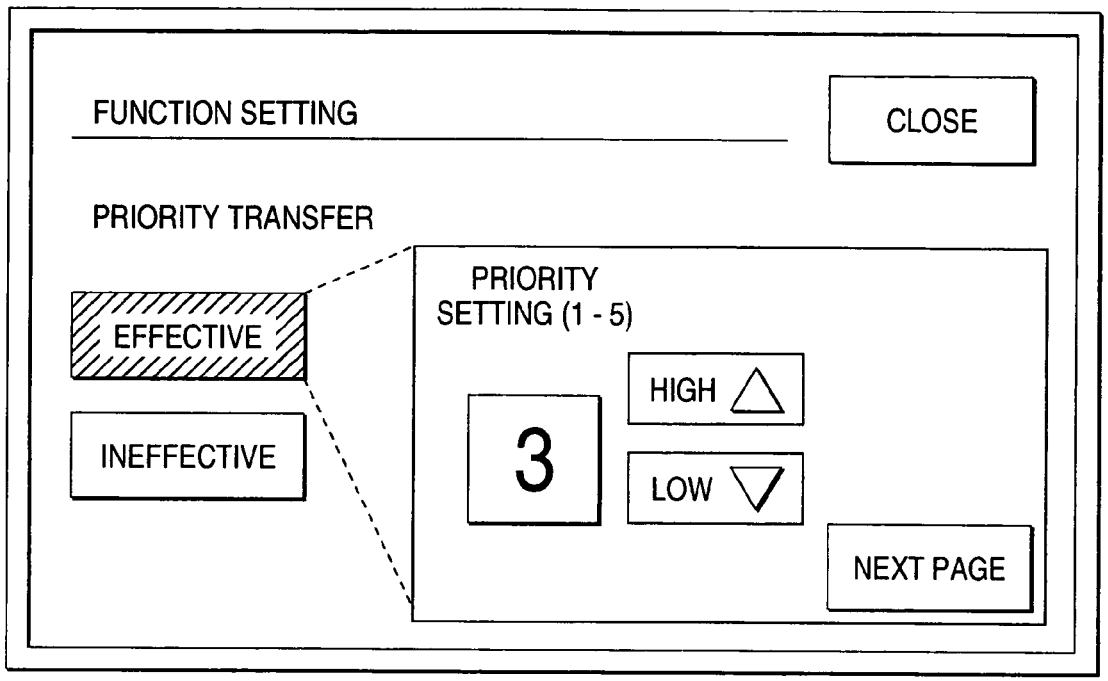
FIG. 29 is a drawing to show a configuration example of the function setting screen on which a priority transfer function is set effective.

FIG. 29 is a drawing to show a configuration example of the function setting screen on which the priority transfer function is set effective.

As shown in FIG. 29, the effective display part of the priority transfer function is highlighted and thus the priority transfer function is effective. If the priority transfer function is set effective, a screen for setting the priority of the document that can be transferred is displayed.

Setting the priority transfer function and the priority of the document that can be transferred are recorded in the system control section 108 previously described with reference to FIG. 1.

In the configuration example shown in FIG. 29, the priority is set to 3 and thus if the priority of the received document is 3, 4, or 5, the document is transferred to another Internet fax; if the priority is 1 or 2 or is not assigned, the document is made to wait until it is made possible for the Internet fax to print without transferring the document to another Internet fax.

The priority is preset, whereby a document having higher priority than the setup priority is transferred to another Internet fax for immediately printing the document and a document having lower priority than the setup priority is made to wait until it is made possible for the Internet fax to print without transferring all received documents to another Internet fax, so that it is made possible to print important documents more rapidly.

The Internet fax to which a document is to be transferred in the Internet fax according to the invention can be preset. If the operator presses a next page display part of the function setting screen for setting the priority transfer function shown in FIG. 29, a setting screen for setting the Internet fax to which the priority transfer function is applied is displayed.

Figure 30:
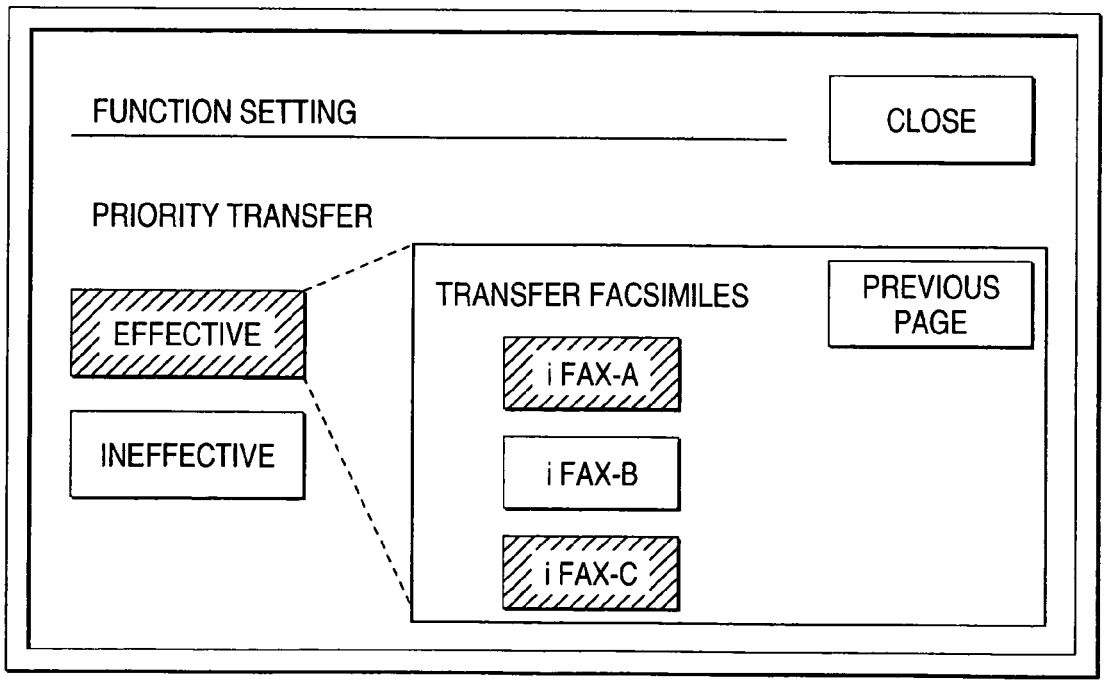
FIG. 30 is a drawing to show a configuration example of a setting screen for setting Internet faxes to which the priority transfer function is applied.

FIG. 30 is a drawing to show a configuration example of the setting screen for setting the Internet faxes to which the priority transfer function is applied.

As shown in FIG. 30, the Internet faxes connected on the LAN are displayed and if the operator presses the display part of each Internet fax to which a document may be transferred, the display part is highlighted. In the configuration example shown in FIG. 30, the display parts of IFAX-A and IFAX-C are highlighted and thus are set to the transfer faxes. In contrast, to set an Internet fax to a non-transfer fax, the operator presses the highlighted display part and the highlighted display part is not highlighted, setting the corresponding Internet fax to a non-transfer fax. In the configuration example shown in FIG. 30, IFAX-B is not set to a transfer fax.

Transfer fax setting to which the priority transfer function is applied is recorded in the system control section 108 previously described with reference to FIG. 1.

Figure 31:
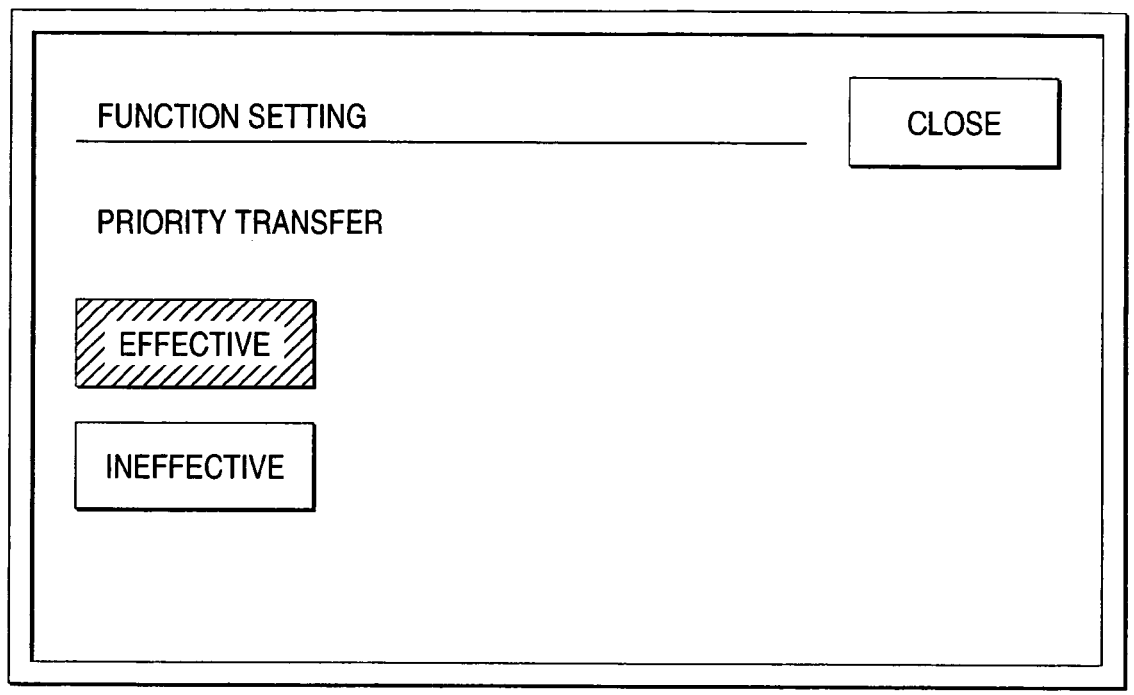
FIG. 31 is a drawing to show a configuration example of the function setting screen on which the priority transfer function is set ineffective.

FIG. 31 is a drawing to show a configuration example of the function setting screen on which the priority transfer function is set ineffective.

In the configuration example shown in FIG. 31, the ineffective display part of the priority transfer function is highlighted and thus the priority transfer function is made ineffective. Since the screen for setting the priority of the document to be transferred and the transfer fax is not displayed, the priority and the transfer fax cannot be set.

Figure 32:
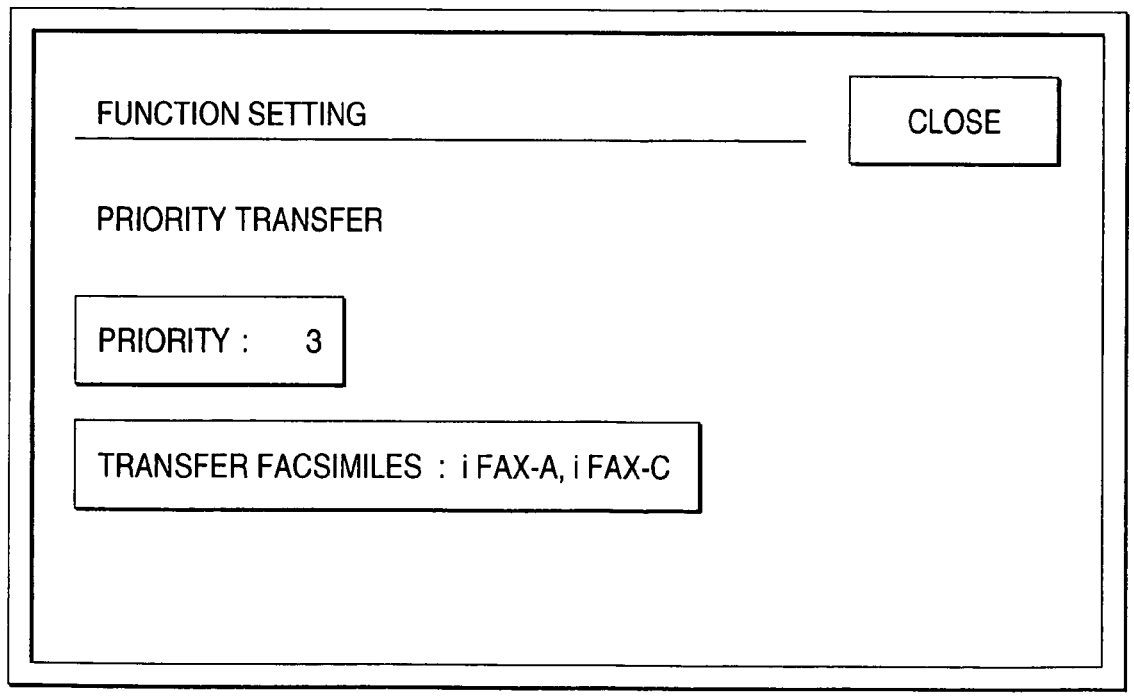
FIG. 32 is a drawing to show a configuration example of a priority transfer function check screen.

FIG. 32 is a drawing to show a configuration example of a priority transfer function check screen.

If the priority transfer function is effective, the operator can see the priority transfer function check screen to check the setup state of the priority and the transfer fax. In the configuration example shown in FIG. 32, the operator can check that the priority is set to 3 and that the transfer faxes are set to IFAX-A and IFAX-C.

To transmit E-mail, the priority is set using Priority of the header of E-mail and to transmit a fax message, the priority is set using F code, DTMF signal, etc., whereby it is made possible to specify the priority of the transmitted and received document.

Next, a method of notifying the fax transfer destination of the transmission source of received E-mail will be discussed.

First, the mail address of the transmission source of received E-mail can be known from "from" information of the header information of the E-mail.

The fax transfer method of E-mail by the Internet fax 1 (75) according to the invention will be discussed with reference to FIG. 1 by taking the case where the terminal 73 transmits E-mail to the fax 310 as an example.

The E-mail transmitted by the terminal 73 is first transmitted through the mail server 72 to the Internet fax 75.

The Internet fax 75 receives the E-mail from the terminal 73 via the Ethernet I/F 113 and the network control section 110. Under the control of the system control section 108, the Internet fax 75 uses the RAM 102 as a buffer and uses the image processing section 106 as required, converts the image and document data in the E-mail into the data format fitted for fax communications, and transmits the E-mail to the PSTN 300 as fax data via the communication control section 109, the modem 112, and the net controller 111.

At this time, the Internet fax 75 references the header information of the E-mail and uses the mail address of the terminal 73, the transmission source of the E-mail as the transmitting party information of fax communications.

The fax 310 displays the transmitting party information of the fax data received from the Internet fax 75 on a panel or prints the transmitting party information as a report, thereby informing the user of the fax 310 that the transmission source of the received fax data is the terminal 73.

In the Internet fax 75, like normal facsimile communications, the address of the Internet fax 75 (Ip address, telephone number, etc.,) as the transmitting party information may be used and the mail address of the terminal 73 together with the transmitting party information may be transmitted to the fax 41.

In this case, the fax 310 can display the address of the Internet fax 75 and the mail address of the terminal 73 on the panel or print the address and the mail address as a report, thereby informing the user of the transmission source of the received fax data and the relay machine relaying the fax data.

The fax 310 may selectively display both or either of the address of the Internet fax 75 and the address of the terminal 73 as required.

The Internet fax 75 may transmit at least information indicating that the transmitted fax data is relayed in transfer to the fax 41 together with the fax data. In this case, the fax 41 informs the user that the received data is relayed in transfer by displaying the fact on the panel or printing the fact as a report.

Further, if the Internet fax 75 itself displays the address of the terminal 73 of the transmission source of the received E-mail or at least the fact that the received E-mail is relayed in transfer, whether or not the Internet fax 75 is used for illegal use of the Internet, etc., can be checked.

If the Internet fax 75 has a batch transmission function of storing data of E-mail received from the LAN, fax data directly input to the Internet fax 75, and the like and transmitting the stored data by fax in batch at the time point at which a plurality of pieces of data are stored or at a preset time, for all data to be transmitted in batch, the mail address of the transmission source and the address of the Internet fax 75 or information indicating that the data is transmitted in batch are selectively sent to the fax of the transfer destination or are displayed on the Internet fax, whereby the users of the fax of the transfer destination and the Internet fax 75 can keep track of detailed information concerning the communication.

Next, output from the Internet fax will be discussed.

Figure 33:
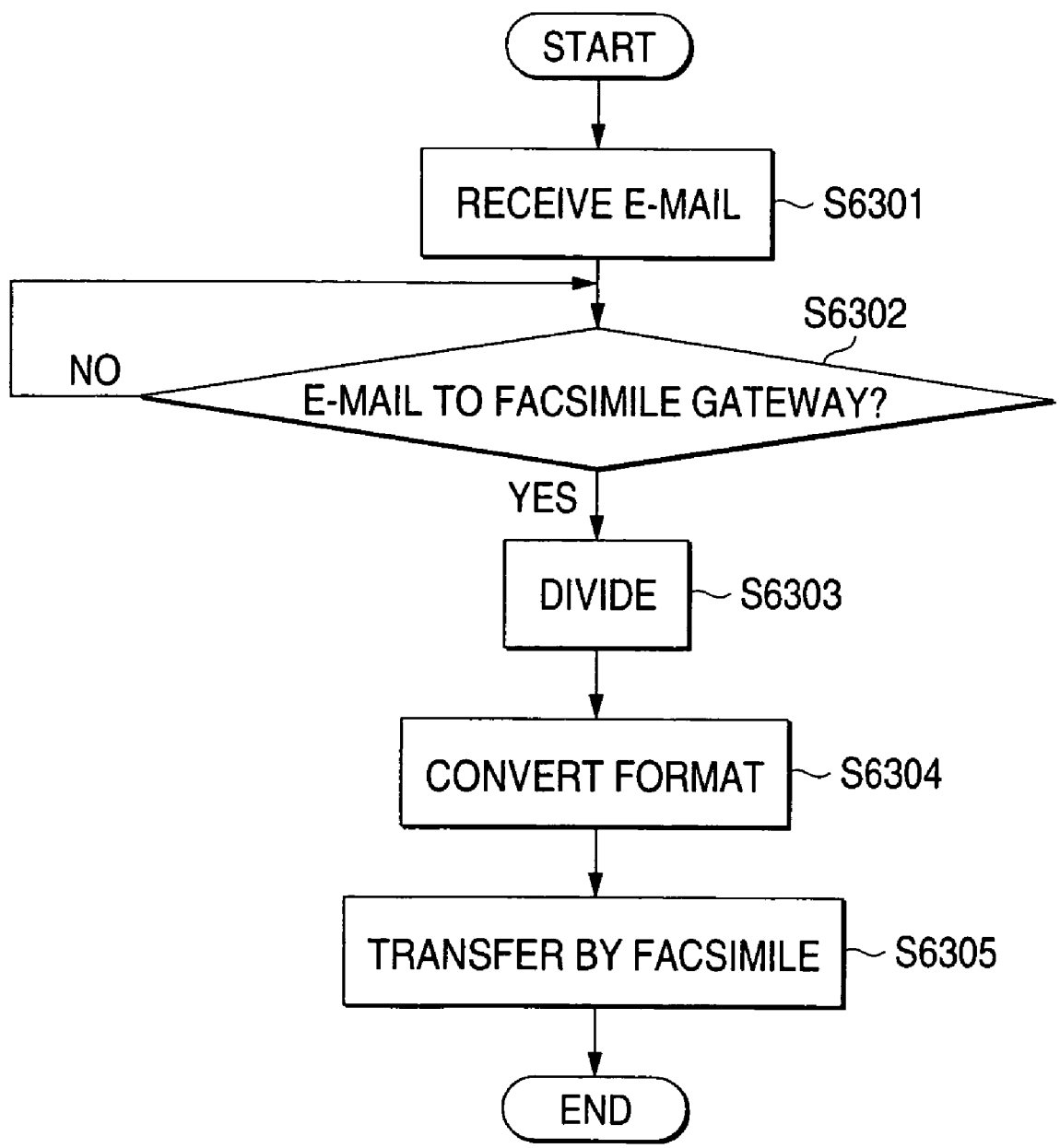
FIG. 33 is a flowchart to show the operation of the Internet fax.

FIG. 33 is a flowchart to show the operation of the Internet fax.

In FIG. 33, when the Internet fax 1 receives E-mail via the Ethernet I/F 113 and the network control section 110 (step S6301), the system control section 108 determines whether or not the E-mail To Fax Gateway function is to be used for the received E-mail (step S6302). To make this determination, a method of indicating a transfer instruction, such as a method of entering the telephone number of the fax of the transfer destination (01-2345-6789) in the E-mail address like "FAX=+0123456789@XXX.co.jp" or a method of entering the telephone number in the subject of E-mail, is predetermined and whether or not the received E-mail contains information concerning the transfer instruction (indication) is checked.

Figure 34:
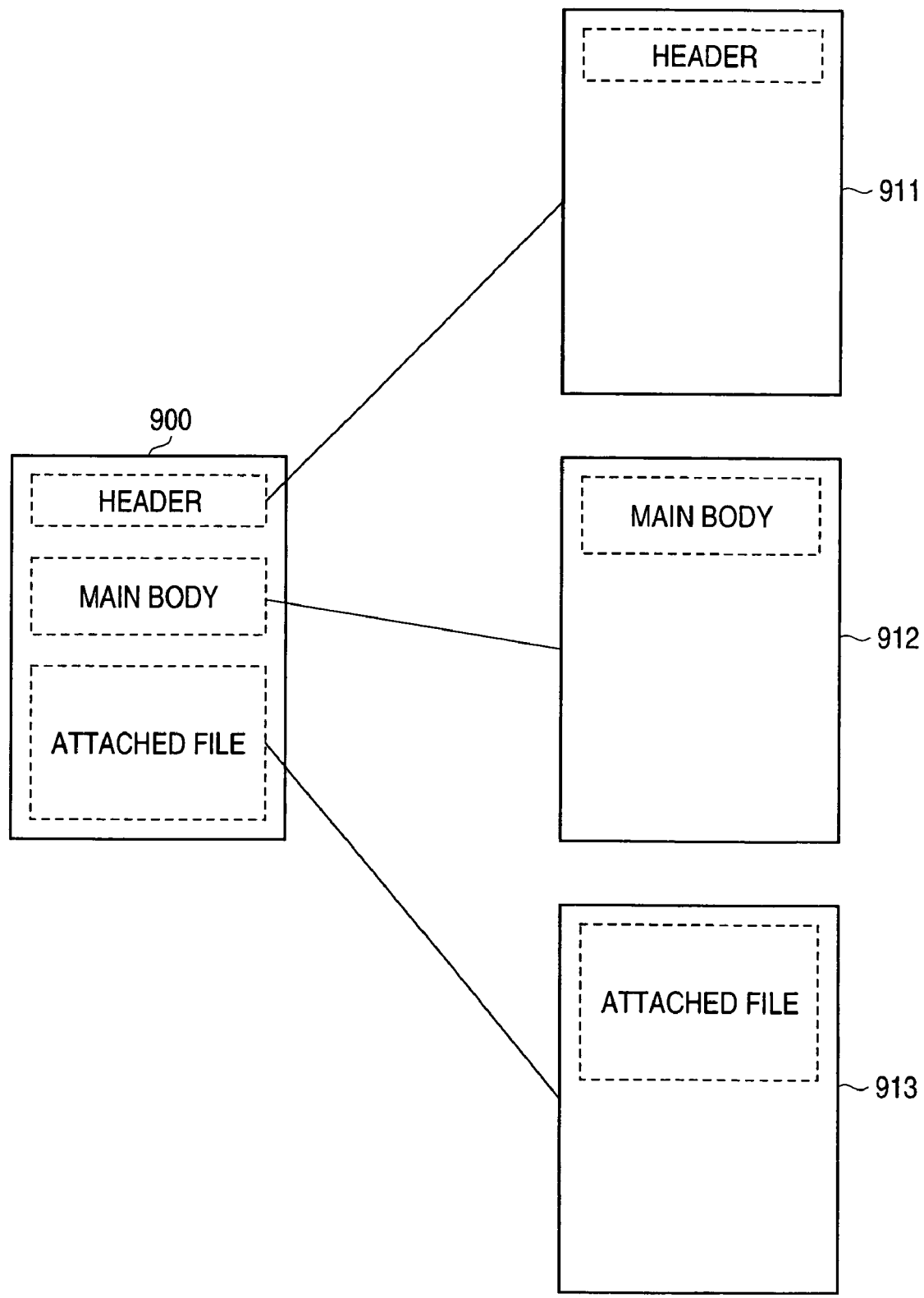
FIG. 34 is a schematic drawing to show dividing of E-mail.

If it is determined that the E-mail To Fax Gateway function is to be used (YES at step S6302), E-mail 900 is divided, for example, as shown in FIG. 34 by assuming that a header 911 is described on the first page, main body 912 is described on the second page, and attached file contents 913 are described on the third page (step S6303).

The format of the divided E-mail is converted into the format for fax transmission in image processing unit (step S6304) and the E-mail is transmitted by fax to the fax of the transfer destination specified (step S6305).

In the embodiment, E-mail is received through the Ethernet I/F, but a modem, etc., can also be installed in place of the Ethernet I/F for directly receiving E-mail from the Internet line.

If a plurality of files are attached, the files can also be divided as different pages.

If the Internet fax is not compatible with the format of an attached file, a message indicating the fact can also be transmitted to the specified fax together with the file name so that it is printed out as a page of the attached file.

The sizes of the header and the main body of E-mail may be converted matching the size of the attached document stored in the attached file before each page is converted into a fax transmission format file.

Figure 35:
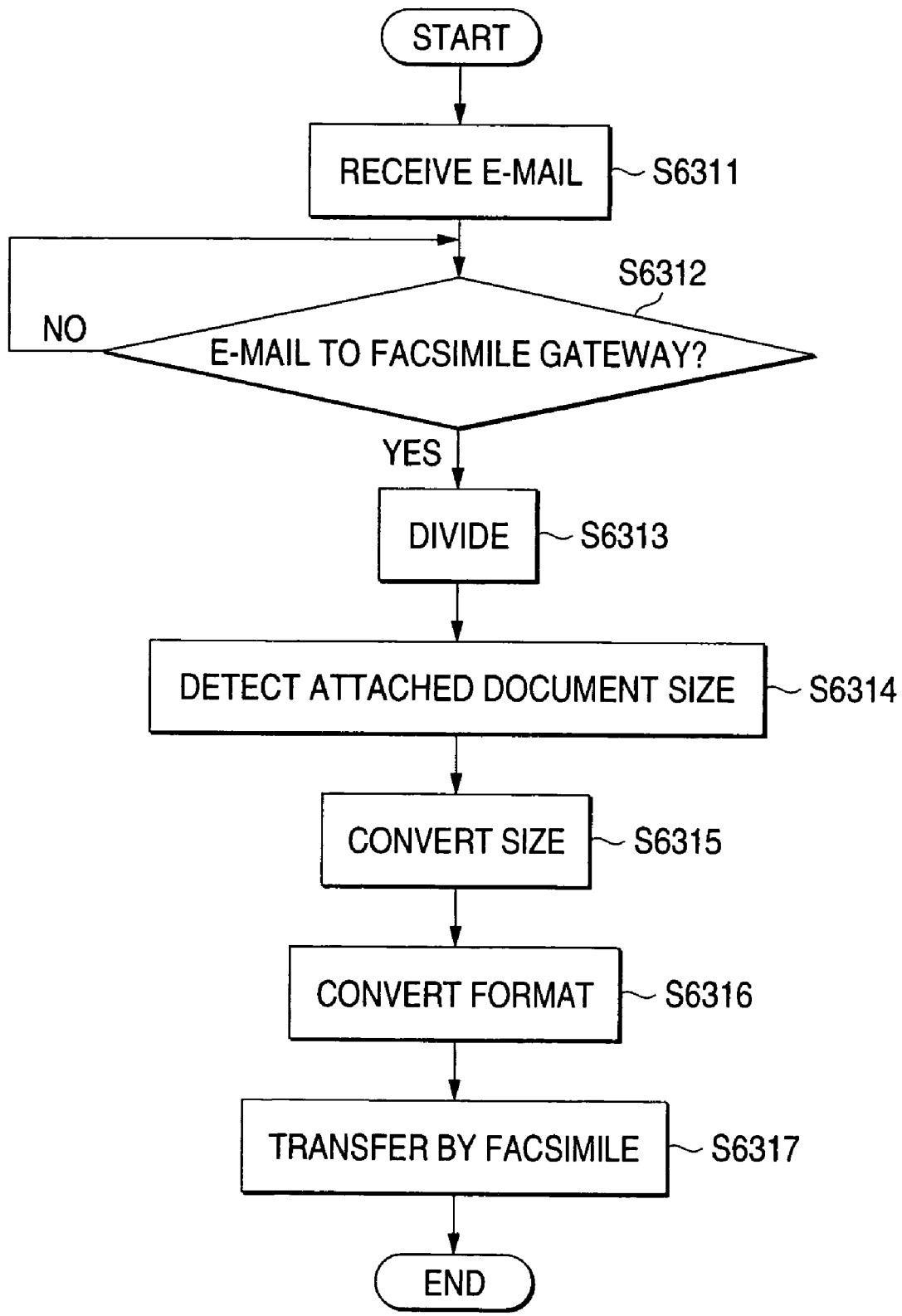
FIG. 35 is a flowchart to show the operation of the Internet fax.

FIG. 35 is a flowchart to show the operation of the Internet fax for executing the above-described conversion.

In FIG. 35, when the Internet fax 1 receives E-mail (step S6311), the system control section 108 determines whether or not the E-mail To Fax Gateway function is to be used for the received E-mail (step S6312). If it is determined that the E-mail To Fax Gateway function is to be used (YES at step S6312), the E-mail is divided by assuming that the header, the main body, and the attached document are described on different pages (step S6313).

The page size of the attached document is detected (step S6314) and the page sizes of the header and the main body are converted matching the page size of the attached document (step S6315).

The format of each page with the page size converted is converted into the format for fax transmission in the image processing unit (step S6316) and the E-mail is transmitted by fax to the fax of the transfer destination specified (step S6317).

In the embodiment, the sizes of the header and the main body are converted matching the size of the attached document, but the conversion size is predetermined to be A4 size, etc., whereby the size of the header, the main body, the attached document can also be converted into the determined size independently of the size of the attached document, etc.

If a plurality of files are attached, the size of the first attached document is detected and the size of the remaining attached document is also converted matching the detected size like the header and the main body, so that if a plurality of files are attached, the Internet fax can sufficiently deal with the situation.

Figure 36:
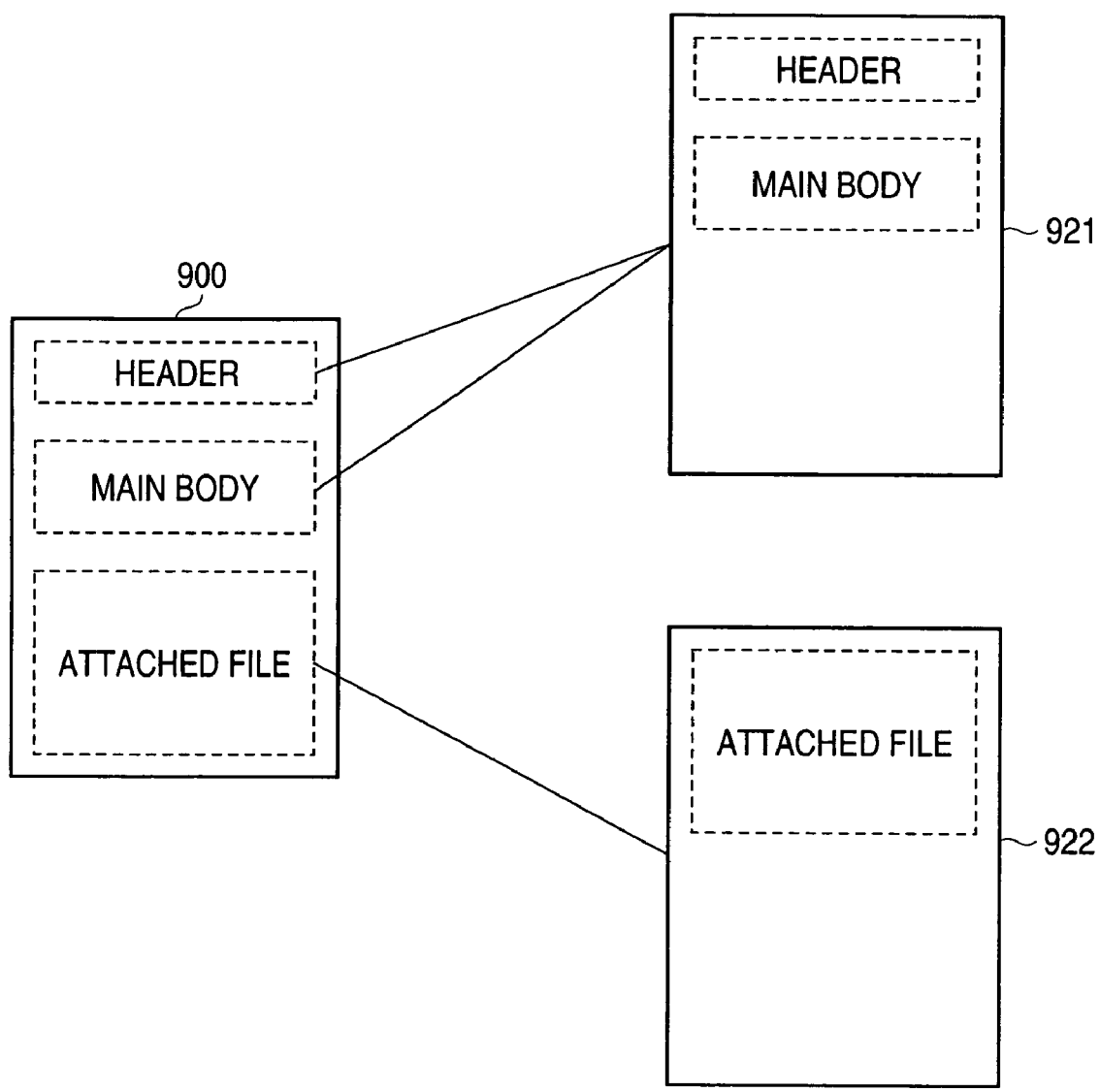
FIG. 36 is a schematic drawing to show dividing of E-mail.

As shown in FIG. 36, dividing and conversion can also be executed by assuming that E-mail header and main body 921 and an attached file 922 are different pages.

Figure 37:
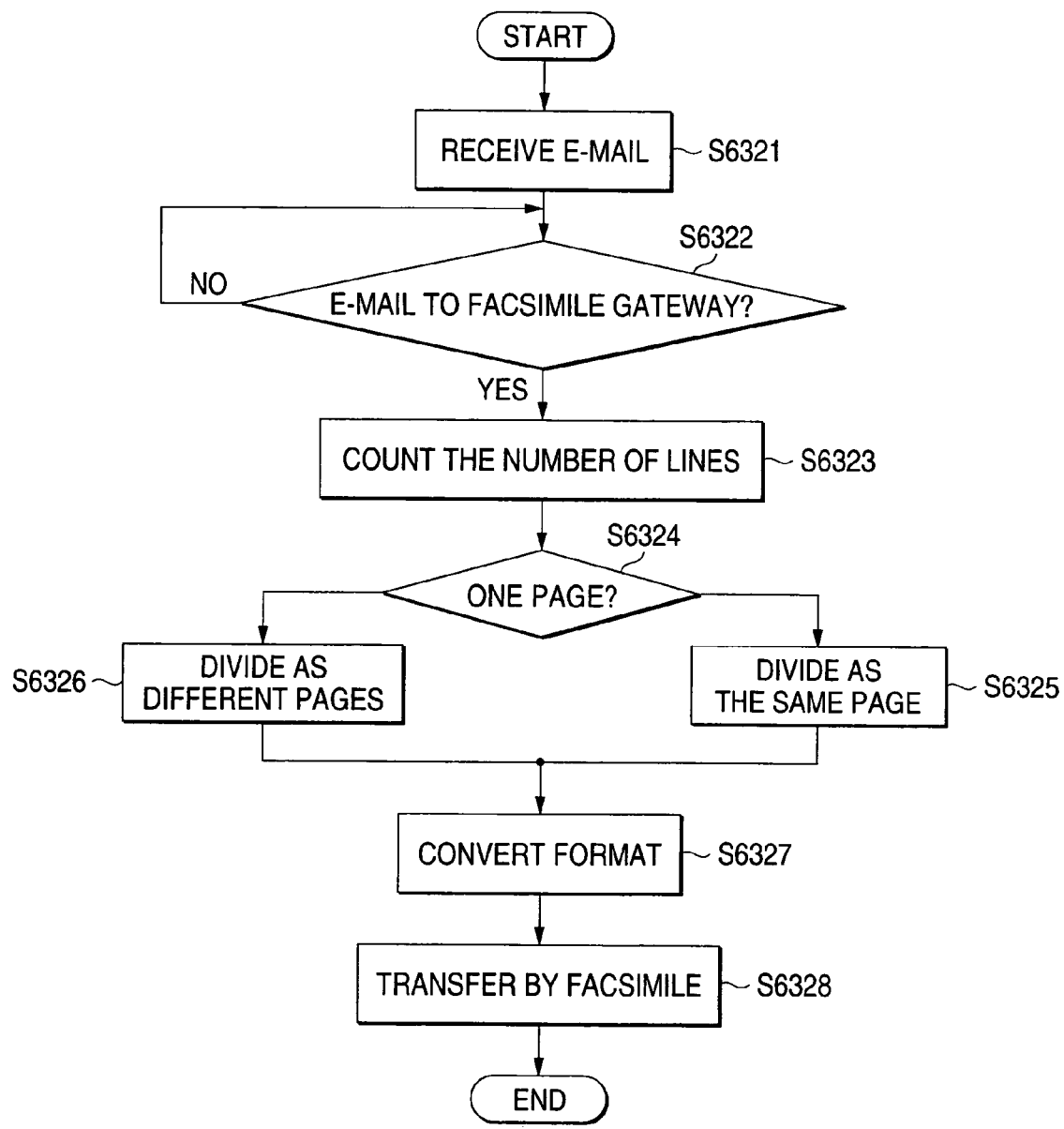
FIG. 37 is a flowchart to show the operation of the Internet fax.

FIG. 37 is a flowchart to show the operation of the Internet fax for executing the dividing shown in FIG. 36.

In FIG. 37, when the Internet fax 1 receives E-mail (step S6321), the system control section 108 determines whether or not the E-mail To Fax Gateway function is to be used for the received E-mail (step S6322). If it is determined that the E-mail To Fax Gateway function is to be used (YES at step S6322), the number of lines of the header and the main body is counted (step S6323).

If it is determined that the header and the main body fall within one page (YES at step S6324), the E-mail is divided by assuming that the header and the main body are the same page and the attached file is a different page (step S6325). If it is not determined that the header and the main body fall within one page (NO at step S6324), the E-mail is divided by assuming that the header, the main body, and the attached file are different pages (step S6326).

The format of each of the pages into which they are divided is converted into the format for fax transmission in the image processing unit (step S6327) and the E-mail is transmitted by fax to the fax of the transfer destination specified (step S6328).

Whether or not the header and the main body fall within one page can be determined by a method of presetting the reference number of lines, a method of setting the page size of the header and the main body as the reference, or the like.

Figure 38:
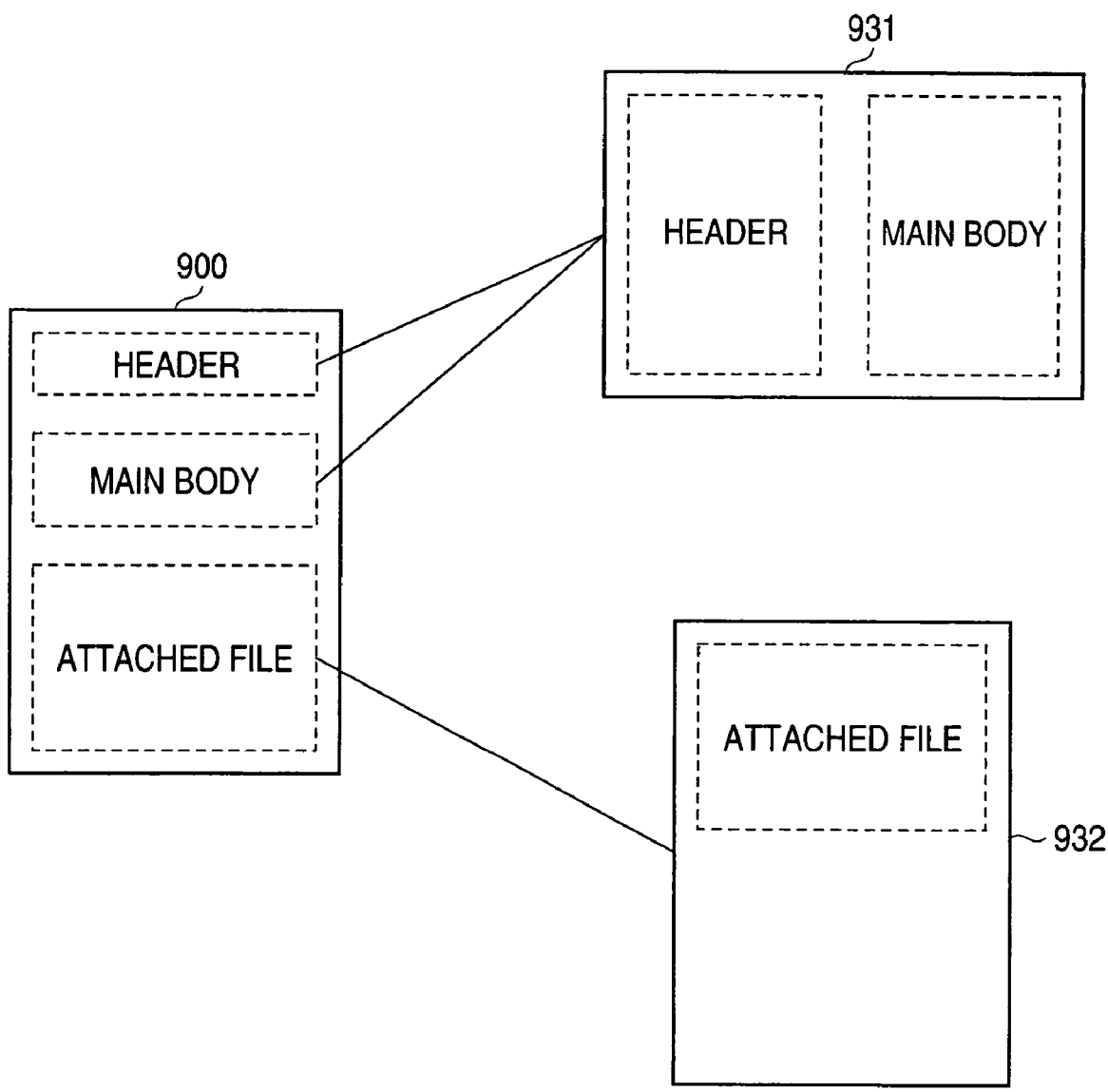
FIG. 38 is a schematic drawing to show dividing of E-mail.

As shown in FIG. 38, dividing and conversion may be executed so that E-mail header and main body pages can be printed out as a single page 931.

Figure 39:
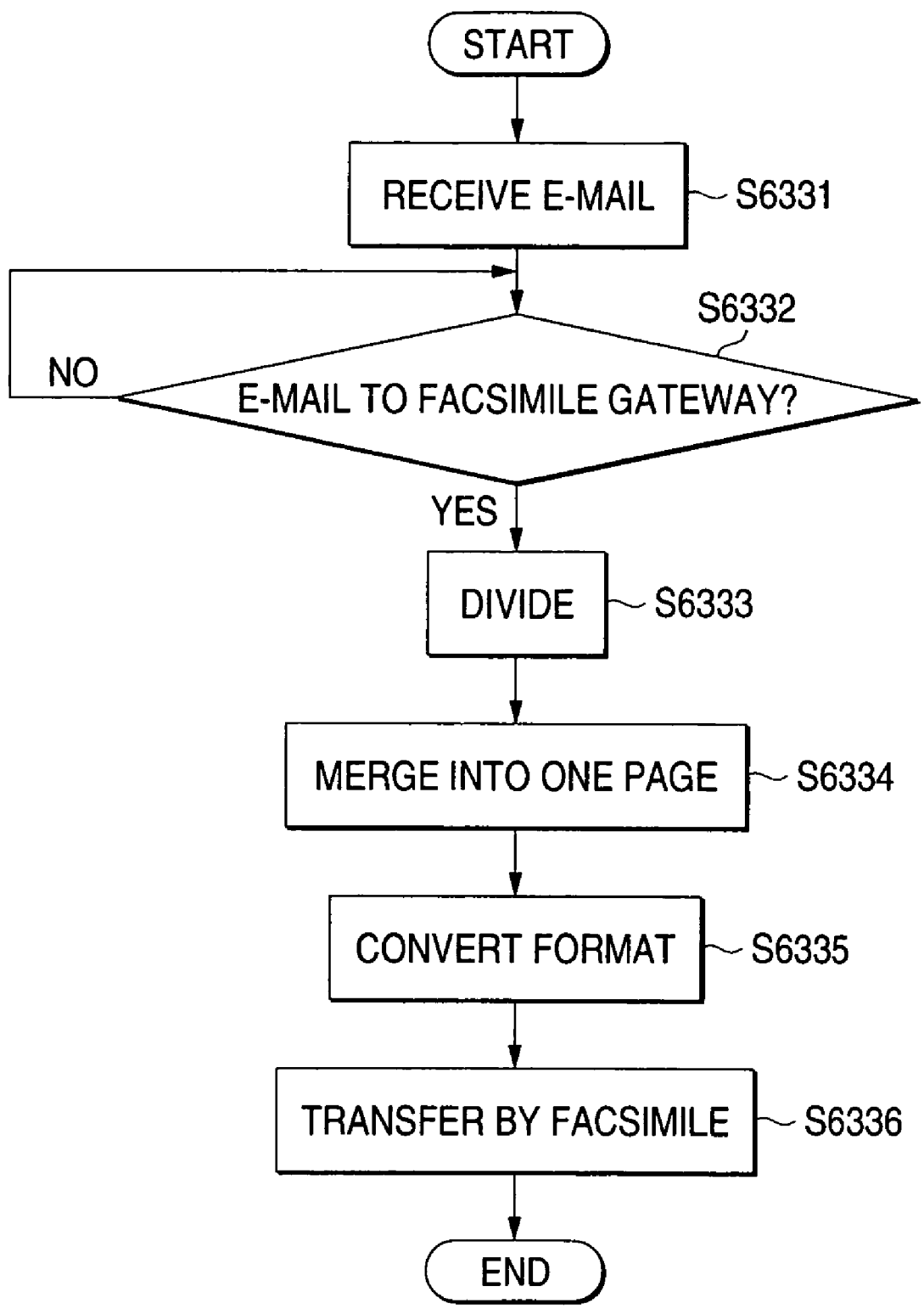
FIG. 39 is a flowchart to show the operation of the Internet fax.

FIG. 39 is a flowchart to show the operation of the Internet fax for executing the dividing shown in FIG. 38.

In FIG. 39, when the Internet fax 1 receives E-mail (step S6331), the system control section 108 determines whether or not the E-mail To Fax Gateway function is to be used for the received E-mail (step S6332). If it is determined that the E-mail To Fax Gateway function is to be used (YES at step S6332), the E-mail is divided by assuming that the header, the main body, and the attached document are different pages (step S6333).

The size of each page is changed so that the header and main body pages fall within one page, and the header and main body pages are merged into one page (step S6334). The size of the page within which the header and the main body fall is set by a method of matching the page size with the page size of the attached document, a method of predetermining the page size such as A4, or the like.

The format of each page is converted into the format for fax transmission in the image processing unit (step S6335) and the E-mail is transmitted by fax to the fax of the transfer destination specified (step S6336).

Figure 40:
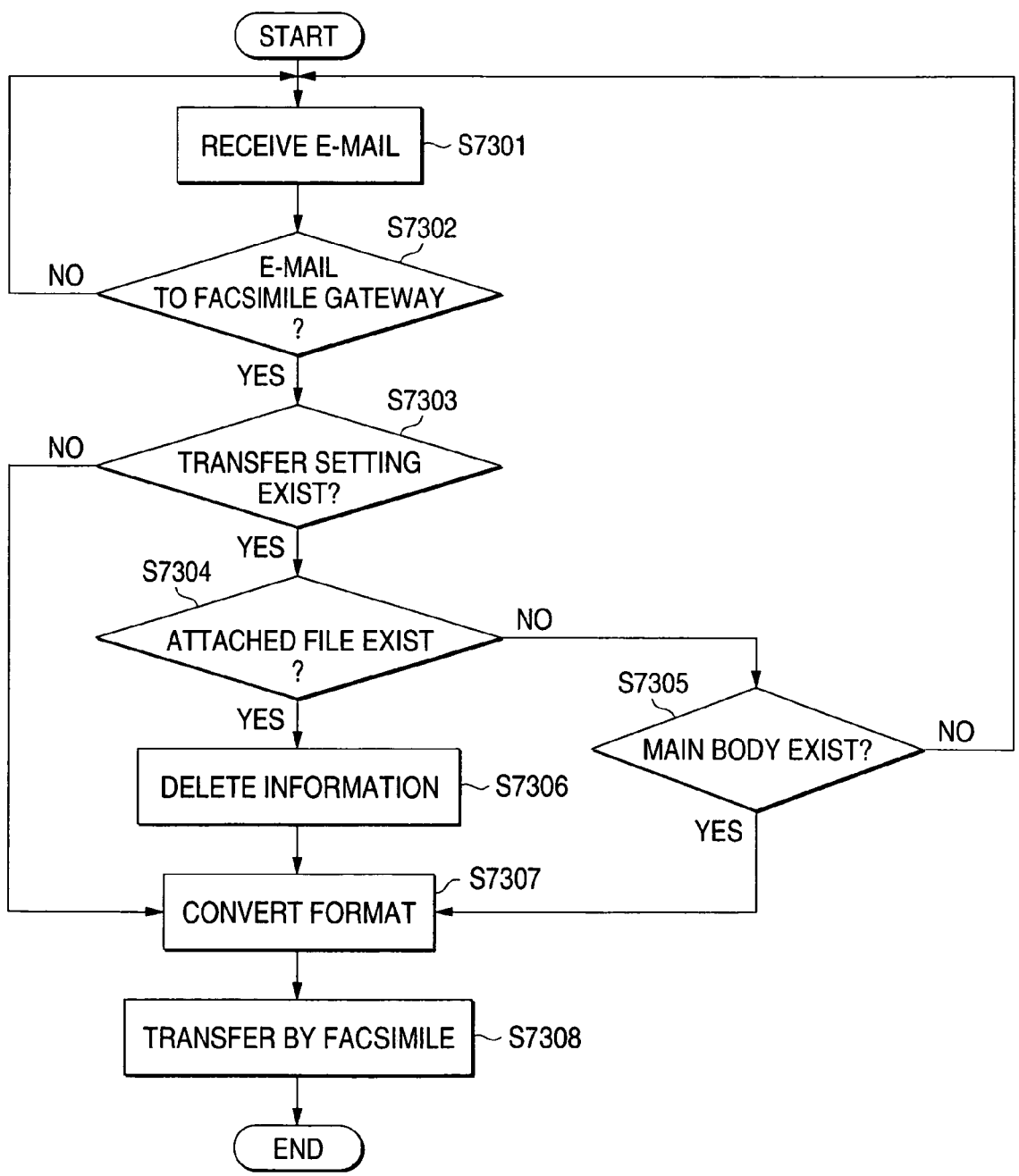
FIG. 40 is a flowchart to show the operation of the Internet fax in the embodiment.

In the Internet fax of the invention, E-mail may contain information concerning a transfer instruction (indication) as follows:

FIG. 40 is a flowchart to show the operation of the Internet fax.

In FIG. 40, when the Internet fax receives E-mail via the Ethernet I/F 113 and the network control section 110 (step S7301), the system control section 108 determines whether or not the E-mail To Fax Gateway function is to be used for the received E-mail (step S7302). To make this determination, a method of indicating a transfer instruction, such as a method of entering the telephone number of the fax of the transfer destination (01-2345-6789) in the E-mail address like "FAX=+0123456789@XXX.co.jp" or a method of entering the telephone number in the subject of E-mail, is predetermined and whether or not the received E-mail contains information concerning the transfer instruction (indication) is checked.

If it is not determined that the E-mail To Fax Gateway function is to be used (NO at step S7302), processing of printing out the E-mail, etc., is performed and a wait is made for receiving another piece of E-mail.

If it is determined that the E-mail To Fax Gateway function is to be used (YES at step S7302), whether or not setting concerning transfer of E-mail exists is determined (step S7303).

The setting concerning transfer of E-mail is to set specification as to whether or not each of the header and the main body of E-mail is to be transferred when E-mail is transferred from the Internet fax in the Internet fax for each of the header and the main body. For the setting, different settings can also be used in response to the transmission source and the transfer destination of E-mail.

If transfer setting does not exist (NO at step S7303), the format of the E-mail is converted into the fax transmission format (step S7307).

If transfer setting is determined to exist (YES at step S7303), whether or not a file is attached is determined (step S7304). If a file is attached (YES at step S7304), information is deleted in accordance with the transfer setting (step S7306) and the format of the information to be transferred is converted into the fax transmission format (step S7307).

If it is not determined that a file is attached (NO at step S7304), whether or not the E-mail contains the main body is determined (step S7305). If it is not determined that the E-mail contains the main body (NO at step S7305), processing for the E-mail To Fax Gateway function is terminated. The processed E-mail is discarded and a wait is made for receiving another piece of E-mail.

If it is determined that the E-mail contains the main body (YES at step S7305), the formats of the header and the main body are converted into the fax transmission format regardless of the transfer setting (step S7307).

The information converted into the fax transmission format is transferred to the specified fax (step S7307).

If the information amount of the header to be transferred is predetermined in the transfer setting, when information is deleted in response to the transfer setting (step S7306), the header information exceeding the predetermined information amount can also be deleted.

Preferably, transfer setting is executed in response to the address of the transmission source of E-mail and the transfer destination and whether or not transfer setting exists is checked in response to the transmission source and the transmission destination. This configuration makes it possible to execute fine setting in response to the transmission source and the transmission destination and to the transmission source and the transmission destination for which no transfer setting exists, it is also made possible to transfer all information transmitted by E-mail.

Next, charging in the Internet fax of the invention will be discussed.

Figure 41:
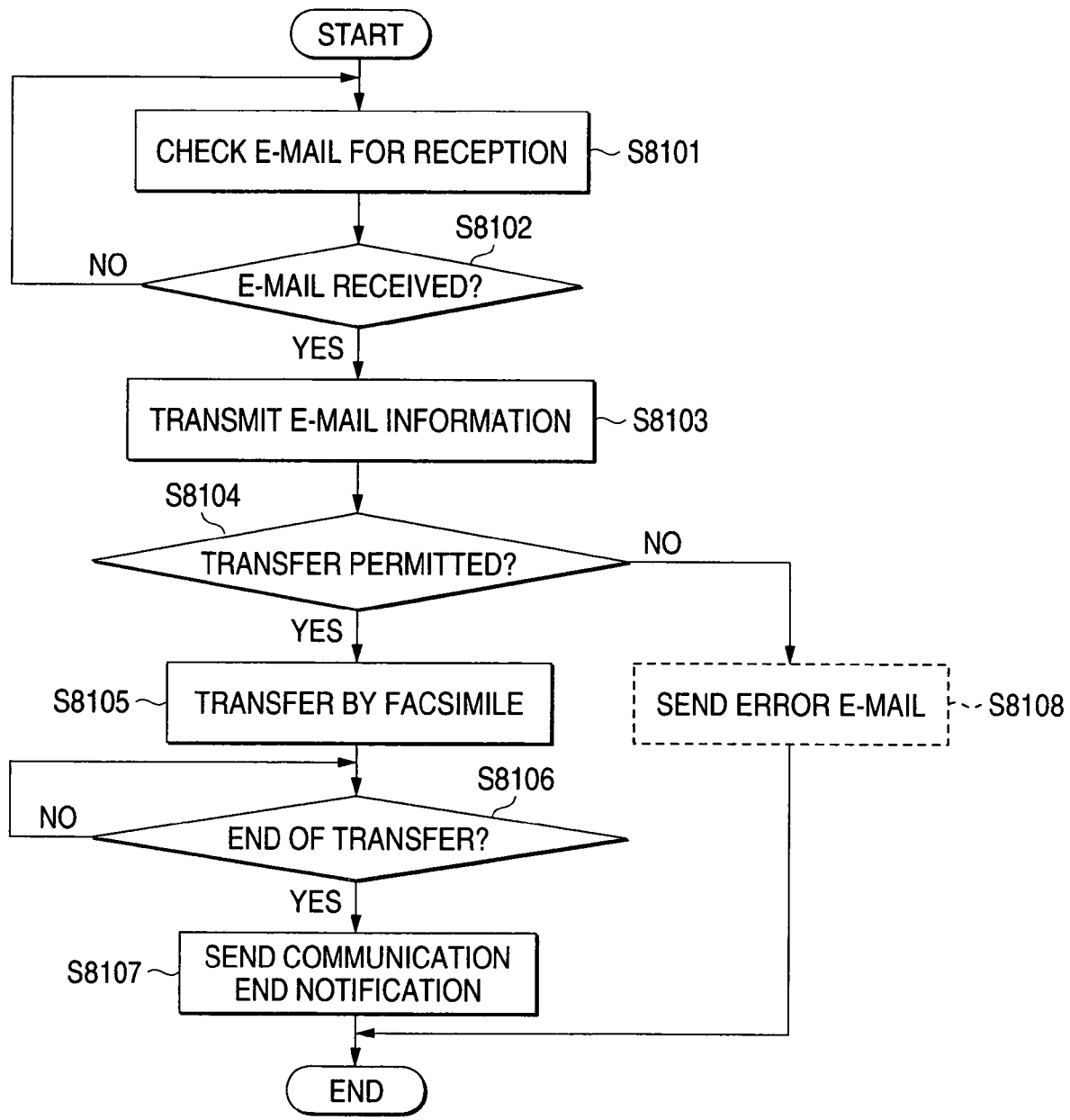
FIG. 41 is a flowchart to show an operation flow for the Internet fax 75 to transfer information attached to received E-mail by fax.

FIG. 41 is a flowchart to show an operation flow for the Internet fax 75 to transfer information attached to received E-mail by fax.

The Internet fax 75 accesses the mail server 72 for checking whether or not E-mail addressed to the fax 75 exists (step S8101, NO at step S8102).

If E-mail addressed to the fax 75 exists (YES at step S8102), the Internet fax 75 transmits information concerning the E-mail to the charging server 200 (step S8103). If the charging server 200 permits fax transfer of the information attached to the E-mail (YES at step S8104), the Internet fax 75 transfers by fax the attached information to the transfer destination specified in the E-mail as fax information (step S8105).

When the fax transfer terminates (YES at step S8106), the Internet fax 75 sends a communication end notification indicating the termination of the communication to the charging server 200 (step S8107). This communication end notification also contains the communication charge amount required for the fax transfer.

On the other hand, if the charging server 200 does not permit fax transfer (NO at step S8104), the Internet fax 75 sends error mail indicating an error to the transmission source of the E-mail (step S8108). The error mail need not necessarily be sent and the E-mail may be ignored.

Next, the operation of the charging server 200 for the Internet fax 75 to transfer information attached to received E-mail by fax will be discussed.

FIG. 42 is a flowchart to show an operation flow of the charging server 200 for the Internet fax 75 to transfer information attached to received E-mail by fax.

Upon reception of the mail information transmitted at step S8103 in FIG. 41 from the Internet fax 75 (step S8201), the charging server 200 identifies the sender based on the mail information. If the sender is registered (YES at step S8202), the charging server 200 sends a notification indicating permission of transfer to the Internet fax 75 (step S8203) and waits for a communication end notification from the Internet fax 75 (NO at step S8204).

Upon reception of a communication end notification from the Internet fax 75 (YES at step S8204), the charging server 200 calculates the charge amount for the transfer (step S8205) and records the calculated charge amount in the charging DB 210 (step S8206).

On the other hand, if the sender identified based on the mail information received from the Internet fax 75 is not registered (NO at step S8202), the charging server 200 sends a notification indicating disapproval of transfer to the Internet fax 75 (step S8207) and terminates the processing.

A supplementary description of determination as to whether or not the charging server 200 permits transfer and a charge amount calculation method is given below:

First, in the determination as to whether or not transfer is permitted, the sender information (From) entered in the header of E-mail is referenced as sender information and the sender is identified. However, the sender information entered in the header is not reliable (can be fake) and thus the transfer route information (Received) entered in the header or the digital signature attached to E-mail is referenced. For example, if the transmission source of the E-mail is determined to be reliable based on the transfer route information (E-mail in the intranet, E-mail from a mobile telephone, or the like), the sender is identified based on the sender information; for any other E-mail, the sender is identified based on the digital signature and E-mail to which no digital signature is attached is handled like E-mail from an unidentified sender and fax transfer is not permitted.

The charge amount may be calculated based on the communication charge amount contained in the communication end notification from the Internet fax 75; in addition, it may be calculated based on the telephone number of the transfer destination of the fax transfer and the size and the type of attached information based on the previously received mail information or may be calculated using various pieces of information in combination. The charge amount may be calculated in a different manner for each sender.

FIG. 43 is a drawing to show a record example of the charging DB 210 for recording the information referenced by the charging server 200 to identify each sender and the charge amounts.

By the way, if charging is applied for transferring the information attached to received E-mail as described above, when the Internet fax 75 transmits E-mail to an Internet fax of the same type, the Internet fax 75 is charged for it as the sender.

Therefore, if the charge itself for transmitting E-mail is low, it is possible that a large charge amount will occur as a result.

Thus, the Internet fax 75 scans an original and to transmit the original by E-mail, the user is also charged for it.

The operation of the Internet fax 75 to attach scanned information to E-mail for transmission will be discussed.

Figure 44:
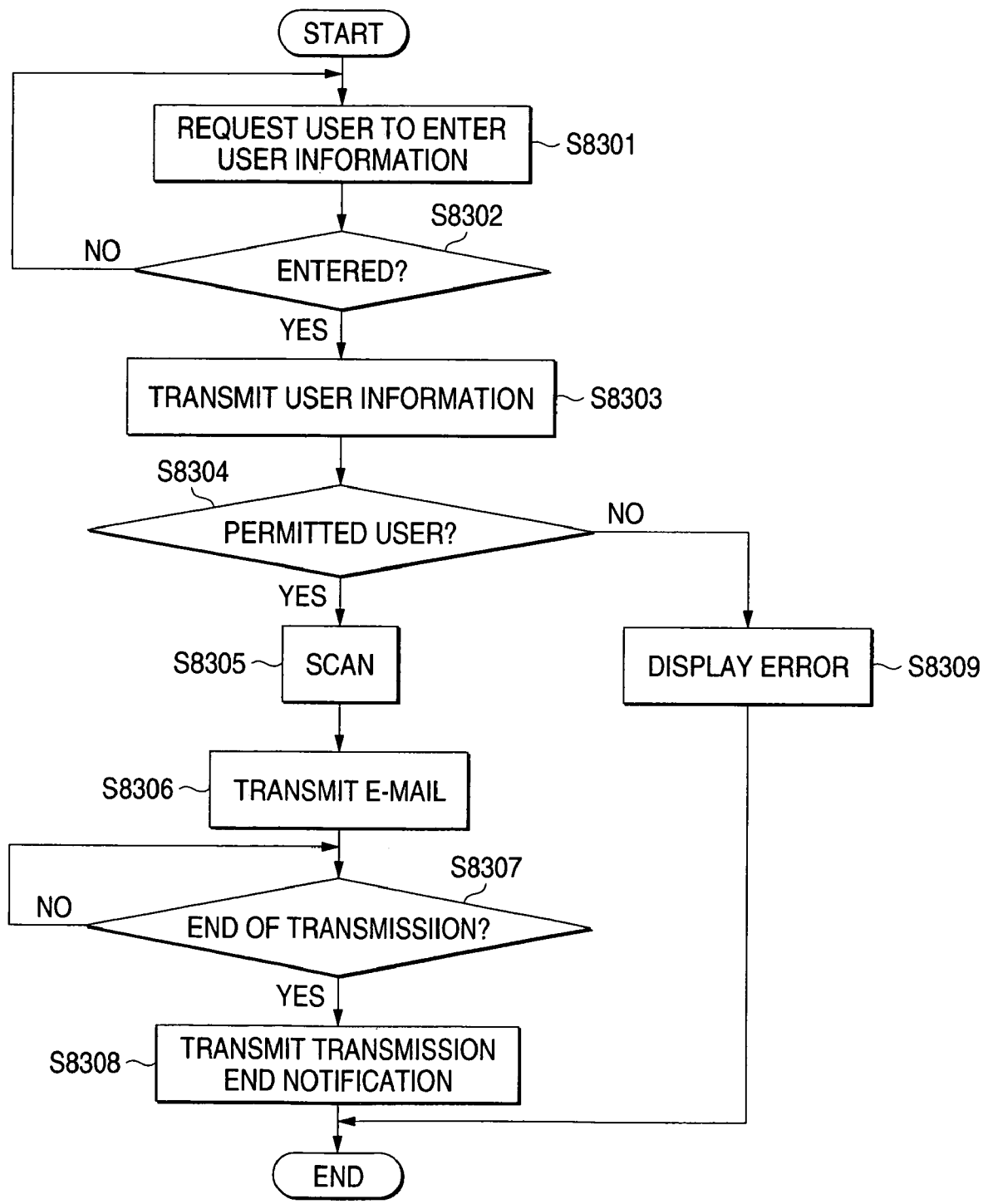
FIG. 44 is a flowchart to show an operation flow for the Internet fax 75 to attach scanned information to E-mail for transmission.

FIG. 44 is a flowchart to show an operation flow for the Internet fax 75 to attach scanned information to E-mail for transmission.

If the user attempts to scan an original through the Internet fax 75, the operation and display section 103 requests the user to enter user information (step S8301) and waits for the user to enter user information (NO at step S8302). The user information mentioned here is, for example, a pair of user ID and password.

When the user enters the user information through the operation and display section 103 (YES at step S8302), the Internet fax 75 transmits the user information to the charging server 200. If the charging server 200 authenticates the user who is permitted to transmit E-mail (YES at step S8304), the Internet fax 75 scans the original (step S8305) and attaches scanned information to E-mail and transmits the information by E-mail through the mail server 72 (step S8306). When the transmission of the E-mail terminates (YES at step S8307), the Internet fax 75 transmits a transmission end notification indicating the termination of the transmission to the charging server 200 (step S8308). The transmission end notification contains information concerning the original scanning and the E-mail transmission, such as the scan condition, the scan result information amount, and the E-mail transmission destination.

On the other hand, if the charging server 200 does not permit the user to transmit E-mail (NO at step S8304), the operation and display section 103 displays an error (step S8309) and the processing is terminated.

Figures 45, 46:
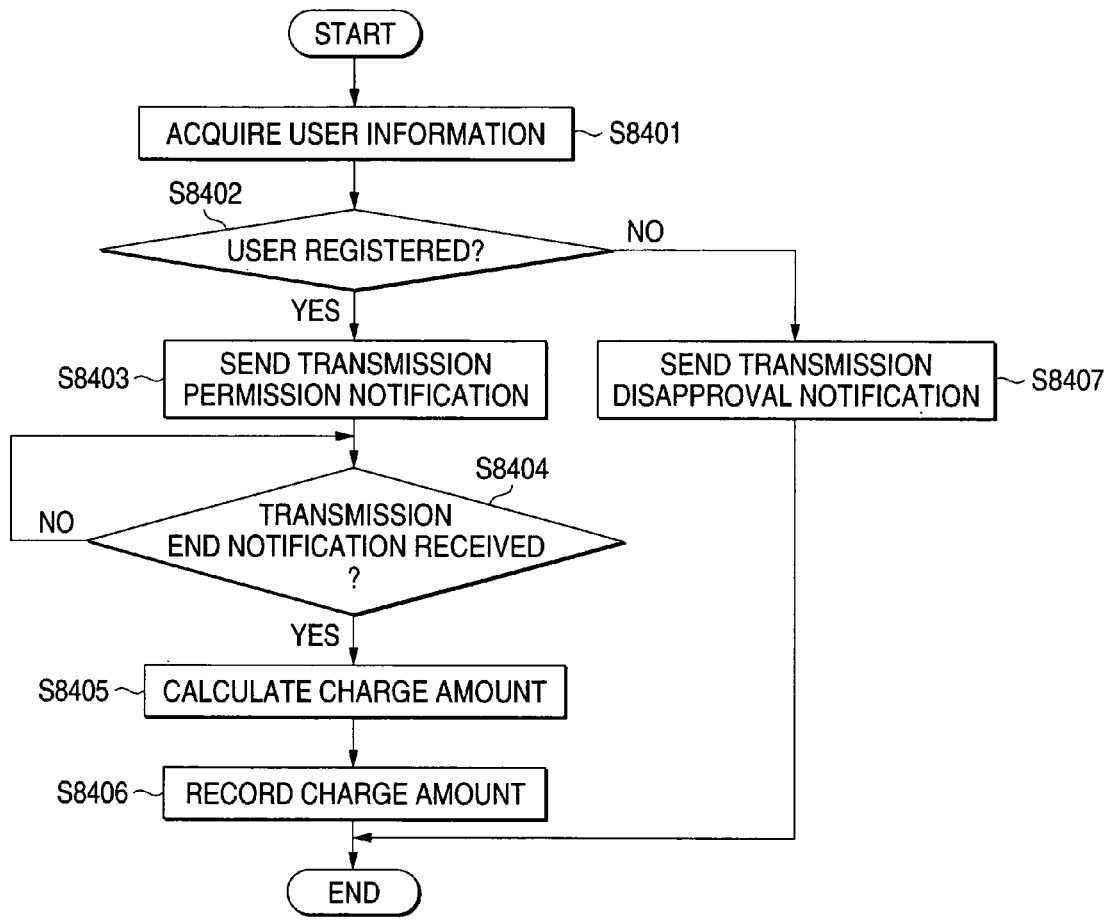
FIG. 45 is a flowchart to show an operation flow of the charging server 200 for the Internet fax 75 to attach scanned information to E-mail for transmission.
FIG. 46 is a drawing to show a record example of the charging DB for recording the information referenced by the charging server 200 to authenticate each user and the charge amounts.

FIG. 45 is a flowchart to show an operation flow of the charging server 200 for the Internet fax 75 to attach scanned information to E-mail for transmission.

Upon reception of the user information transmitted at step S8303 in FIG. 44 from the Internet fax 75 (step S8401), the charging server 200 identifies the user based on the user information. If the user is registered (YES at step S8402), the charging server 200 sends a notification indicating permission of E-mail transmission to the Internet fax 75 (step S8403) and waits for a transmission end notification from the Internet fax 75 (NO at step S8404).

Upon reception of a transmission end notification from the Internet fax 75 (YES at step S8404), the charging server 200 calculates the charge amount for the transmission (step S8405) and records the calculated charge amount in the charging DB 210 (step S8406).

On the other hand, if the user authenticated based on the user information received from the Internet fax 75 is not registered (NO at step S8402), the charging server 200 sends a notification indicating disapproval of transmission of E-mail to the Internet fax 75 (step S8407) and terminates the processing.

A supplementary description of determination as to whether or not the charging server 200 permits E-mail transmission and a charge amount calculation method is given below:

First, in the determination as to whether or not E-mail transmission is permitted, the user is authenticated using the user ID or the mail address and the password of the user.

The charge amount is calculated based on various pieces of information contained in the transmission end notification from the Internet fax 75. For example, the charge amount is calculated based on the scan condition at the scanning time and the size of the information provided from the scanning. The transmission destination of the E-mail is identified and if the transmission destination is clearly a party not charged (for example, a specific user in the intranet or the user himself or herself previously authenticated), the charge amount can be reduced or exempted.

FIG. 45 is a drawing to show a record example of the charging DB 210 for recording the information referenced by the charging server 200 to authenticate each user and the charge amounts.

As described above, according to the invention, in the Internet facsimile, to receive an electronic mail document for fax transfer, if a password related to a control command for indicating the facsimile communication function is encrypted and set in the destination field or the main body of the received electronic mail, the encrypted password is decrypted and using the decrypted password, facsimile transfer of the electronic mail document is executed following the control command, so that it is made possible to safely and reliably conduct facsimile transfer communications using the password (P code) related to the control command (F code) for indicating the facsimile communication function.

According to the invention, in the communication instruction terminal having the function of instructing an Internet facsimile to transfer an electronic mail document by facsimile through the Internet, the password related to the control command for indicating the facsimile communication function added to the electronic mail document to be transferred by facsimile is encrypted by the encryption system for encrypting the electronic mail document, and the password encrypted by the encryption section is set in the destination field or the main body of the electronic mail before the electronic mail document is sent. Thus, the transmitting party of the electronic mail document for facsimile transfer can set the encrypted P code in the predetermined area (the destination field of the mail header or the mail main body) for sending the electronic mail, whereby it is made possible for the Internet facsimile for relaying the facsimile transfer to safely and reliably execute facsimile transfer communications using the P code related to the F code indicating the facsimile communication function.

According to the Internet facsimile of the invention, if an electronic mail document for facsimile transfer is received, whether or not the transmission source can be correctly identified is determined and the received document is transferred by facsimile if it is determined that the transmission source can be correctly identified. Thus, it is made possible to prevent illegal use of the Internet fax transfer function from any unidentified transmission source.

According to the invention, the Internet facsimile having the E-mail To Fax Gateway function refuses facsimile transfer for some reason, automatically the reason why the facsimile transfer is refused is embedded in the E-mail whose facsimile transfer is refused and is printed out, so that the operator of the Internet facsimile can easily keep track of the state of the facsimile and if the facsimile involves a problem, the operator can deal with the problem immediately.

According to the invention, in the E-mail To Fax Gateway function, if an attached file that cannot be expanded exists, the associated party can be notified of the fact.

According to the invention, if a document in an unprocessable file format is attached to electronic mail received by the Internet fax, the document is transferred to the file conversion center, which then converts the document into any desired file format and returns the provided document to the Internet fax, so that it is made possible to handle documents in various formats without providing a large number of application software products in the Internet facsimile.

According to the invention, the priority is assigned to documents handled in facsimile communications and Internet facsimile communications and the documents are processed in response to the assigned priority, so that it is made possible to transmit, print, and transfer any important document immediately, and the convenience of the Internet facsimile is increased.

According to the invention, the following advantages can be provided:

(1) The user of the fax of the transfer destination can accurately keep track of information concerning the transmission source of the received data;

(2) the user of the fax of the transfer destination can accurately keep track of information concerning the transmission source and each relay machine of the received data; and (3) illegal use of the Internet fax such as illegal use of the Internet can be monitored.

According to the invention, E-mail is transmitted by fax to the fax of the transfer destination in such a manner that the header and the main body of the E-mail and an attached file thereto are different pages, so that a document can be provided for the transmission destination in a legible document format with divisions separated.

The header and the main body as additional information to the attached file are collected on the same page, whereby legible fax transmission with the information amount suppressed can be executed.

According to the invention, in the E-mail To Fax Gateway function, whether or not each of the header and the main body of E-mail is to be transferred can be specified and thus the communication charge can be reduced while important information is transferred.

According to the invention, when information attached to received E-mail is transferred by fax, the sender of the E-mail is identified and the identified sender is charged, so that the installation person or the manager of the Internet fax can easily administrate the Internet fax without worrying about the extra expenses such as the communication charge.

What is claimed is:

1. A communication control method of an Internet communication apparatus for transmitting and receiving document information via Internet and transmitting and receiving facsimile image information via a public switched telephone network, the communication control method comprising the steps of:

receiving an electronic mail containing a facsimile-transfer instruction requesting the internet communication apparatus to transfer the electronic mail as the facsimile image information to a destination via the public switched telephone network;

refusing the facsimile-transfer instruction contained in the received electronic mail when the facsimile-transfer instruction or the received electronic mail meets a certain condition; and printing out, with the internet communication apparatus, at least a part of the electronic mail which contains the facsimile-transfer instruction refused by the internet communication apparatus.

2. The communication control method as claimed in claim 1, wherein the condition includes a condition that the destination indicated by the facsimile transfer instruction is an unpermitted transfer destination.

3. The communication control method as claimed in claim 1, wherein the condition includes a condition that a file attached to the received electronic mail cannot be expanded in a stipulated format.

4. The communication control method as claimed in claim 1, wherein the receiving receives the electronic mail via the Internet.

5. The communication control method as claimed in claim 1 wherein the printing out step prints a header part and a main body of the electronic mail and an attached file thereto.

6. The communication control method as claimed in claim 1 wherein the printing out step automatically prints a header part and a main body of the electronic mail.

7. The communication control method as claimed in claim 1 wherein the printing out step prints a reason why transfer of the electronic mail is refused.

8. An Internet communication apparatus for transmitting and receiving document information via Internet and transmitting and receiving facsimile image information via a public switched telephone network, the Internet communication apparatus comprising:

a receiving section that receives an electronic mail containing a facsimile-transfer instruction requesting the internet communication apparatus to transfer the electronic mail as the facsimile image information to a destination via the public switched telephone network;

a transfer refusing section that refuses the facsimile-transfer instruction contained in the received electronic mail when the facsimile-transfer instruction or the received electronic mail meets a certain condition; and a print section for printing out, with the internet communication apparatus, at least a part of the electronic mail which contains the facsimile-transfer instruction refused by the Internet communication apparatus.

9. The Internet communication apparatus as claimed in claim 8 wherein the printing section prints a header part and a main body of the electronic mail and an attached file thereto.

10. The Internet communication apparatus as claimed in claim 8 wherein the printing section automatically prints a header part and a main body of the electronic mail.

11. The Internet communication apparatus as claimed in claim 8 wherein the printing section prints a reason why transfer of the electronic mail is refused.

12. The Internet communication apparatus as claimed in claim 8, wherein the condition includes a condition that the destination indicated by the facsimile transfer instruction is an unpermitted transfer destination.

13. The Internet communication apparatus as claimed in claim 8, wherein the condition includes a condition that a file to the received electronic mail cannot be expanded in a stipulated format.

14. The Internet communication apparatus as claimed in claim 8, wherein the receiving section receives the electronic mail via the Internet.

* * * * *